United States Patent
Jung et al.

(10) Patent No.: US 8,984,133 B2
(45) Date of Patent: Mar. 17, 2015

(54) PROVIDING TREATMENT-INDICATIVE FEEDBACK DEPENDENT ON PUTATIVE CONTENT TREATMENT

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1518 days.

(21) Appl. No.: 11/821,101

(22) Filed: Jun. 19, 2007

(65) Prior Publication Data

US 2008/0320098 A1    Dec. 25, 2008

(51) Int. Cl.
    *G06F 15/173*     (2006.01)
    *H04L 12/58*     (2006.01)

(52) U.S. Cl.
    CPC ............ *H04L 12/585* (2013.01); *H04L 12/583* (2013.01); *H04L 51/063* (2013.01); *H04L 51/12* (2013.01)
    USPC ............................ 709/226; 709/224; 709/225

(58) Field of Classification Search
None
See application file for complete search history.

(56) References Cited

U.S. PATENT DOCUMENTS

| | | |
|---|---|---|
| 5,128,938 A | 7/1992 | Borras |
| 5,138,311 A | 8/1992 | Weinberg |
| 5,333,180 A | 7/1994 | Brown et al. |
| 5,548,535 A | 8/1996 | Zvonar |
| 5,596,750 A | 1/1997 | Li et al. |
| 5,812,865 A | 9/1998 | Theimer et al. |
| 5,892,909 A | 4/1999 | Grasso et al. |
| 5,914,726 A | 6/1999 | Schultz |
| 6,006,225 A | 12/1999 | Bowman et al. |
| 6,009,433 A | 12/1999 | Kurano et al. |
| 6,014,716 A | 1/2000 | Ohara |
| 6,031,453 A | 2/2000 | Brinzer |
| 6,074,787 A | 6/2000 | Takeuchi |
| 6,081,816 A | 6/2000 | Agrawal |
| 6,105,072 A | 8/2000 | Fischer |
| 6,151,311 A | 11/2000 | Wheatley, III et al. |
| 6,157,379 A | 12/2000 | Singh |
| 6,192,396 B1 | 2/2001 | Kohler |
| 6,208,954 B1 | 3/2001 | Houtchens |
| 6,212,553 B1 | 4/2001 | Lee et al. |
| 6,219,731 B1 | 4/2001 | Gutowitz |
| 6,237,141 B1 | 5/2001 | Holzle et al. |
| 6,243,378 B1 | 6/2001 | Olnowich |
| 6,263,311 B1 | 7/2001 | Dildy |
| 6,266,675 B1 | 7/2001 | Evans et al. |
| 6,275,954 B1 * | 8/2001 | Herman et al. .................. 714/25 |
| 6,287,125 B1 | 9/2001 | Dorcely |

(Continued)

OTHER PUBLICATIONS

"Called-Party Camp-On"; Wikipedia, The Free Encyclopedia; bearing a date of Mar. 20, 2007; printed on Apr. 2, 2007; p. 1; located at: http://en.wikipedia.org/wiki/Called-party camp-on.

(Continued)

*Primary Examiner* — Umar Cheema

(57) ABSTRACT

A system, method, computer program product, and carrier are described for obtaining a content type indication locally of a remote system's apparent content treatment and causing provisional-update-responsive feedback to depend at least partly on the content type indication of the remote system's apparent content treatment.

42 Claims, 27 Drawing Sheets

(56) References Cited

U.S. PATENT DOCUMENTS

| | | |
|---|---|---|
| 6,308,148 B1 | 10/2001 | Bruins et al. |
| 6,320,112 B1 | 11/2001 | Lotze |
| 6,341,359 B1 | 1/2002 | Aiken et al. |
| 6,349,238 B1 | 2/2002 | Gabbita et al. |
| 6,374,221 B1 | 4/2002 | Haimi-Cohen |
| 6,377,953 B1 | 4/2002 | Gawlick et al. |
| 6,378,128 B1 | 4/2002 | Edelstein et al. |
| 6,389,475 B1 | 5/2002 | Speakman et al. |
| 6,401,100 B1 | 6/2002 | Gladieux |
| 6,418,136 B1 | 7/2002 | Naor et al. |
| 6,418,424 B1 | 7/2002 | Hoffberg et al. |
| 6,424,946 B1 | 7/2002 | Tritschler et al. |
| 6,425,128 B1 | 7/2002 | Krapf et al. |
| 6,430,573 B1 | 8/2002 | Pachet et al. |
| 6,452,607 B1 | 9/2002 | Livingston |
| 6,480,885 B1 | 11/2002 | Olivier |
| 6,496,600 B1 | 12/2002 | Huang |
| 6,526,258 B2 | 2/2003 | Bejar et al. |
| 6,539,050 B1 | 3/2003 | Lee et al. |
| 6,539,349 B1 | 3/2003 | Benno |
| 6,546,005 B1 | 4/2003 | Berkley et al. |
| 6,549,950 B2 | 4/2003 | Lytle et al. |
| 6,560,576 B1 | 5/2003 | Cohen et al. |
| 6,564,321 B2 | 5/2003 | Bobo, II |
| 6,565,610 B1 | 5/2003 | Wang et al. |
| 6,570,850 B1 | 5/2003 | Gutierrez et al. |
| 6,574,744 B1 | 6/2003 | Kantz et al. |
| 6,594,630 B1 | 7/2003 | Zlokarnik et al. |
| 6,594,654 B1 | 7/2003 | Salam et al. |
| 6,594,672 B1 | 7/2003 | Lampson et al. |
| 6,614,551 B1 | 9/2003 | Peek |
| 6,621,892 B1 | 9/2003 | Banister et al. |
| 6,629,635 B1 | 10/2003 | Akamine |
| 6,633,868 B1 | 10/2003 | Min et al. |
| 6,662,223 B1 | 12/2003 | Zhang et al. |
| 6,678,360 B1 | 1/2004 | Katz |
| 6,690,390 B1 | 2/2004 | Walters et al. |
| 6,691,159 B1 | 2/2004 | Grewal et al. |
| 6,700,591 B1 | 3/2004 | Sharpe |
| 6,700,678 B1 | 3/2004 | Luman |
| 6,704,905 B2 | 3/2004 | Fukushige et al. |
| 6,711,291 B1 | 3/2004 | Stubler et al. |
| 6,724,373 B1 | 4/2004 | O'Neill, Jr. et al. |
| 6,725,229 B2 | 4/2004 | Majewski et al. |
| 6,748,320 B2 | 6/2004 | Jones |
| 6,751,593 B2 | 6/2004 | Tetsumoto |
| 6,760,748 B1 | 7/2004 | Hakim |
| 6,772,396 B1 | 8/2004 | Cronin et al. |
| 6,775,358 B1 | 8/2004 | Breitenbach et al. |
| 6,785,341 B2 | 8/2004 | Walton et al. |
| 6,785,867 B2 | 8/2004 | Shaffer et al. |
| 6,788,308 B2 | 9/2004 | Reavy et al. |
| 6,795,860 B1 | 9/2004 | Shah |
| 6,804,224 B1 | 10/2004 | Schuster et al. |
| 6,810,422 B1 | 10/2004 | Cross |
| 6,813,043 B1 | 11/2004 | Mizuyama et al. |
| 6,813,507 B1 | 11/2004 | Gress et al. |
| 6,816,901 B1 | 11/2004 | Sitaraman et al. |
| 6,820,079 B1 | 11/2004 | Evans |
| 6,829,613 B1 | 12/2004 | Liddy |
| 6,839,777 B1 | 1/2005 | Vrancic et al. |
| 6,842,860 B1 | 1/2005 | Branstad et al. |
| 6,850,988 B1 | 2/2005 | Reed |
| 6,851,049 B1 | 2/2005 | Price, III |
| 6,868,427 B2 | 3/2005 | Herzog et al. |
| 6,892,330 B2 | 5/2005 | Lee |
| 6,892,352 B1 | 5/2005 | Myers |
| 6,895,426 B1 | 5/2005 | Cortright et al. |
| 6,904,168 B1 | 6/2005 | Steinberg et al. |
| 6,904,183 B2 | 6/2005 | Slatter |
| 6,907,277 B1 | 6/2005 | Shim |
| 6,910,028 B2 | 6/2005 | Chan et al. |
| 6,910,033 B2 | 6/2005 | Rosenblum |
| 6,910,067 B1 | 6/2005 | Sitaraman et al. |
| 6,925,458 B2 | 8/2005 | Scaturro et al. |
| 6,934,889 B2 | 8/2005 | Owari |
| 6,934,916 B1 | 8/2005 | Webb et al. |
| 6,937,766 B1 | 8/2005 | Wilf et al. |
| 6,938,196 B2 | 8/2005 | Richardson et al. |
| 6,941,466 B2 | 9/2005 | Mastrianni |
| 6,941,513 B2 | 9/2005 | Meystel et al. |
| 6,947,068 B2 | 9/2005 | Forkner et al. |
| 6,947,948 B2 | 9/2005 | Wang et al. |
| 6,959,389 B1 | 10/2005 | Dunn et al. |
| 6,961,766 B2 | 11/2005 | Janosik, Jr. et al. |
| 6,981,023 B1 | 12/2005 | Hamilton et al. |
| 6,985,172 B1 | 1/2006 | Rigney et al. |
| 6,985,830 B2 | 1/2006 | Lee et al. |
| 6,987,840 B1 | 1/2006 | Bosik et al. |
| 6,990,525 B1 | 1/2006 | Ying et al. |
| 6,993,563 B2 | 1/2006 | Lytle et al. |
| 6,999,469 B1 | 2/2006 | Chu et al. |
| 7,006,827 B2 | 2/2006 | Masuda et al. |
| 7,010,616 B2 | 3/2006 | Carlson et al. |
| 7,020,651 B2 | 3/2006 | Ripley |
| 7,020,688 B2 | 3/2006 | Sykes, Jr. |
| 7,027,645 B2 | 4/2006 | Swift |
| 7,031,438 B1 | 4/2006 | Cheston, III et al. |
| 7,038,680 B2 | 5/2006 | Pitkow |
| 7,039,637 B2 | 5/2006 | Murray et al. |
| 7,054,421 B2 | 5/2006 | Kandlur et al. |
| 7,054,882 B2 | 5/2006 | Dockter et al. |
| 7,058,688 B2 | 6/2006 | Lin |
| 7,062,508 B2 | 6/2006 | Andreev et al. |
| 7,062,535 B1 | 6/2006 | Stark et al. |
| 7,072,901 B2 | 7/2006 | Teraguchi et al. |
| 7,072,942 B1 | 7/2006 | Maller |
| 7,076,485 B2 | 7/2006 | Bloedorn |
| 7,076,533 B1 | 7/2006 | Knox et al. |
| 7,080,384 B2 | 7/2006 | Wall et al. |
| 7,089,256 B2 | 8/2006 | Smialek |
| 7,089,497 B2 | 8/2006 | Abbott et al. |
| 7,095,855 B1 | 8/2006 | Collins |
| 7,103,154 B1 | 9/2006 | Cannon et al. |
| 7,107,291 B2 | 9/2006 | Nishikawa et al. |
| 7,110,664 B2 | 9/2006 | Yogeshwar et al. |
| 7,110,890 B2 | 9/2006 | Birkett et al. |
| 7,117,210 B2 | 10/2006 | DeSalvo |
| 7,119,923 B1 | 10/2006 | Iwaki |
| 7,120,628 B1 | 10/2006 | Conmy et al. |
| 7,124,302 B2 | 10/2006 | Ginter et al. |
| 7,130,887 B2 | 10/2006 | Goldberg |
| 7,131,107 B2 | 10/2006 | Wall et al. |
| 7,133,880 B1 | 11/2006 | Nori et al. |
| 7,137,106 B2 | 11/2006 | Herman et al. |
| 7,139,825 B2 | 11/2006 | Andaker et al. |
| 7,143,083 B2 | 11/2006 | Carlbom et al. |
| 7,143,140 B2 | 11/2006 | Dennis |
| 7,146,134 B2 | 12/2006 | Moon et al. |
| 7,146,234 B2 | 12/2006 | Woehler |
| 7,149,649 B2 | 12/2006 | Haft et al. |
| 7,149,780 B2 | 12/2006 | Quine et al. |
| 7,159,029 B2 | 1/2007 | Laarhuis et al. |
| 7,162,474 B1 | 1/2007 | Harker et al. |
| 7,162,515 B2 | 1/2007 | Engstrom |
| 7,164,921 B2 | 1/2007 | Owens et al. |
| 7,177,816 B2 | 2/2007 | Ehlen et al. |
| 7,181,694 B2 | 2/2007 | Reiss et al. |
| 7,188,338 B2 | 3/2007 | Ito |
| 7,191,117 B2 | 3/2007 | Kirby et al. |
| 7,191,252 B2 | 3/2007 | Redlich et al. |
| 7,194,656 B2 | 3/2007 | Hayward |
| 7,200,592 B2 * | 4/2007 | Goodwin et al. ............... 1/1 |
| 7,200,678 B1 | 4/2007 | Bettadahalli et al. |
| 7,206,778 B2 | 4/2007 | Bode et al. |
| 7,209,880 B1 | 4/2007 | Gajic et al. |
| 7,209,916 B1 | 4/2007 | Seshadri et al. |
| 7,212,807 B2 | 5/2007 | Laumen et al. |
| 7,213,260 B2 | 5/2007 | Judge |
| 7,216,056 B2 * | 5/2007 | Kubota et al. ............ 702/179 |
| 7,222,309 B2 | 5/2007 | Chupin et al. |
| 7,224,778 B2 | 5/2007 | Aoki |
| 7,228,134 B2 | 6/2007 | Gandhi et al. |
| 7,228,334 B1 | 6/2007 | Jordan, Jr. |

(56) References Cited

U.S. PATENT DOCUMENTS

| | | |
|---|---|---|
| 7,233,803 B2 | 6/2007 | Nielsen et al. |
| 7,237,010 B2 | 6/2007 | Mora |
| 7,239,985 B1 | 7/2007 | Hysom et al. |
| 7,240,041 B2 | 7/2007 | Martin et al. |
| 7,240,355 B1 | 7/2007 | Eldering |
| 7,242,421 B2 | 7/2007 | Center, Jr. et al. |
| 7,242,493 B2 | 7/2007 | Hall et al. |
| 7,242,988 B1 | 7/2007 | Hoffberg et al. |
| 7,243,130 B2 | 7/2007 | Horvitz et al. |
| 7,277,944 B1 | 10/2007 | Davie et al. |
| 7,317,697 B2 | 1/2008 | Lewis et al. |
| 7,346,418 B2 | 3/2008 | Lowe |
| 7,353,034 B2 | 4/2008 | Haney |
| 7,366,780 B2 | 4/2008 | Keller et al. |
| 7,395,507 B2 | 7/2008 | Robarts et al. |
| 7,630,371 B2 | 12/2009 | Hernandez et al. |
| 7,672,267 B2 | 3/2010 | Tsai et al. |
| 7,756,929 B1 | 7/2010 | Pettigrew et al. |
| 7,929,443 B1 | 4/2011 | Anumala |
| 7,941,491 B2 | 5/2011 | Sood |
| 7,945,954 B2 | 5/2011 | Coueignoux |
| 7,996,470 B2 | 8/2011 | Daniell |
| 7,996,473 B2 | 8/2011 | Braam |
| 8,086,672 B2 | 12/2011 | Horvitz |
| 8,112,485 B1 | 2/2012 | Cooley et al. |
| 8,195,744 B2 | 6/2012 | Julia et al. |
| 2001/0037311 A1 | 11/2001 | McCoy et al. |
| 2001/0037493 A1* | 11/2001 | Herman et al. .................. 717/4 |
| 2001/0039522 A1 | 11/2001 | Saxon |
| 2002/0035536 A1 | 3/2002 | Gellman |
| 2002/0069200 A1 | 6/2002 | Cooper et al. |
| 2002/0083118 A1 | 6/2002 | Sim |
| 2002/0107931 A1 | 8/2002 | Singh et al. |
| 2002/0147645 A1 | 10/2002 | Alao et al. |
| 2002/0178086 A1 | 11/2002 | Margeson et al. |
| 2002/0178224 A1 | 11/2002 | Kasajima |
| 2003/0054839 A1 | 3/2003 | Ono |
| 2003/0134616 A1 | 7/2003 | Thomsen et al. |
| 2003/0140235 A1 | 7/2003 | Immega et al. |
| 2003/0172119 A1 | 9/2003 | Hosali et al. |
| 2003/0217333 A1 | 11/2003 | Smith et al. |
| 2003/0225850 A1 | 12/2003 | Teague |
| 2003/0236729 A1 | 12/2003 | Epstein et al. |
| 2004/0030550 A1 | 2/2004 | Liu et al. |
| 2004/0039630 A1 | 2/2004 | Begole et al. |
| 2004/0044774 A1 | 3/2004 | Mangalik et al. |
| 2004/0117326 A1 | 6/2004 | Amato |
| 2004/0117501 A1 | 6/2004 | Day et al. |
| 2004/0128347 A1* | 7/2004 | Mason et al. .................. 709/203 |
| 2004/0139000 A1 | 7/2004 | Amos |
| 2004/0139314 A1 | 7/2004 | Cook et al. |
| 2004/0176107 A1 | 9/2004 | Chadha |
| 2004/0180668 A1 | 9/2004 | Owens et al. |
| 2004/0203949 A1 | 10/2004 | Nielsen et al. |
| 2004/0215453 A1 | 10/2004 | Orbach |
| 2004/0215723 A1 | 10/2004 | Chadha |
| 2004/0215726 A1 | 10/2004 | Arning et al. |
| 2004/0220705 A1 | 11/2004 | Basir et al. |
| 2004/0243675 A1 | 12/2004 | Roselinsky |
| 2004/0243844 A1 | 12/2004 | Adkins |
| 2005/0002417 A1 | 1/2005 | Kelly et al. |
| 2005/0021649 A1 | 1/2005 | Goodman et al. |
| 2005/0136903 A1 | 6/2005 | Kashima et al. |
| 2005/0136904 A1 | 6/2005 | Siddiqui |
| 2005/0154636 A1 | 7/2005 | Hildinger et al. |
| 2005/0177456 A1 | 8/2005 | Rossides |
| 2005/0186968 A1 | 8/2005 | Durst et al. |
| 2005/0188031 A1 | 8/2005 | Zandt |
| 2005/0188043 A1 | 8/2005 | Cortright et al. |
| 2005/0193073 A1 | 9/2005 | Mehr et al. |
| 2005/0195076 A1 | 9/2005 | McCulloch et al. |
| 2005/0198054 A1 | 9/2005 | Sankaran |
| 2005/0210115 A1 | 9/2005 | Naito et al. |
| 2005/0233757 A1 | 10/2005 | Choi |
| 2005/0256769 A1 | 11/2005 | Rossides |
| 2006/0013368 A1 | 1/2006 | LaBaw |
| 2006/0018445 A1 | 1/2006 | Mittal |
| 2006/0036783 A1* | 2/2006 | Aarts .............................. 710/58 |
| 2006/0047634 A1 | 3/2006 | Aaron et al. |
| 2006/0072154 A1 | 4/2006 | Kim |
| 2006/0078122 A1 | 4/2006 | Dacosta |
| 2006/0089152 A1 | 4/2006 | Mahonen |
| 2006/0101514 A1* | 5/2006 | Milener et al. .................. 726/22 |
| 2006/0161457 A1 | 7/2006 | Rapaport et al. |
| 2006/0178949 A1 | 8/2006 | McGrath |
| 2006/0246869 A1 | 11/2006 | Ohlenbusch et al. |
| 2007/0016647 A1 | 1/2007 | Gupta et al. |
| 2007/0061327 A1* | 3/2007 | Oscherov et al. ............... 707/10 |
| 2007/0061433 A1 | 3/2007 | Reynolds et al. |
| 2007/0070979 A1 | 3/2007 | Kim et al. |
| 2007/0103548 A1 | 5/2007 | Carter |
| 2007/0124378 A1 | 5/2007 | Elzur |
| 2007/0130599 A1 | 6/2007 | Monroe |
| 2007/0150571 A1 | 6/2007 | Haga et al. |
| 2007/0173266 A1 | 7/2007 | Barnes |
| 2007/0198483 A1 | 8/2007 | Li et al. |
| 2007/0207727 A1 | 9/2007 | Song et al. |
| 2007/0220607 A1 | 9/2007 | Sprosts et al. |
| 2007/0241885 A1 | 10/2007 | Clipsham |
| 2007/0245300 A1 | 10/2007 | Chan et al. |
| 2007/0262861 A1 | 11/2007 | Anderson et al. |
| 2007/0282654 A1 | 12/2007 | Sarkar |
| 2007/0293048 A1 | 12/2007 | Lee et al. |
| 2007/0297329 A1 | 12/2007 | Park et al. |
| 2008/0010106 A1 | 1/2008 | Bourne et al. |
| 2008/0014910 A1 | 1/2008 | Hsu et al. |
| 2008/0016160 A1 | 1/2008 | Walter et al. |
| 2008/0016248 A1 | 1/2008 | Tsirtsis et al. |
| 2008/0028090 A1 | 1/2008 | Kok et al. |
| 2008/0030322 A1 | 2/2008 | Stauffer et al. |
| 2008/0040151 A1 | 2/2008 | Moore |
| 2008/0070593 A1 | 3/2008 | Altman et al. |
| 2008/0162652 A1 | 7/2008 | True et al. |
| 2008/0162860 A1 | 7/2008 | Sabbatini et al. |
| 2008/0168074 A1 | 7/2008 | Inagaki |
| 2008/0214142 A1 | 9/2008 | Morin et al. |
| 2008/0320088 A1 | 12/2008 | Jung et al. |
| 2008/0320089 A1 | 12/2008 | Jung et al. |
| 2009/0034851 A1* | 2/2009 | Fan et al. ....................... 382/230 |
| 2009/0063518 A1 | 3/2009 | Jung et al. |
| 2009/0259730 A1* | 10/2009 | Machida et al. ............... 709/219 |
| 2010/0124905 A1 | 5/2010 | Pratt et al. |
| 2010/0250682 A1 | 9/2010 | Goldberg et al. |
| 2010/0316045 A1 | 12/2010 | Przybysz et al. |
| 2012/0069131 A1 | 3/2012 | Abelow |
| 2013/0091192 A1 | 4/2013 | Shafi et al. |
| 2013/0091214 A1 | 4/2013 | Kellerman et al. |

OTHER PUBLICATIONS

FutureMe.org; bearing a date of Jan. 22, 2006; printed on Apr., 2007; pp. 1-3; located at: http://futureme.org/public.php?id=218620.

Huang, Dawei; Liu, Fang; Shi, Xiangdong; Yang, Guangxin; Zheng, Ludi; Zhou, Zhiyu; "MapWeb: A Location-Based Converged Communications Platform"; Bell Labs Technical Journal; bearing a date of 2006; pp. 159-171; vol. 11, No. 1; Wiley Periodicals, Inc.; located at; www.interscience.wiley.com.

"Intro Writing Do's | Don'ts"; Happen Magazine—Match.com's advice center; printed on Apr. 4, 2007; pp. 1-2; located at: http://www.match.com/matchscene/tips.aspx?articleid=4511.

McKinley, Philip K.; Padmanabhan, Udiyan I.; Ancha, Nandagopal; Sadjadi, Seyed Masoud; "Composable Proxy Services to Support Collaboration on the Mobile Internet"; IEEE Transactions on Computers; bearing a date of Jun. 2003; pp. 713-726; vol. 52, No. 6; IEEE Computer Society.

McKinley, Philip K.; Sadjadi, Seyed Masoud; Kasten, Eric P.; Cheng, Betty H.C.; "A Taxonomy of Compositional Adaptation"; Technical Report MSU-CSE-04/17; bearing a date of May 2004 and Jul. 2004; pp. 1-48; located at: http://www.cse.msu.edu/rapidware/survey.

Morris, John; Peterson, Jon; "Who's Watching You Now?"; IEEE Security & Privacy: Building Confidence in a Networked World; bearing a date of Jan.-Feb. 2007; pp. 76-79; vol. 5, No. 1; IEEE Computer Society.

(56) References Cited

OTHER PUBLICATIONS

"Oops!"; Match.com—Find Singles at the World's Largest Online Dating Personals Service; printed on Apr. 4, 2007; pp. 1-3; located at: http://www.match.com/profile/myprofile.aspx?sect=6.

"Open Source Rule Engines Written in Java"; Manageability; printed on May 2, 2007; pp. 1-7; located at: http://www.manageability.org/blog/stuff/rule_engines/view.

Terdiman, Daniel; "A Cure for E-Mail Attention Disorder?"; CNET News.com; bearing a date of Feb. 28, 2007; pp. 1-3; located at: http://news.com/A+cure+for+e-mail+attention+disorder/2100-.

Khan, Omar; "Context and Context-Aware Computing"; Fall 2006; pp. 1-40; CS260.

*Star Wars IV: A New Hope*; Dir. George Lucas; Perf. Mark Hamill, Harrison Ford, Carrie Fisher, Peter Cushing, Alec Guinness; Twentieth Century Fox; 1977 (submitted via DVD).

Van Grove, Jennifer; "Can a Gmail Tool Make Us More Considerate Email Senders?"; Mashable; printed on Jun. 8, 2011; pp. 1-3; located at: http://mashable.com/2011/06/07/courteously/.

\* cited by examiner

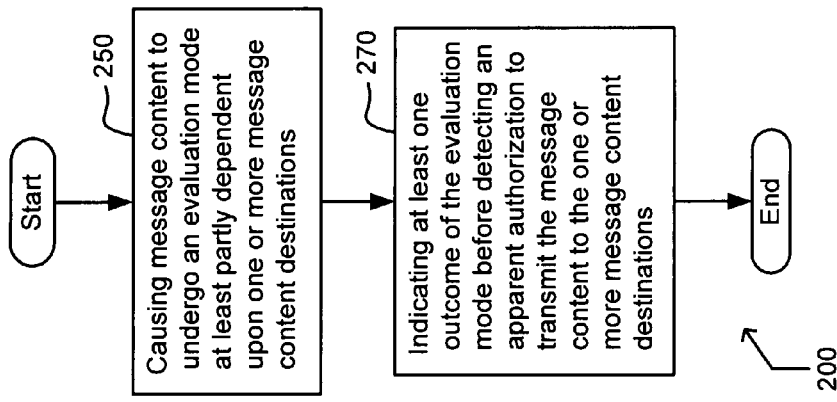
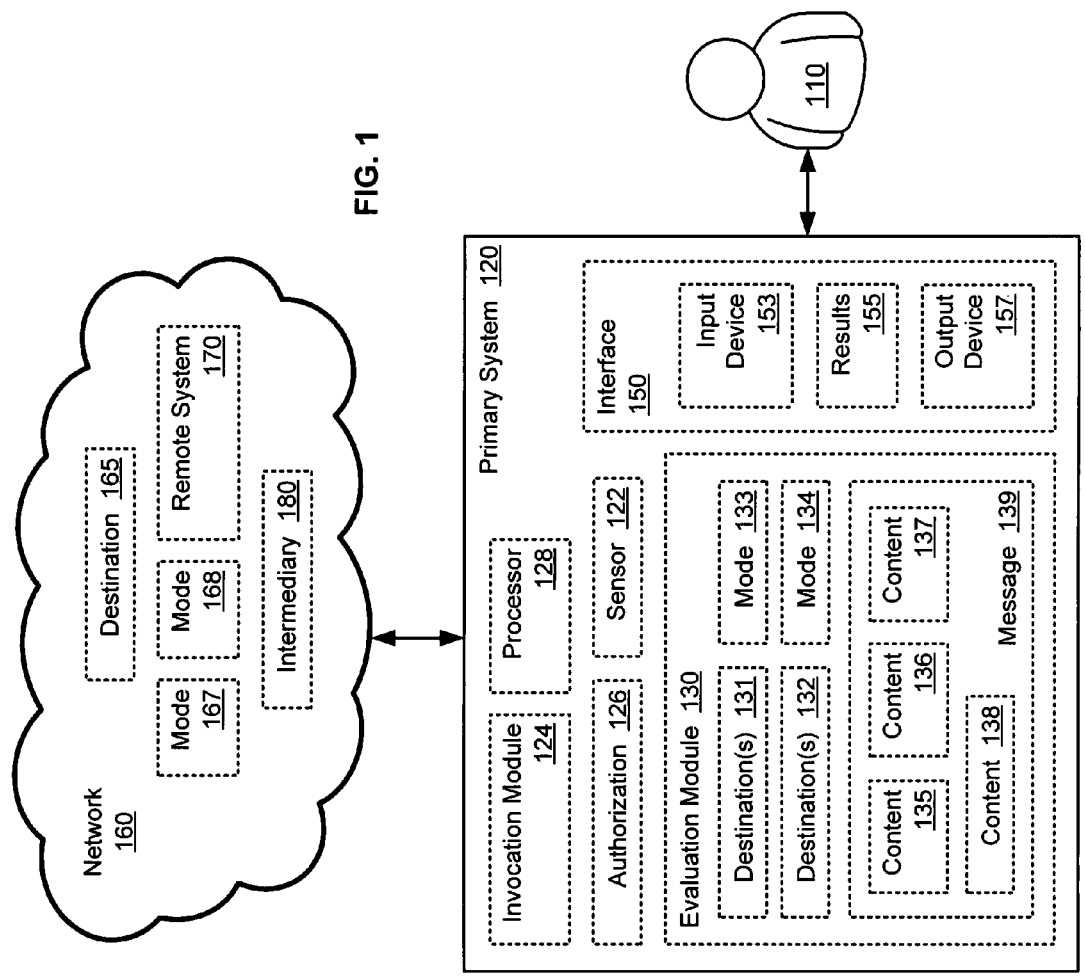

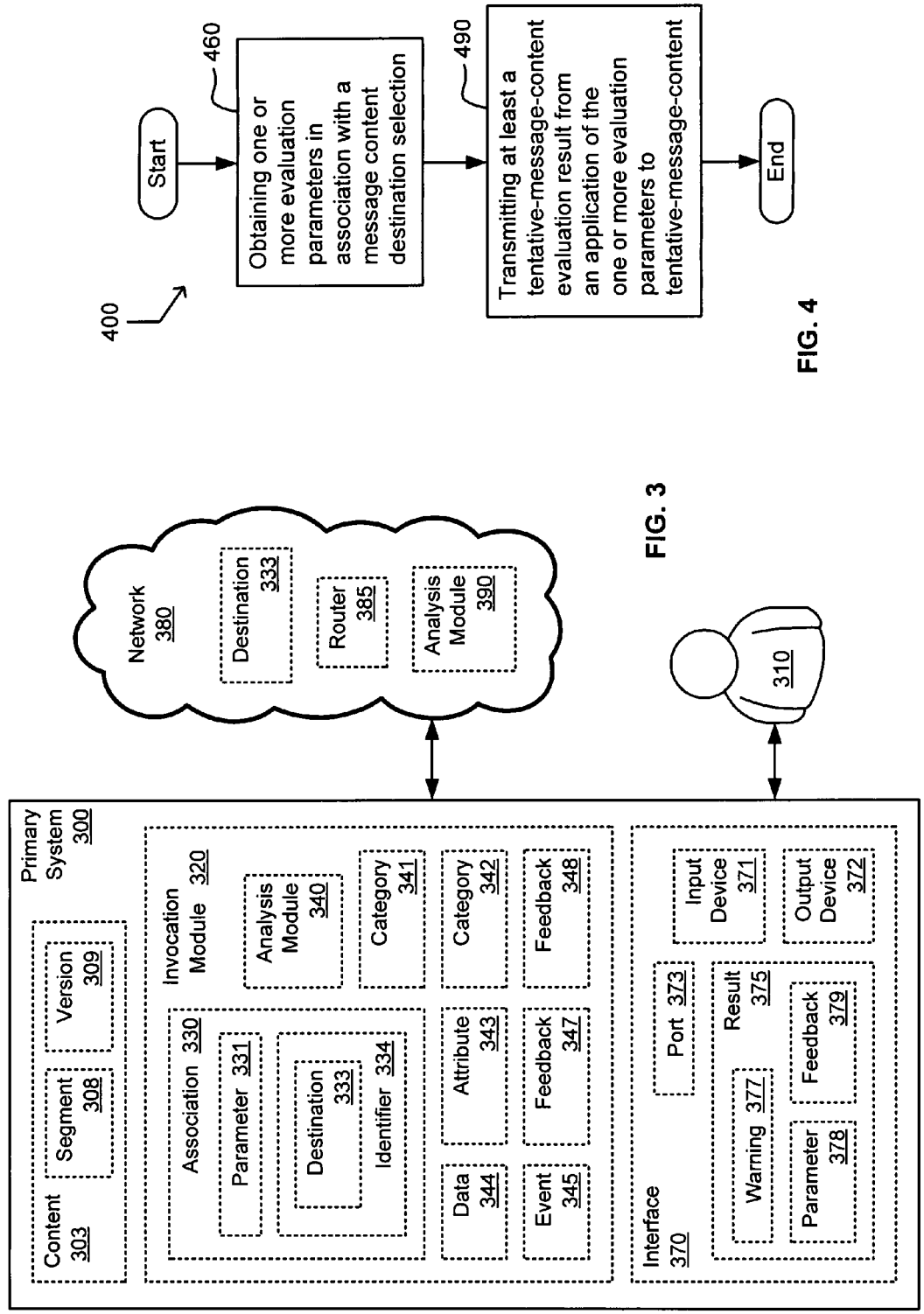

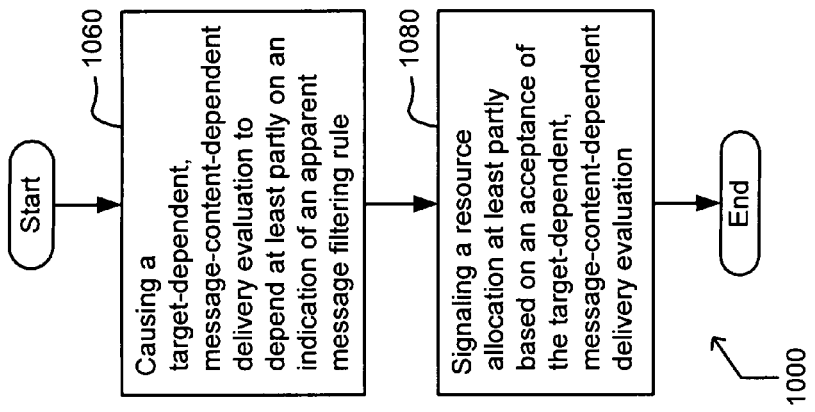
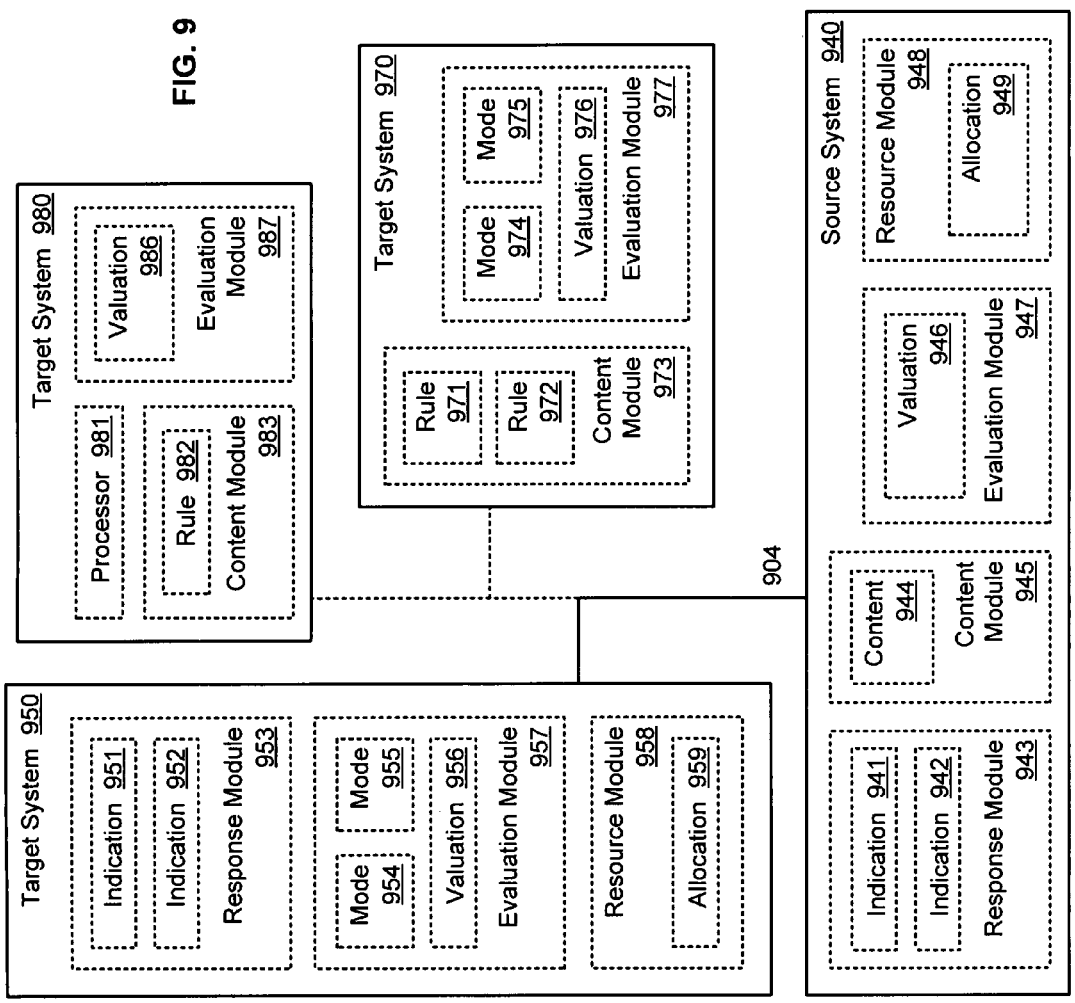

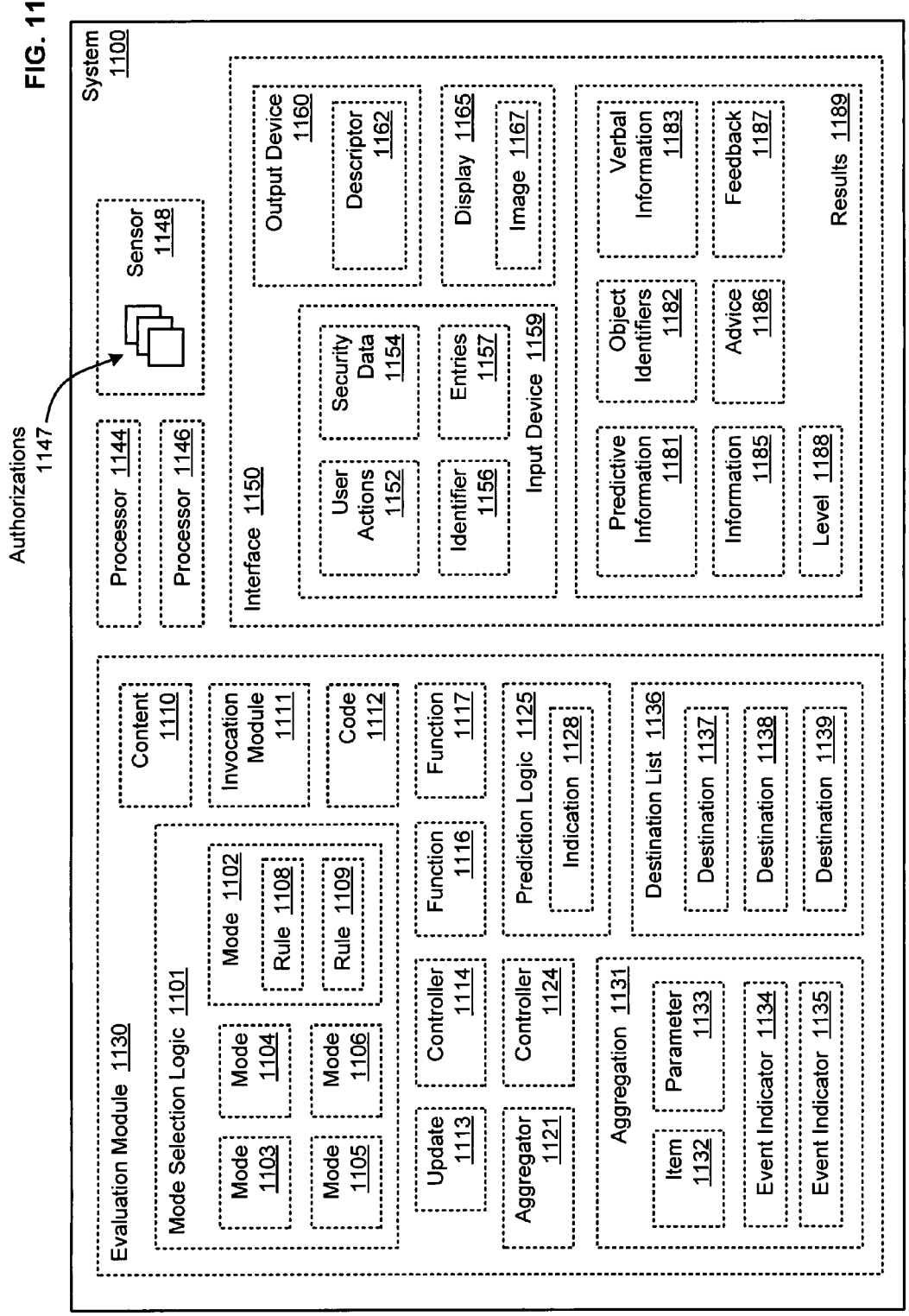

PROVIDING TREATMENT-INDICATIVE FEEDBACK DEPENDENT ON PUTATIVE CONTENT TREATMENT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/821,122, entitled PRELIMINARY DESTINATION-DEPENDENT EVALUATION OF MESSAGE CONTENT, naming Edward K. Y. Jung, Royce A. Levien, Robert W. Lord, Mark A. Malamud, William Henry Mangione-Smith and John D. Rinaldo, Jr. as inventors, filed 19 Jun. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/821,077, entitled HELPING VALUABLE MESSAGE CONTENT PASS APPARENT MESSAGE FILTERING, naming Edward K. Y. Jung, Royce A. Levien, Robert W. Lord, Mark A. Malamud, William Henry Mangione-Smith and John D. Rinaldo, Jr. as inventors, filed 19 Jun. 2007, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

In one aspect, a method includes but is not limited to causing message content to undergo an evaluation mode at least partly dependent upon one or more message content destinations and indicating at least one outcome of the evaluation mode before detecting an apparent authorization to transmit the message content to the one or more message content destinations. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for causing message content to undergo an evaluation mode at least partly dependent upon one or more message content destinations and circuitry for indicating at least one outcome of the evaluation mode before detecting an apparent authorization to transmit the message content to the one or more message content destinations. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

In one aspect, a method includes but is not limited to obtaining one or more evaluation parameters in association with a message content destination selection and transmitting at least a tentative-message-content evaluation result from an application of the one or more evaluation parameters to tentative-message-content. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining one or more evaluation parameters in association with a message content destination selection and circuitry for transmitting at least a tentative-message-content evaluation result from an application of the one or more evaluation parameters to tentative-message-content. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

In one aspect, a method includes but is not limited to obtaining a content type indication locally of a remote system's apparent content treatment and causing provisional-update-responsive feedback to depend at least partly on the content type indication of the remote system's apparent content treatment. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining a content type indication locally of a remote system's apparent content treatment and circuitry for causing provisional-update-responsive feedback to depend at least partly on the content type indication of the remote system's apparent content treatment. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

In one aspect, a method includes but is not limited to obtaining an indication of one or more message filtering rules and accepting text-containing content after obtaining the indication of the one or more message filtering rules and after an acceptance of a delivery evaluation of the text-containing content. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for obtaining an indication of one or more message filtering rules and circuitry for accepting text-containing content after obtaining the indication of the one or more message filtering rules and after an acceptance of a delivery evaluation of the text-containing content. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

In one aspect, a method includes but is not limited to causing a target-dependent, message-content-dependent delivery evaluation to depend at least partly on an indication of an apparent message filtering rule and signaling a resource allocation at least partly based on an acceptance of the target-dependent, message-content-dependent delivery evaluation. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to circuitry for causing a target-dependent, message-content-dependent delivery evaluation to depend at least partly on an indication of an apparent message filtering rule and circuitry for signaling a resource allocation at least partly based on an acceptance of the target-dependent, message-content-dependent delivery evaluation. In addition to the foregoing, other system aspects are described in the claims, drawings, and text forming a part of the present disclosure.

In addition to the foregoing, various other method and/or system and/or program product and/or physical carrier aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 1 depicts an exemplary environment in which one or more technologies may (optionally) be implemented.

FIG. 2 depicts a high-level logic flow of an operational process.

FIG. 3 depicts an exemplary environment in which one or more technologies may be implemented.

FIG. 4 depicts a high-level logic flow of an operational process.

FIG. 9 depicts an exemplary environment in which one or more technologies may be implemented.

FIG. 10 depicts a high-level logic flow of an operational process.

FIGS. 11-23 depict other exemplary environments in each of which one or more technologies may be implemented.

DETAILED DESCRIPTION

Figure 6:
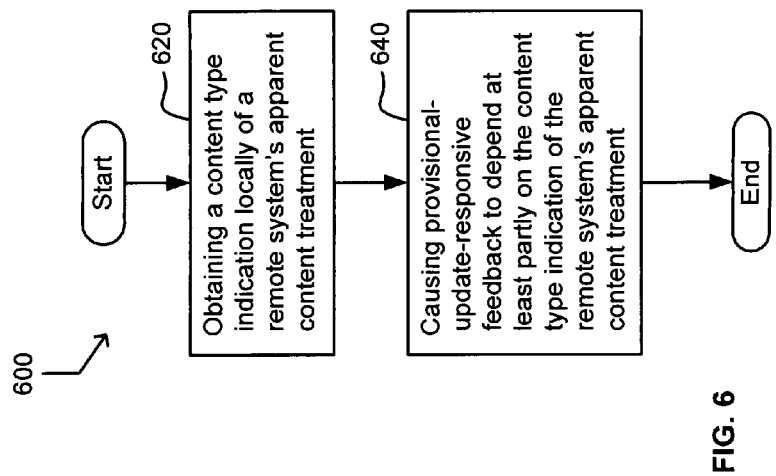
FIG. 6 depicts a high-level logic flow of an operational process.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In the following detailed description, reference is made to the accompanying drawings, which form a part hereof. The use of the same symbols in different drawings typically indicates similar or identical items. The illustrative embodiments described in the detailed description, drawings, and claims are not meant to be limiting. Other embodiments may be utilized, and other changes may be made, without departing from the spirit or scope of the subject matter presented here.

Following are a series of systems and flowcharts depicting implementations of processes. For ease of understanding, the flowcharts are organized such that the initial flowcharts present implementations via an initial "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

With reference now to FIG. 1, shown is an example of a system that may (optionally) serve as a context for introducing one or more processes and/or devices described herein. As shown one or more instances of primary system 120 may be operably (directly or indirectly) coupled with one or more instances of network 160, either directly or indirectly. Network 160 may (optionally) include one or more instances of destinations 165; modes 167, 168; remote systems 170; or intermediaries 180 such as may comprise other systems described with reference to flows herein. (In such embodiments described herein, a "destination" may refer to physical locations of which one or more may be remote from a corresponding primary system.)

Primary system 120 may (optionally) include one or more instances of invocation modules 124, processors 128, authorizations 126, sensors 122, evaluation modules 130, or interfaces 150. Evaluation module 130 may (optionally) include one or more instances of destinations 131, 132, modes 133, 134, or messages 139 that may include content 135, 136, 137, 138. Interface 150 may include one or more instances of input devices 153, results 155, or output devices 157 as described below.

With reference now to FIG. 2, there is shown a high-level logic flow 200 of an operational process. Flow 200 includes operation 250—causing message content to undergo an evaluation mode at least partly dependent upon one or more message content destinations (e.g. invocation module 124 causing one or more destination-dependent evaluation modes 133, 168 to be applied to one or more portions of message 139). This may occur, for example, in embodiments in which evaluation module 130 selects one or more such modes for each such portion in response to one or more respective actual or other potential destinations 131, in which invocation module 124 triggers the selected mode(s), and in which interface 150 obtains one or more results 155 from such evaluations. The invocation of such modes may (optionally) include transmitting one or more portions of such content 135-138 or retrieving one or more modes 167, 168, for example, in the form of parameters or other software. Invocation module 124 can, in some embodiments, request such a mode to be applied remotely—in remote system 170, for example—in response to an evaluation module 130 determining that no such mode is currently available locally (e.g., in primary system 120). Alternatively or additionally, invocation module 124 may be configured to apply one or more modes in response to a destination selection by selection mode 134. The evaluation mode may further depend on one or more instances of past feedback or other events, message content or other attributes, or other determinants described herein.

Flow 200 further includes operation 270—indicating at least one outcome of the evaluation mode before detecting an apparent authorization to transmit the message content to the one or more message content destinations (e.g. interface 150 showing information, advice, or other results 155 of evaluating one or more portions of message 139 by one or more modes 133, 168 in remote system 170 before detecting authorization 126 specifically to transmit any such content either to destination 165 or remote system 170). Such modes may include one or more instances of language or platform determinations, object selections, security protocols, allocation-determinative evaluations, or the like as exemplified herein. Such actual or other apparent authorizations 126 may result from one or more instances of audible or keyed entries, signatures or other security data, automatic or manual user actions, or the like.

In some variants, results 155 may include feedback such as an indication that destination 165 or some other message recipient requires, prefers, limits, ignores, or forbids certain message features. The features may include one or more length thresholds such as 1, 10, 100, or 1000 paragraphs, kilobytes, words, pictures, or the like. They may likewise specify one or more data formats or type identifiers: text, audio, GIF, PDF, WMV, MP3, XLS, HTML, XTML, EXE, WIN, Macintosh, data stream, attachment, or the like. An intended or other recipient can, during a meeting for example, specify one or more policies in effect: ignoring embedded objects and text formatting, disfavoring audio data or messages larger than 10 kilobytes, forbidding video data, or the like.

Alternatively or additionally, the threshold, format, identifier, subject matter or other content aspect, or other feature-specifying criteria may (optionally) be dependent on one or more features of context: sender identifier or class, provisional or prior message content, or the like. While interfacing with a system as described herein, for example, a potential recipient (user) may specify one or more other policies in effect: willingness to receive executable files or image data from a specific composer or group, refusal to accept anything larger than a given size threshold via an intermediary, a prediction that a text-containing document shorter than a page will be reviewed within a few hours of receipt, or the like.

With reference now to FIG. 3, shown is an example of a system that may serve as a context for introducing one or more processes and/or devices described herein. As shown one or more instances of primary system 300 may be operably (directly or indirectly) accessible to one or more users 310 or networks 380. Network 380 may include one or more instances of destinations 333, routers 385, or analysis modules 390. Primary system 300 may include one or more instances of content 303, invocation modules 320, or interfaces 370. Content 303 may include one or more instances of segments 308 or versions 309. Invocation module 320 may include one or more instances of associations 330, analysis modules 340, categories 341, 342, attributes 343, data 344, events 345, or feedback 347, 348. Association 330 may link one or more instances of parameters 331 with destinations 333 or other identifiers 334. Interface 370 may include one or more instances of input devices 371, output devices 372, ports 373, warnings 377, parameters 378, feedback 379, or other results 375.

With reference now to FIG. 4, there is shown a high-level logic flow 400 of an operational process. Flow 400 includes operation 460—obtaining one or more evaluation parameters in association with a message content destination selection (e.g. invocation module 320 receiving or creating an association 330 between parameter 331 and one or more destinations 333 or other identifiers 334). In some embodiments, for example, invocation module 320 may (optionally) be configured to create such associations in response to one or more instances of explicit recipient preference data 344, scheduling data or other recipient attributes 343, requests or similar events 345, delivery failures or other negative intermediary or recipient feedback 347 from prior delivery attempts of message content of the same category, transactions or other positive intermediary or recipient feedback 348 from prior deliveries of message content of the same category 342, analogous data arising from other recipients of the same destination category 341, or the like.

Flow 400 further includes operation 490—transmitting at least a tentative-message-content evaluation result from an application of the one or more evaluation parameters to tentative-message-content (e.g. interface 370 indicating one or more instances of rules, anomaly indicators, warnings 377, or other evaluation results 375 from one or more analysis modules 340, 390 applying the one or more parameters 331 to a tentative segment or other version 309 of content 303). Result 375 may (optionally) contain such a warning, for example, in response to an indication that such content is likely to be more favorably received if a creator of version 309 considers the warning. Executives, judges, teachers, or others who expect to receive voluminous documents may benefit by being able to specify such parameters proactively or to aggregate them over time to facilitate selective feedback 379 as an evaluation result of such tentative message content, for example. Such results may be available during a drafting session, for example, while some or all such message content still has not been authorized for transmission. In some variants, alternatively or additionally, a message composer may operate on a later segment of content with the benefit by a recipient status, a receipt status, or a feedback function update (of an analysis module, for example) resulting from sending an earlier segment of the content. In some variants, moreover, an analysis module may provide feedback relating to tentative content in relation to more than one recipient, such as by providing a result to the effect of "show contacts who would read this immediately," "sort by how much of this message will be read within two hours," or the like. Several other instances of configurations of analysis modules 340, 390 are described herein, for example, many of which are usable for ranking or other modes of selection across a directory of contacts.

Figure 5:
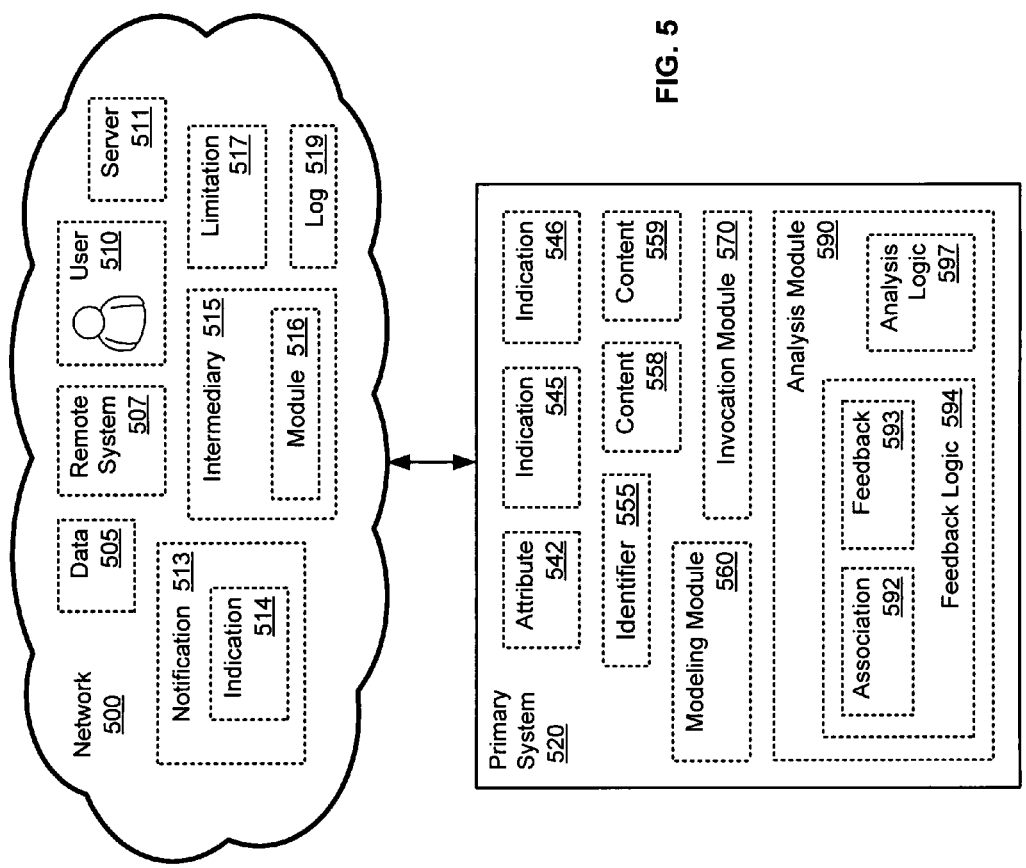
FIG. 5 depicts an exemplary environment in which one or more technologies may be implemented.

With reference now to FIG. 5, shown is an example of a system that may serve as a context for introducing one or more processes and/or devices described herein. As shown one or more portions of network 500 may (optionally) be operably coupled with one or more instances of primary system 520. Network 500 may include one or more instances of data 505, remote systems 507, users 510, servers 511, notifications 513 (which may include one or more indications 514), intermediaries 515 (which may contain one or more modules 516), limitations 517, or logs 519 as described herein. Each instance of primary system 520 may include one or more instances of attributes 542; indications 545, 546; identifiers 555; content 558, 559; modeling modules 560; invocation modules 570; or analysis modules 590. Each instance of analysis module 590 may include one or more instances of feedback logic 594 or analysis logic 597. Each instance of feedback logic 594 may access or otherwise effectively include one or more instance of associations 592 or feedback 593.

With reference now to FIG. 6, there is shown a high-level logic flow 600 of an operational process. Flow 600 includes operation 620—obtaining a content type indication locally of a remote system's apparent content treatment (e.g. modeling module 560 receiving or otherwise obtaining one or more indications 545, 546 as to how remote system 507 or its intermediaries apparently respond to one or more types of content 558 transmitted to them, including one or more type indications 546). In many contexts, a model of one or more such systems may be obtained, for example, by how they claim to treat content, by how they treated past content, by a cautious assumption, by having one or more attributes in common with other such systems with a defined model, or the like. Such attributes may include client attributes, platform designations or other hardware or software attributes, session attributes, organizational affiliation attributes, or the like. Such models and other attributes may each relate to subject matter categories or other content types, which types may be used for generating feedback according to a type of content 559 under evaluation. Alternatively or additionally, such models and any type indications 546 to which they relate may be updated in response to subsequent observations or other updates.

Flow 600 further includes operation 640—causing provisional-update-responsive feedback to depend at least partly on the content type indication of the remote system's apparent content treatment (e.g. feedback logic 594 selecting or otherwise generating feedback 593 at least in response to one or more types of update-containing content 558, 559). Alternatively or additionally, other parts of analysis module 590 may perform operation 640 by adapting feedback logic 594 to make it depend at least partly on one or more type indications 546, which may or may not precipitate changes to feedback 593 directly. In some variants, moreover, network 500 or the like may include a remote instance of feedback logic 594 or analysis module 590 such that invocation module 570 may perform operation 640 by an appropriate invocation of such modules.

Figure 7:
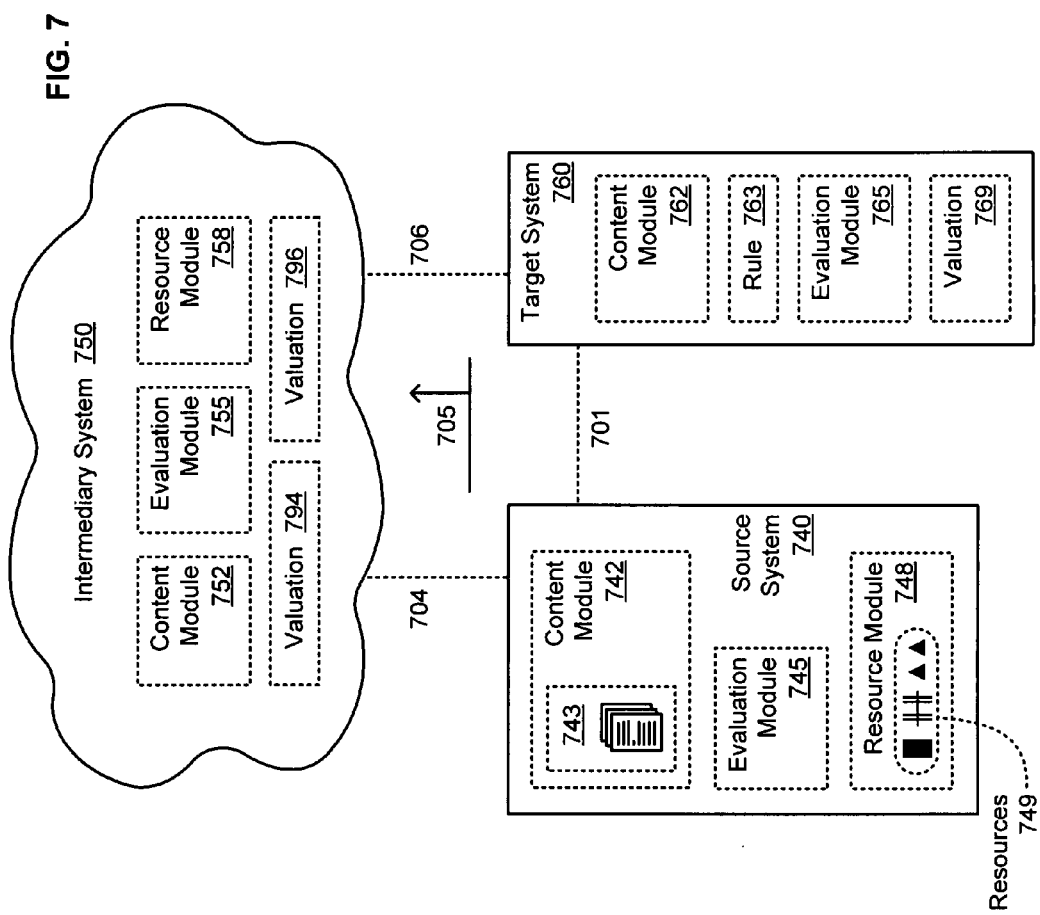
FIG. 7 depicts an exemplary environment in which one or more technologies may be implemented.

With reference now to FIG. 7, shown is an example of a system that may serve as a context for introducing one or more processes and/or devices described herein. As shown one or more instances of source system 740 may be operably coupled with one or more instances of target system 760, either directly (e.g. through passive-media linkage 701) or indirectly (e.g. via a data path 705 through intermediary system 750 and passive-media linkages 704, 706). Source system 740 may include one or more instances of content module 742 (e.g., with text-containing content 743), evaluation module 745, or resource module 748. Resource module 748 may control one or more types of resources 749 such as storage or processing devices, access time on such devices, valuable data, reporting or other access services relating to such data, "credits" or similar artificial units of currency, communication services, accounts for tracking such items, or the like. Intermediary system 750 may likewise include one or more instances of content modules 752, evaluation modules 755, resource modules 758, as well as valuations 794, 796, optionally in an arrangement of data aggregators, a network, or some other distributed configuration. Target system 760 may also include one or more instances of content modules 762, message filtering rules 763 (e.g. expressed as a software configuration), evaluation modules 765, or valuations 769 as described below.

Figure 8:
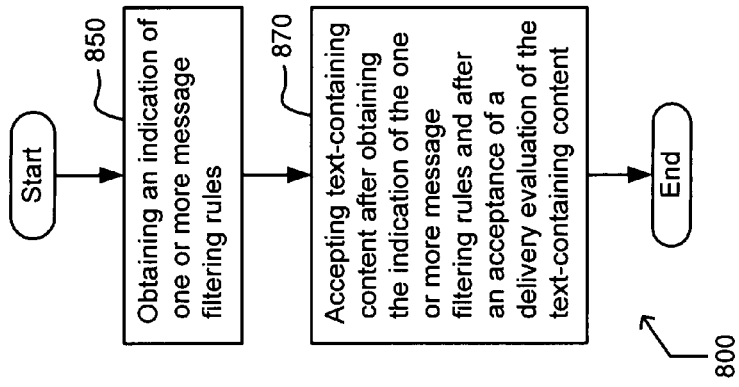
FIG. 8 depicts a high-level logic flow of an operational process.

With reference now to FIG. 8, there is shown a high-level logic flow 800 of an operational process. Flow 800 includes operation 850—obtaining an indication of one or more message filtering rules (e.g. evaluation module 755 of intermediary system 750 receiving an indication of message filtering rule 763 or otherwise becoming aware of a message filtering rule that might affect a future delivery of content 743 to target system 760). For example, rule 763 may cause a delivery error message, a warning that content 743 is too long or is in an unacceptable format, an indication that content 743 is apparently unsuitable for one or more users of target system 760, or other indications as described herein. Alternatively or additionally, the indication may include a definition or summary of rule 763, an error message or other output from rule 763, a data aggregation indicating an installation of rule 763, or the like. Alternatively or additionally, one or more of evaluation modules 745, 755, 765 may receive an expression of the message filtering rule 763 as the indication. This may occur, for example, in embodiments in which one or more evaluation modules 745, 755 implement rule 763 to serve needs or preferences identified in association with target system 760, optionally in lieu of target system 760 implementing rule 763.

Flow 800 further includes operation 870—accepting text-containing content after obtaining the indication of the one or more message filtering rules and after an acceptance of a delivery evaluation of the text-containing content (e.g. evaluation module 755 accepting text-containing content 743 after accepting valuation 794 as sufficiently high for target system 760, and also after operation 850). For example, such a conclusion may be obtained as a result of determining that valuation 796 is smaller than, or about equal to valuation 794, derived by or on behalf of target system 760. Alternatively, evaluation module 755 may optionally choose a value for valuation 796 arbitrarily between valuation 794 and valuation 769, in circumstances in which those two values are within about 20%. Other modes of arbitration are available to those skilled in the art, and may readily be implemented in evaluation module 755 in light of these teachings.

In other variants, evaluation module 745 or evaluation module 765 may likewise measure valuations provided by the other against shortages, preferences, or other considerations that may affect a local valuation acceptance decision. In a circumstance in which target system 760 has a computational power shortage, for example, a computation-intensive delivery valuation (expressed in session minutes or computations, for example that would be insufficient in a normal decision mode) may become acceptable. In some variants, source system 740 or target system 760 may thus experience such a shortage-mode or saturation-mode with regard to specific resources, or different modes with respect to each type of resource. Source system 740 may, for example, value a delivery to a class of target systems 760 to include an enhanced amount of storage access for each of several conditions present there: a storage-saturation mode, a delivery-shortage mode, or the like. Similar examples will be apparent to those skilled in the art in light of these teachings.

With reference now to FIG. 9, shown is an example of a system that may serve as a context for introducing one or more processes and/or devices described herein. As shown one source system 940 is operably coupled (directly or indirectly via linkage 904) with target system 950, and may also be operably coupled with one or more other target systems 970, 980. Source system 940 may (optionally) include one or more instances of response modules 943, content modules 945, evaluation modules 947, or resource modules 948. Target system 950 may include one or more instances of response modules 953, evaluation modules 957, or resource modules 958. Target system 970 may include one or more instances of content module 973 or evaluation module 977. Target system 980 may include one or more instances of processors 981, content modules 983, or evaluation modules 987. These systems may implement special-purpose hardware or handle special-purpose software or the like, for example, as shown and described with reference to indications 941, 942, 951, 952; content 944; valuations 946, 956, 976, 986; allocations 949, 959; modes 954, 955, 974, 975; rules 971, 972, 982; or the like.

With reference now to FIG. 10, there is shown a high-level logic flow 1000 of an operational process. Flow 1000 includes operation 1060—causing a target-dependent, message-content-dependent delivery evaluation to depend at least partly on an indication of an apparent message filtering rule (e.g. one or more response modules 943, 953 triggering or otherwise causing a configuration of one or more evaluation modes 954, 974, 975 in a manner that depends upon one or more filtering rule indications 941, 951, 952). This may occur, for example, in embodiments in which the configuration depends upon one or more target systems 950, 970, 980 (via software or other data they provide or their identifiers, for example) and upon one or more attributes of message content 944 to be delivered. One or more evaluation module(s) 947, 957 may be configured to increase one or more valuations 946, 956 in response to a delivery failure of the subject content, for example, or a message having one or more attributes in common with the subject content. Alternatively or additionally, such modes may be configured in an original installation, as a parametric or other adaptation of a preexisting mode, or as other modes of updating as are described herein. Such evaluation modes 954, 955 may optionally be configured during or before being invoked.

In some circumstances, for example, source system 940 may be configured to deliver content 944 to one or more target systems 950, 970. In response to user indications of one or more of an elevated importance, difficulty, or urgency of such delivery, valuation 946 may be set to a higher-than-nominal value for delivery to each of the specified target systems 950, 970. Such valuation 946 is compared against a respective valuation 956, 976 of delivery to each, optionally determined in light of attributes of content 944 as described herein. One or more of the evaluation modules 947, 957, 977 then use the comparison results to determine which, if any, of the specified target systems 950, 970 will receive the one or more allocations 949 for accepting content 944. In one implementation, for example, one or more of the evaluation modules 947, 957 has an evaluation mode 955 by which each potential recipient provides one or more instances of valuation 956, 976, the smallest of which determines allocation 949. Alternatively or additionally, such allocation(s) 949 may depend on whether any of the target valuations 956, 976 exceed a minimum threshold relating to valuation 946.

Alternatively or additionally, distribution may occur in stages. Target system 950 may receive content 944, in some embodiments or other circumstances in which target system 950 subsequently decides whether to relay content 944 on to other target systems 970, 980. This may occur, for example, in embodiments in which content 944 cannot be read or otherwise processed properly at target system 950. To avoid such a failure, for example, resource module 958 may cause another allocation 959 to accompany the relayed content 944 for processing by one or more target systems 970, 980. Those skilled in the art will be able to implement such a system, for example, in a network in which human or machine work is able to move relatively fluidly toward capacities able to perform the work cost-effectively by temporizing in independent intermediary systems.

Alternatively or additionally, in some variants, target system 950 may participate in transactions to support a content transfer without receiving even half of content 944. In some modes, for example, target system 950 may authenticate, compare, authorize, relay, or otherwise handle one or more valuations 956 from one or more source systems 940 or other target systems. Target system 950 may likewise include one or more instances of accounts or other resource modules 958 from which one or more allocations 959 may be made, even without target system 950 ever receiving any of content 944 designated for potential distribution to target systems 970, 980.

Flow 1000 also includes operation 1080—signaling a resource allocation at least partly based on an acceptance of the target-dependent, message-content-dependent delivery evaluation (e.g. one or more resource modules 948, 958 authorizing, performing, or otherwise indicating resource allocations 949, 959 in response to one or more evaluation modules 957, 987 accepting valuation 946). Alternatively or additionally, one or more evaluation modules 987 may generate valuation 986 before or in response to valuation 946 being obtained, so that an evaluation module owned by source system 940 may decide whether to signal such an acceptance (as valuation 956, for example, in some embodiments).

With reference now to FIG. 11, shown is an example of a system that may serve as a context for introducing one or more processes and/or devices described herein. System 1100 may be implemented as a stand-alone or distributed system, as exemplified herein. As shown system 1100 includes one or more instances of evaluation modules 1130; processors 1144, 1146; sensors 1148 effectively operable for receiving authorizations 1147; or interfaces 1150. Each valuation module 1130 may include one or more instances of mode selection logic 1101; content 1110; invocation modules 1111; code 1112; updates 1113; controllers 1114, 1124; functions 1116, 1117; aggregators 1121; prediction logic 1125 effectively operable for providing indications 1128; aggregations 1131; or destination lists 1136 of one or more destinations 1137, 1138, 1139. Each mode selection logic 1101 may include one or more instances of modes 1102, 1103, 1104, 1105, 1107 of which one or more modes may include one or more rules 1108, 1109. Each aggregation 1131 may include one or more instances of items 1132, parameters 1133, or event indicators 1134, 1135. Each interface 1150 may include one or more instances of input devices 1159, output devices 1160, displays 1165 each operable for displaying one or more images 1167, or results 1189. Each keyboard, pointing device, microphone, image capture device, or other input device 1159 may include one or more instances of user actions 1152, security data 1154, identifiers 1156, or other entries 1157 such as those described herein. Each output device may similarly include one or more descriptors 1162. Each result may include one or more instances of predictive information 1181, object identifiers 1182, verbal information 1183, information 1185, advice 1186, feedback 1187, levels 1188 or the like. Further information is provided below, especially with reference to FIGS. 24-25. Any such components may, of course, include other components such as those shown in FIGS. 12-23 and described below.

Figure 12:
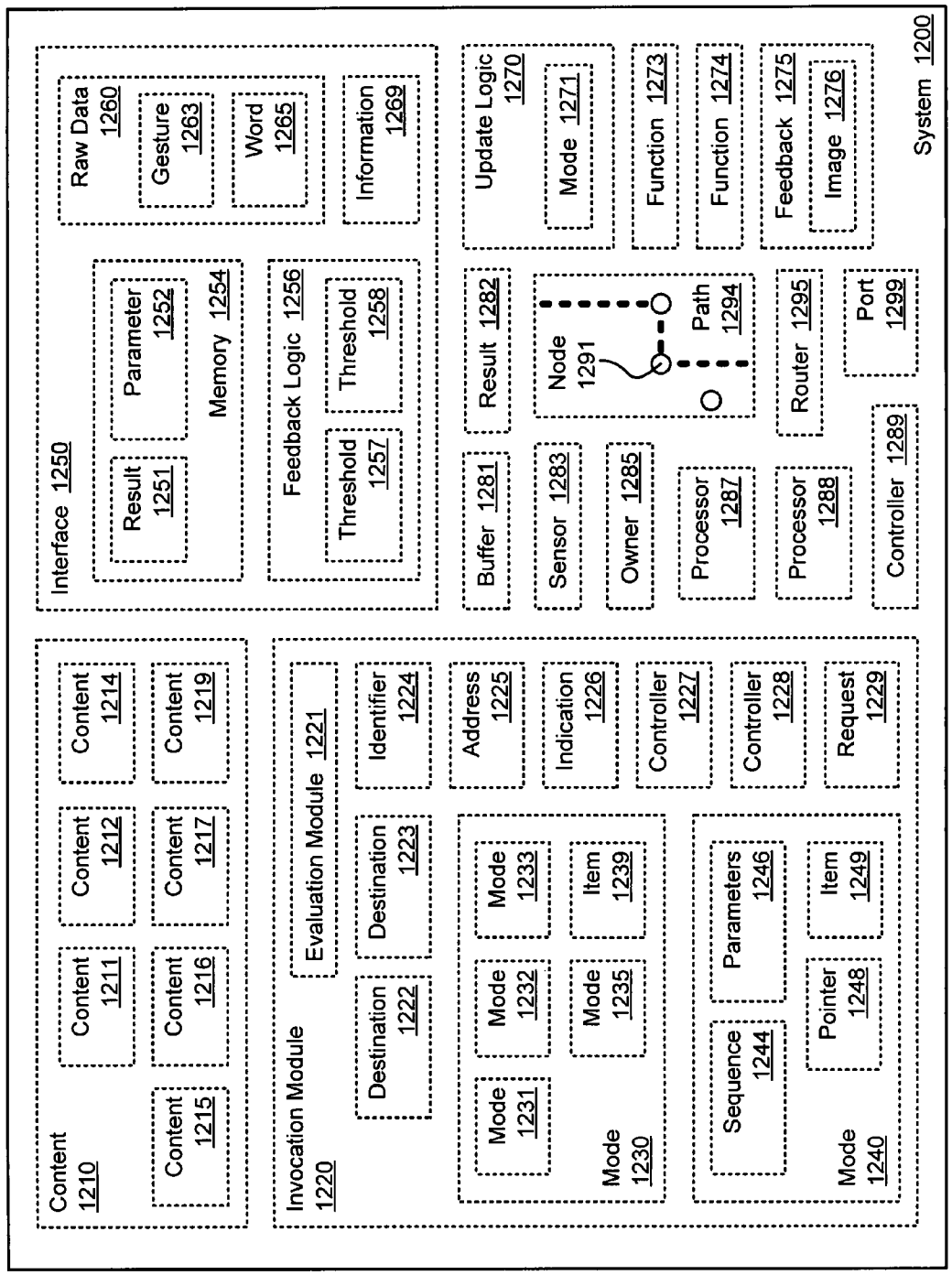

With reference now to FIG. 12, shown is an example of a system that may serve as a context for introducing one or more processes and/or devices described herein. System 1200 may be implemented as a stand-alone or distributed system, as exemplified herein. As shown system 1200 includes one or more instances of content 1211, 1212, 1214, 1215, 1216, 1217, 1219 (optionally within or among content 1210); invocation modules 1220; interfaces 1250; logic 1270 operable for handling one or more modes 1271; functions 1273, 1274; one or more images 1276 or other feedback 1275; buffers 1281; results 1282; sensors 1283; owners 1285; processors 1287, 1288; controllers 1289; nodes 1291 identified in one or more signal paths 1294; routers 1295; or ports 1299. Each invocation module 1220 may include one or more instances of evaluation modules 1221; destinations 1222, 1223; addresses 1225 or other identifiers 1224; indications 1226; controllers 1227, 1228; requests 1229; or modes 1230, 1240. Each instance of mode 1230 may include one or more instances of modes 1231, 1232, 1233, 1235 or other items 1239. Each instance of mode 1240 may likewise include one or more instances of sequences 1244, parameters 1246, pointers 1248, and items 1249. Each instance of interface 1250 may include one or more instances of memories 1254; feedback logic 1256 operable for handling one or more thresholds 1257, 1258; raw data 1260; or information 1269. Each instance of memory 1254 may include one or more instances of results 1251 or parameters 1252. Each instance of raw data 1260 may include one or more instances of gestures 1263 or words 1265. Further information is provided below, especially with reference to FIGS. 24-25. Any such components may, of course, include other components such as those shown in FIGS. 13-23 and described below.

Figure 13:
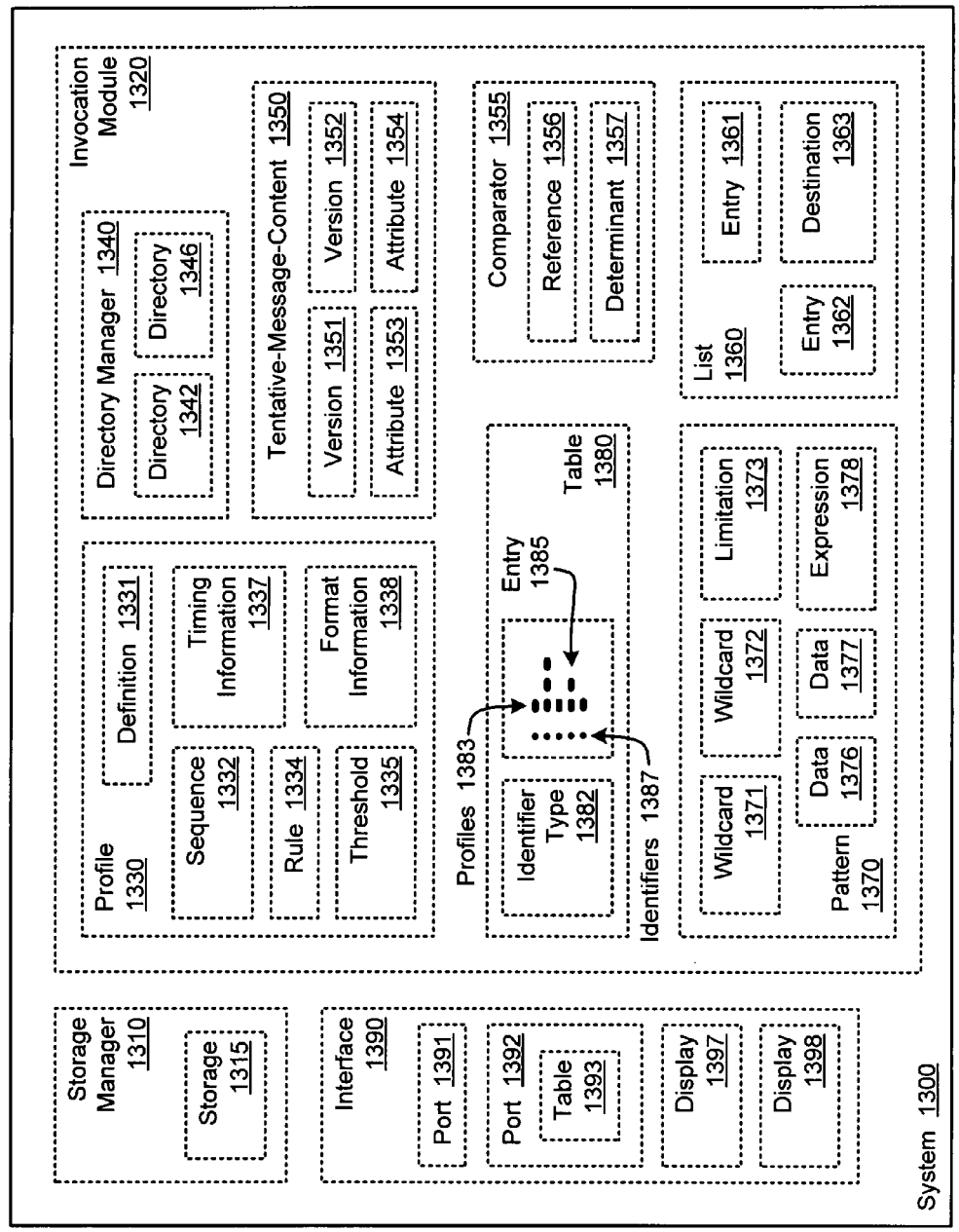

With reference now to FIG. 13, shown is an example of a system that may serve as a context for introducing one or more processes and/or devices described herein. System 1300 may be implemented as a stand-alone or distributed system, as exemplified herein. As shown system 1300 includes one or more instances of storage managers 1310 operable for handling media as described herein (such as storage 1315, for example), invocation modules 1320, or interfaces 1390. Each invocation module 1320 may include one or more instances of profiles 1330, directory managers 1340, tentative-message-content 1350, comparators 1355, lists 1360, patterns 1370, or tables 1380. Each profile 1330 may include one or more instances of definitions 1331, sequences 1332, rules 1334, thresholds 1335, timing information 1337, or format information 1338. Directory manager 1340 may access or otherwise include one or more directories 1342, 1346. Tentative-message-content 1350 may include one or more instances of versions 1351, 1352 or attributes 1353, 1354. Each comparator 1355 may include one or more instances of references 1356 or other determinants 1357. Each list 1360 may include one or more instances of entries 1361, 1362 or destinations 1363. Each pattern 1370 may include one or more instances of wildcards 1371, 1372; limitations 1373; data 1376, 1377; or expressions 1378. Each table 1380 may include one or more instance of identifier types 1382 or profiles 1383 associated with respective identifiers 1387, for example, by inclusion in a common entry 1385 as shown. Each interface 1390 may include one or more instances of ports 1391, 1392 (optionally operable for handling table 1393, for example) or displays 1397, 1398. Further information is provided below, especially with reference to FIG. 26. Any such components may, of course, include other components such as those shown in FIGS. 14-23 and described below.

Figure 14:
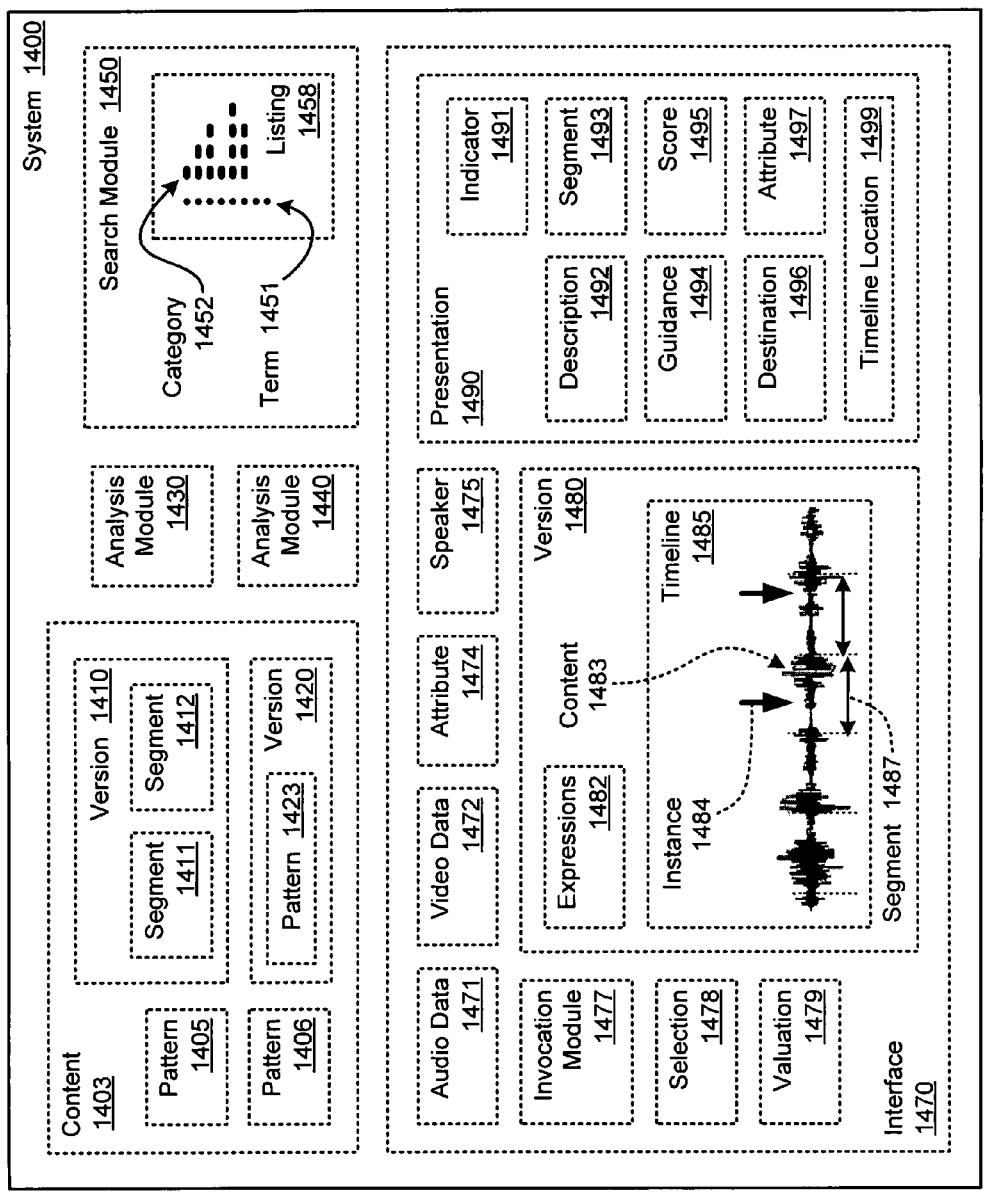

With reference now to FIG. 14, shown is an example of a system that may serve as a context for introducing one or more processes and/or devices described herein. System 1400 may be implemented as a stand-alone or distributed system, as exemplified herein. As shown system 1400 includes one or more instances of content 1403; search modules 1450 or other analysis modules 1430, 1440; or interfaces 1470. Each instance of content 1403 may include one or more instances of patterns 1405, 1406 or versions 1410, 1420. Each version 1410 may include one or more segments 1411, 1412 and/or each version 1420 may include one or more instances of patterns 1423. Each search module 1450 may include one or more instances of listings 1458 mapping one or more terms 1451 with one or more respective categories 1452. Each interface 1470 may include one or more instances of audio data 1471, video data 1472, attributes 1474, speakers 1475, invocation modules 1477, selections 1478, valuations 1479, versions 1480, or presentations 1490. Each version 1480 may include one or more instances of expressions 1482 or timelines 1485. Each timeline 1485 may include one or more instances 1484 (of expression 1482 or other patterns, for example) within content 1483 across a succession of time segments 1487. Each presentation 1490 may include one or more instances of indicators 1491, descriptions 1492, segments 1493, guidance 1494, scores 1495, destinations 1496, attributes 1497, or timeline locations 1499. Further information is provided below, especially with reference to FIG. 26. Any such components may, of course, include other components such as those shown in FIGS. 15-23 and described below.

Figure 15:
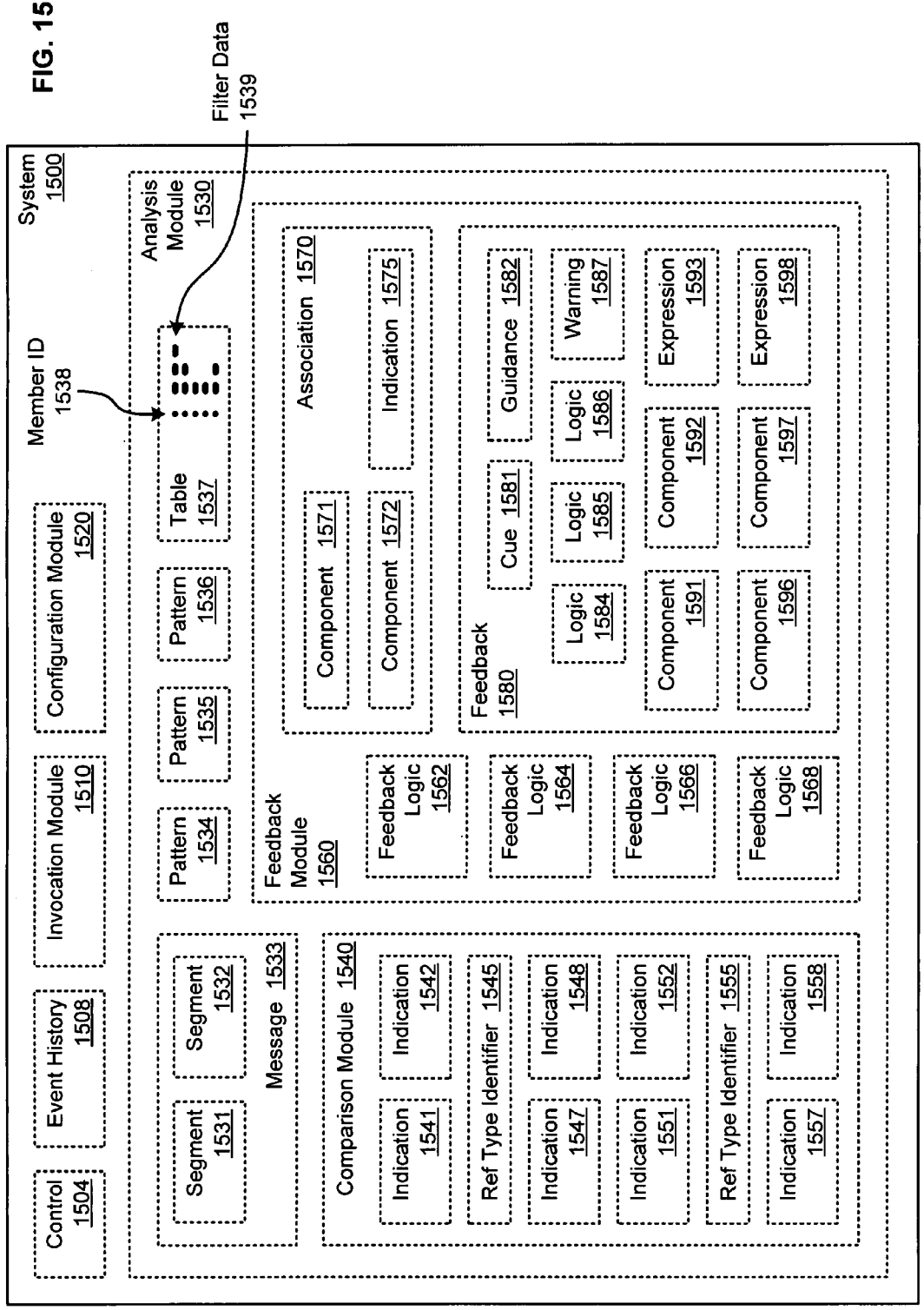

With reference now to FIG. 15, shown is an example of a system that may serve as a context for introducing one or more processes and/or devices described herein. System 1500 may be implemented as a stand-alone or distributed system, as exemplified herein. As shown system 1500 includes one or more instances of controls 1504, event histories 1508, invocation modules 1510, configuration modules 1520, or analysis modules 1530. Each analysis module 1530 may include one or more instances of messages 1533 each in one or more segments 1531, 1532; patterns 1534, 1535, 1536; tables 1537 (mapping one or more member identifiers 1538 respectively to filter data 1539, for example); comparison modules 1540; or feedback modules 1560. Each comparison module 1540 may include one or more instances of indications 1541, 1542, 1547, 1548, 1551, 1552, 1557, 1558 or reference type identifiers 1545, 1555. Each feedback module 1560 may include one or more instances of feedback logic 1562, 1564, 1566, 1568; associations 1570; or feedback 1580. Each association 1570 may map one or more instances of components 1571, 1572 with one or more respective indications 1575, for example. Each instance of feedback 1580 may include one or more instances of cues 1581, guidance 1582; logic 1584, 1585, 1586; warnings 1587; components 1591, 1592, 1596, 1597; or expressions 1593, 1598. Further information is provided below, especially with reference to FIGS. 27-28. Any such components may, of course, include other components such as those shown in FIGS. 16-23 and described below.

Figure 16:
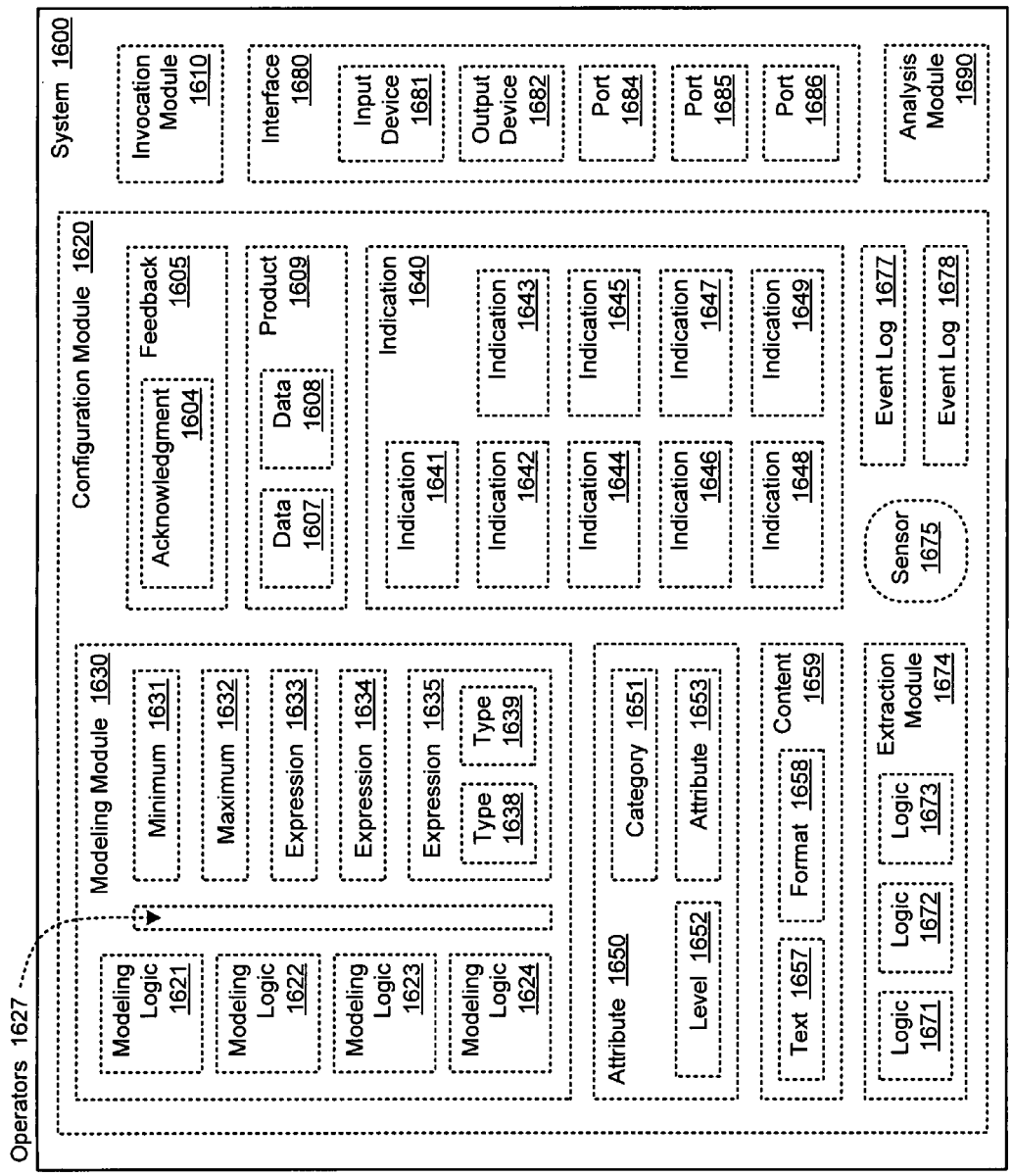

With reference now to FIG. 16, shown is an example of a system that may serve as a context for introducing one or more processes and/or devices described herein. System 1600 may be implemented as a stand-alone or distributed system, as exemplified herein. As shown system 1600 includes one or more instances of invocation modules 1610, configuration modules 1620, interfaces 1680, or analysis modules 1690. Each configuration module 1620 may include one or more instances of acknowledgements 1604 or other feedback 1605; data 1607, 1608 or other products 1609; modeling modules 1630; indications 1641, 1642, 1643, 1644, 1645, 1646, 1647, 1648, 1649 as described herein, within or among indications 1640; categories 1651, levels 1652, or other attributes 1653 within or among attributes 1650; text 1657, formats 1658, or other content 1659; extraction logic 1671, 1672, 1673 of extraction modules 1674, sensors 1675, or event logs 1677, 1678. Each modeling module 1630 may include one or more instances of modeling logic 1621, 1622, 1623, 1624; operators 1627; minima 1631; maxima 1632; expressions 1633, 1634, 1635 such as one or more types 1638, 1639. Each interface 1680 may include one or more instances of input devices 1681; output devices 1682; or ports 1684, 1685, 1686. Further information is provided below, especially with reference to FIGS. 27-28. Any such components may, of course, include other components such as those shown in FIGS. 17-23 and described below.

Figure 17:
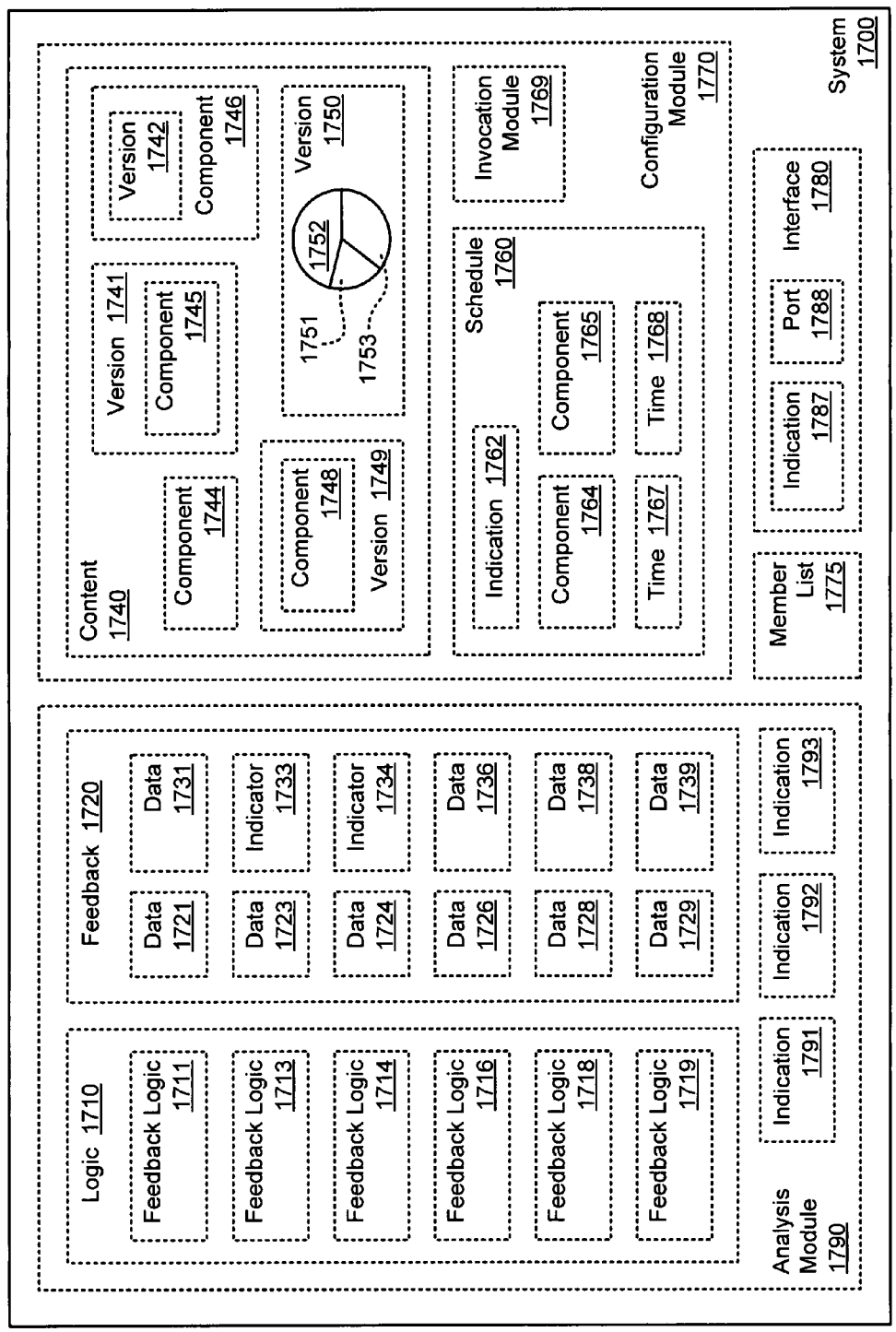

With reference now to FIG. 17, shown is an example of a system that may serve as a context for introducing one or more processes and/or devices described herein. System 1700 may be implemented as a stand-alone or distributed system, as exemplified herein. As shown system 1700 includes one or more instances of configuration modules 1770, member lists 1775, interfaces 1780, or analysis modules 1790. Each configuration module 1770 may include one or more instances of content 1740, schedules 1760, or invocation modules 1769. Each instance of content 1740 may include one or more instances of versions 1741, 1742, 1749, 1750 or components 1744, 1745, 1746, 1748, 1751, 1752, 1753. Each schedule 1760 may include one or more instances of indications 1762; components 1764, 1765; or times 1767, 1768. Each interface 1780 may include one or more instances of indications 1787 or ports 1788. Each analysis module 1790 may include one or more instances of feedback logic 1711, 1713, 1714, 1716, 1718, 1719 within or among logic 1710; data 1721, 1723, 1724, 1726, 1728, 1729, 1731, 1736, 1738, 1739 or indicators 1733, 1734 within or among feedback 1720; or indications 1791, 1792, 1793. Further information is provided below, especially with reference to FIGS. 27-28. Any such components may, of course, include other components such as those shown in FIGS. 18-23 and described below.

Figure 18:
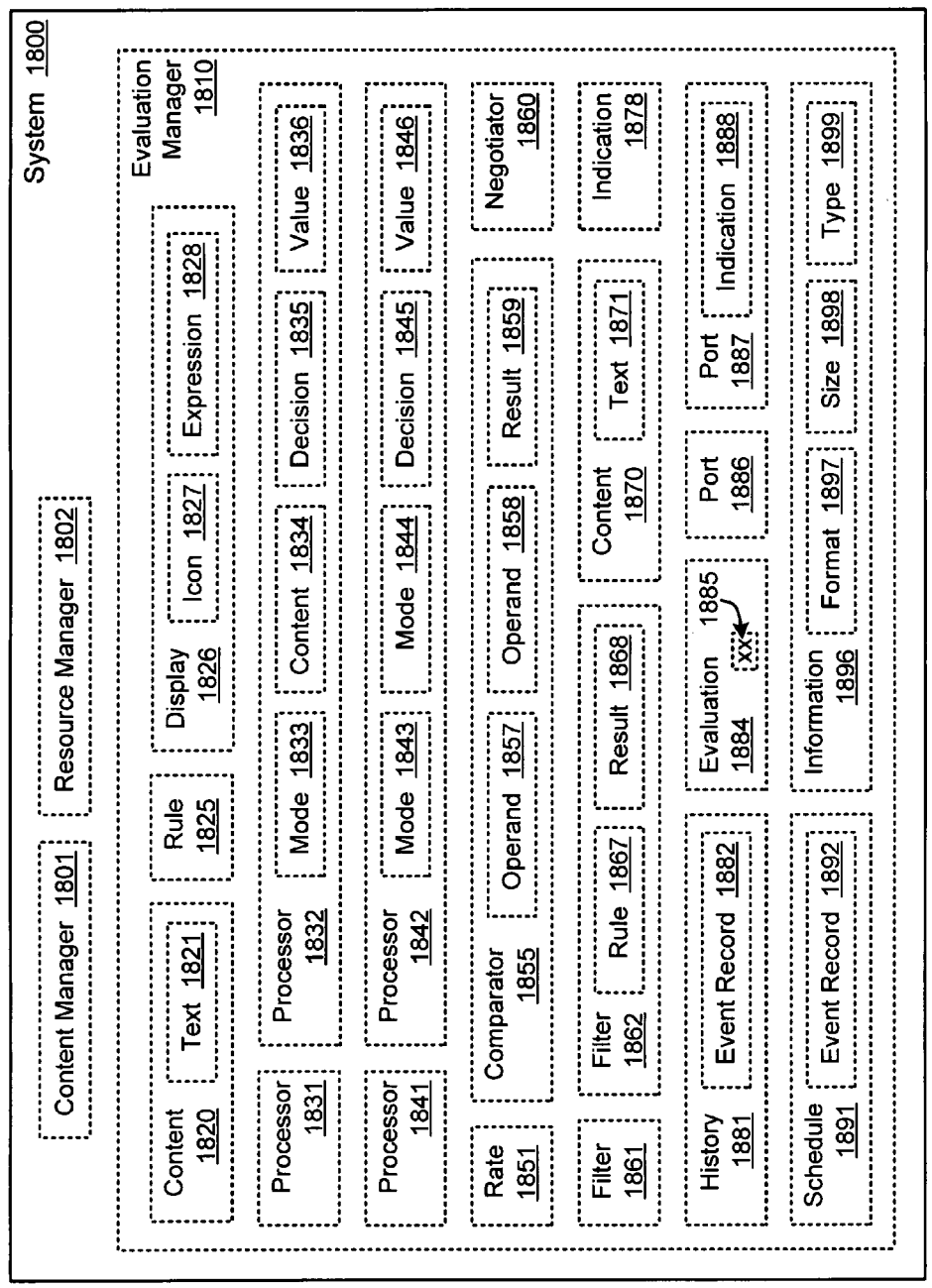
Figure 29:
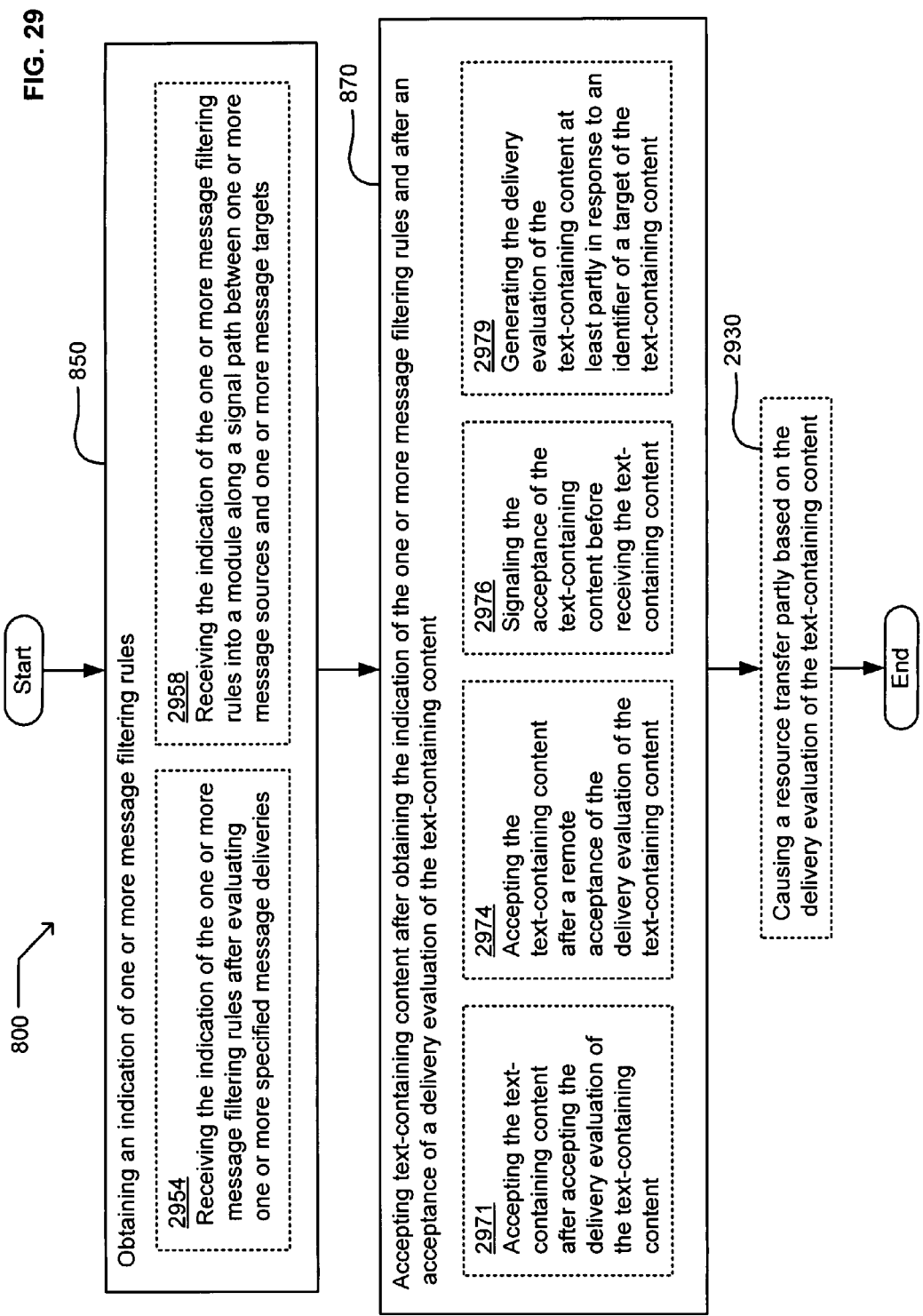
FIG. 29 depicts variants of the flow of FIG. 8.

With reference now to FIG. 18, shown is an example of a system that may serve as a context for introducing one or more processes and/or devices described herein. System 1800 may be implemented as a stand-alone or distributed system, as exemplified herein. As shown system 1800 includes one or more instances of content managers 1801, resource managers 1802, or evaluation managers 1810. Each evaluation manager 1810 may include one or more instances of text 1821, 1871 or other content 1820, 1870; rules 1825; displays 1826; processors 1831, 1832, 1841, 1842; rates 1851, comparators 1855, negotiators 1860; filters 1861, 1862; indications 1878; event records 1882 or other elements of histories 1881; scores 1885 or other evaluations 1884; ports 1886, 1887 operable for handling one or more indications 1888; event records 1892 or other elements of schedules 1891; or information 1896. Each display 1826 may include one or more instances of icons 1827 or other expressions 1828. Each processor 1832, 1842 may include one or more instances of modes 1833, 1843, 1844; content 1834; decisions 1835, 1845; or other values 1836, 1846. Each comparator 1855 may compare two or more instances of operands 1857, 1858 to generate one or more results 1859. Each filter 1862 may include one or more instances of rules 1867 or results 1868. Each instance of information 1896 may include one or more instances of formats 1897, sizes 1898, or types 1899. Further information is provided below, especially with reference to FIG. 29. Any such components may, of course, include other components such as those shown in FIGS. 19-23 and described below.

Figure 19:
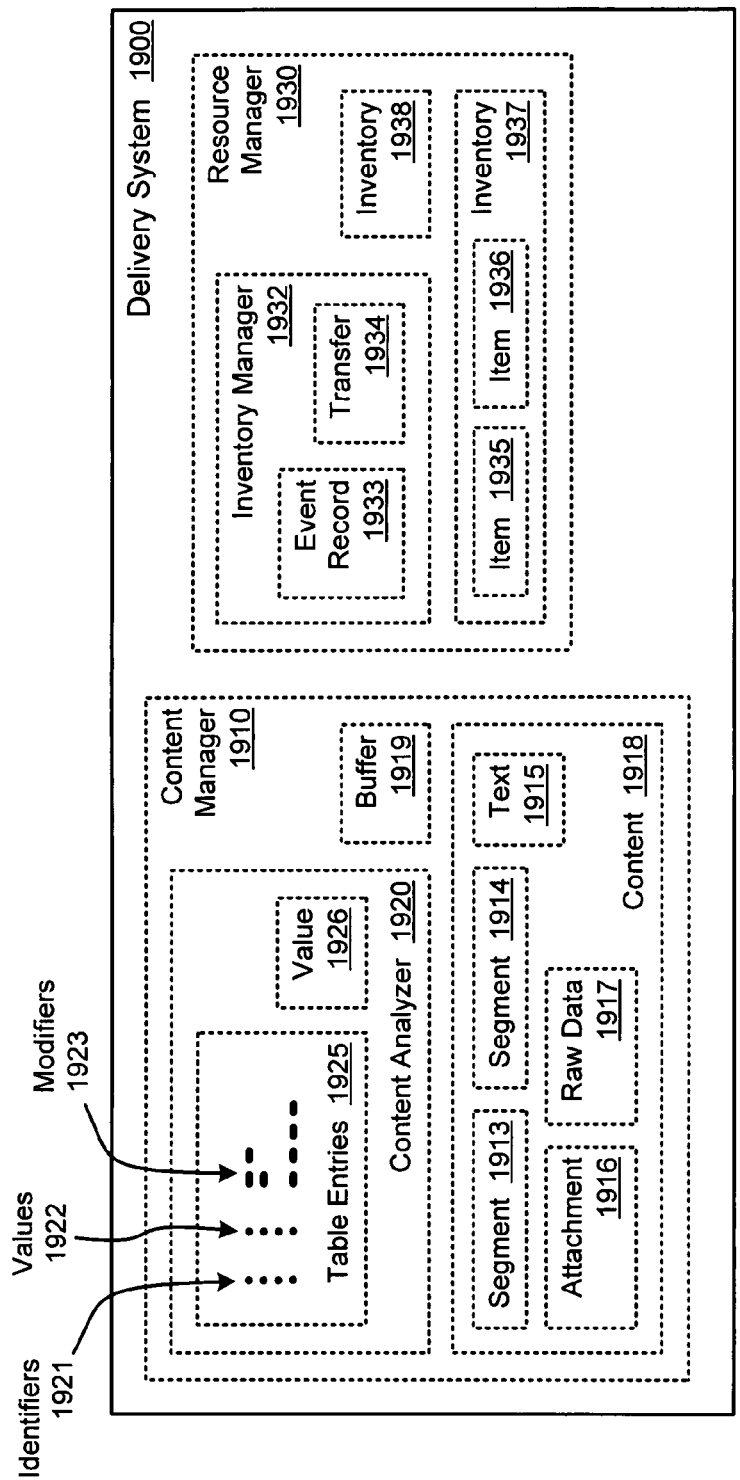

With reference now to FIG. 19, shown is an example of a system that may serve as a context for introducing one or more processes and/or devices described herein. System 1900 may be implemented as a stand-alone or distributed system, as exemplified herein. As shown delivery system 1900 includes one or more instances of content managers 1910 or resource managers 1930. Each resource manager 1930 may include one or more instances of inventory managers 1932 (operable for handling one or more transfers 1934 or other event records 1933). Inventory manager 1932 may remove or transfer one or more items 1935, 1936 from or between inventories 1937, 1938. Each content manager 1910 may include one or more instances of segments 1913, 1914, text 1915, attachments 1916, or other raw data 1917 of content 1918; buffers 1919; or content analyzers 1920. Each content analyzer 1920 may include one or more instances of table entries 1925 mapping identifiers 1921 with one or more values 1922 or modifiers 1923—or other values 1926 as described below. See, for example, the detailed description below relating to FIG. 29. Any such components may, of course, include other components such as those shown in FIGS. 20-23 and described below.

Figure 20:
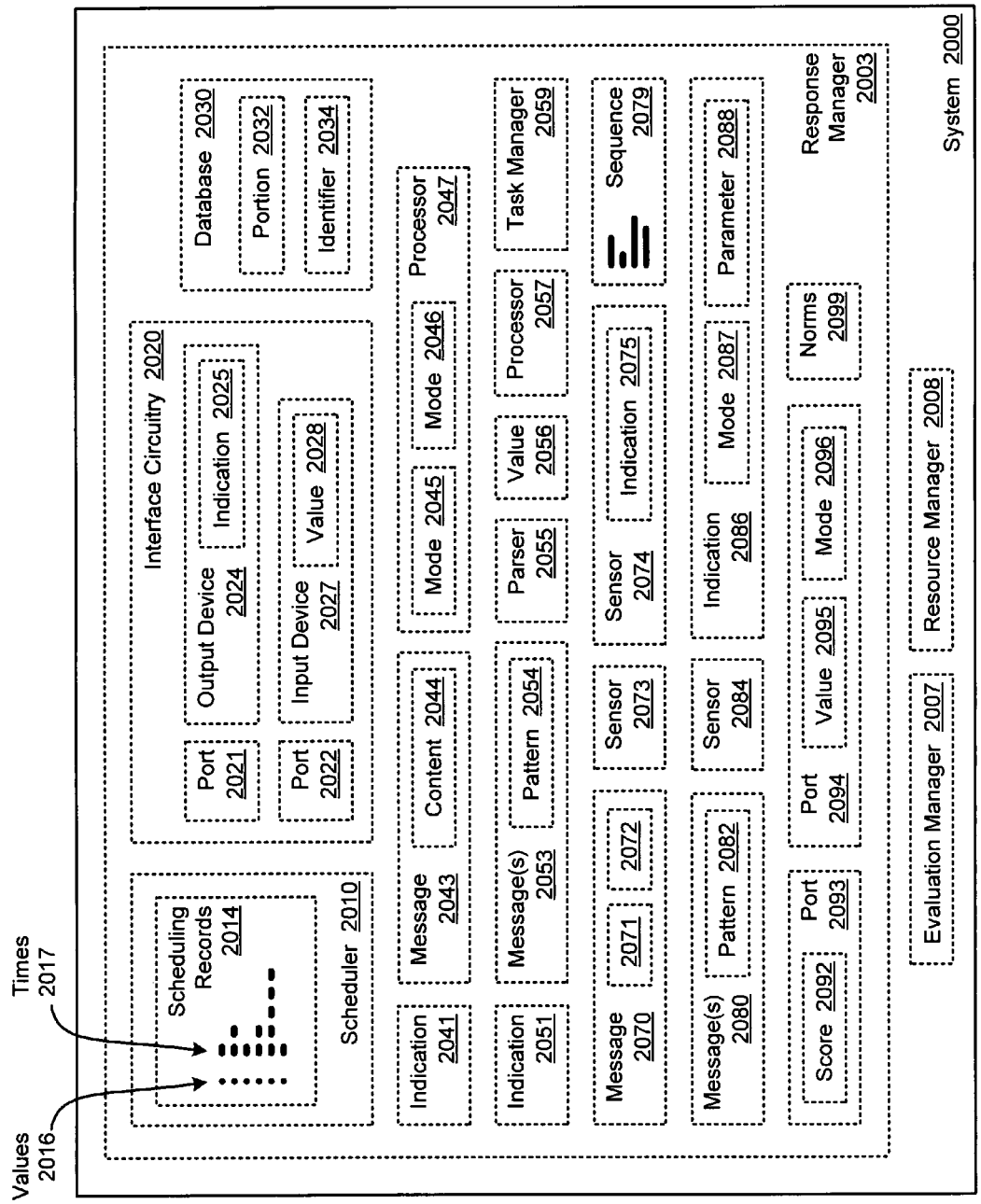

With reference now to FIG. 20, shown is an example of a system that may serve as a context for introducing one or more processes and/or devices described herein. System 2000 may be implemented as a stand-alone or distributed system, as exemplified herein. As shown system 2000 includes one or more instances of response managers 2003, evaluation managers 2007, or resource managers 2008. Each response manager 2003 includes one or more instances of schedulers 2010; interface circuitry 2020; databases 2030; indications 2041, 2051; messages 2043 containing content 2044; patterns 2054 or other content 2053; portions 2071, 2072 of a message 2070; or messages 2080 containing one or more instances of patterns 2082; parsers 2055; values 2056; processors 2047, 2057 (optionally operable for using two or more modes 2045, 2046); task managers 2059; sensors 2073, 2074, 2084 (optionally operable for detecting indications 2075); sequences 2079; modes, parameters 2088, or other indications 2086; ports 2093, 2094 operable for handling one or more scores 2092, values 2095, or modes 2096; or norms 2099. Further information is provided below, especially with reference to FIGS. 30-32. Any such components may, of course, include other components such as those shown in FIGS. 21-23 and described below.

Figure 21:
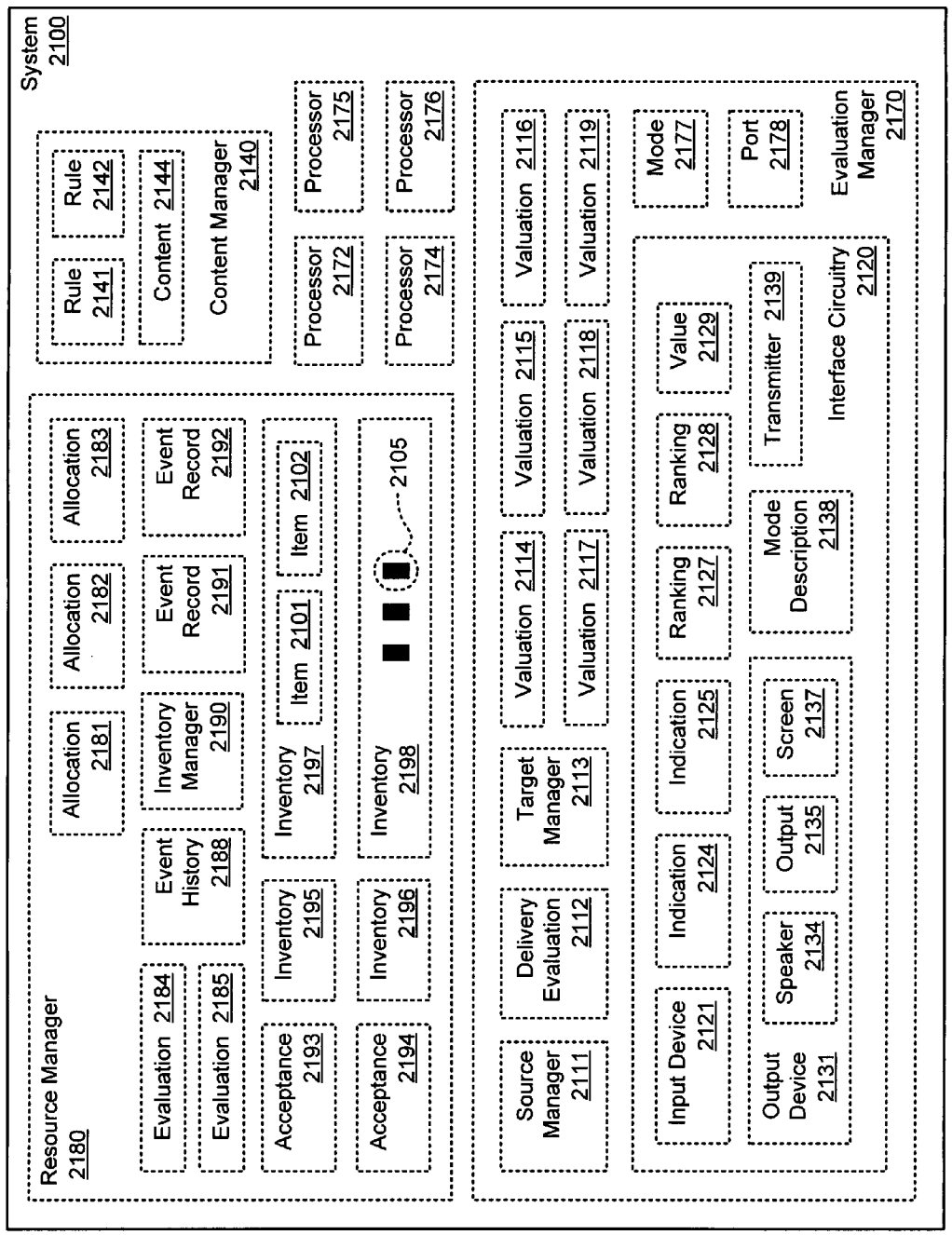

With reference now to FIG. 21, shown is an example of a system that may serve as a context for introducing one or more processes and/or devices described herein. System 2100 may be implemented as a stand-alone or distributed system, as exemplified herein. As shown system 2100 includes one or more instances of content managers 2140 operable for handling rules 2141, 2142 or content 2144; evaluation managers 2170; processors 2172, 2174, 2175, 2176; or resource managers 2180. Each evaluation manager 2170 includes one or more instances of source managers 2111; delivery evaluations 2112; target managers 2113; valuations 2114, 2115, 2116, 2117, 2118, 2119; interface circuitry 2120; modes 2177; or ports 2178. Each interface circuitry 2120 includes one or more instances of input devices 2121; indications 2124, 2125; rankings 2127, 2128; values 2129; outputs 2135 handled by one or more instances of speakers 2134, screens 2135, or other output devices 2131; mode descriptions 2138; or transmitters 2139. Each resource manager 2180 includes one or more instances of allocations 2181, 2182, 2183; evaluations 2184, 2185; event histories 2188; inventory managers 2190; event records 2191, 2192; acceptances 2193, 2194; inventories 2195, 2196, 2197, 2198 able to hold increments 2105 or other items 2102, 2102. Further information is provided below, especially with reference to FIGS. 30-32. Any such components may, of course, include other components such as those shown in FIGS. 22-23 and described below.

Figure 22:
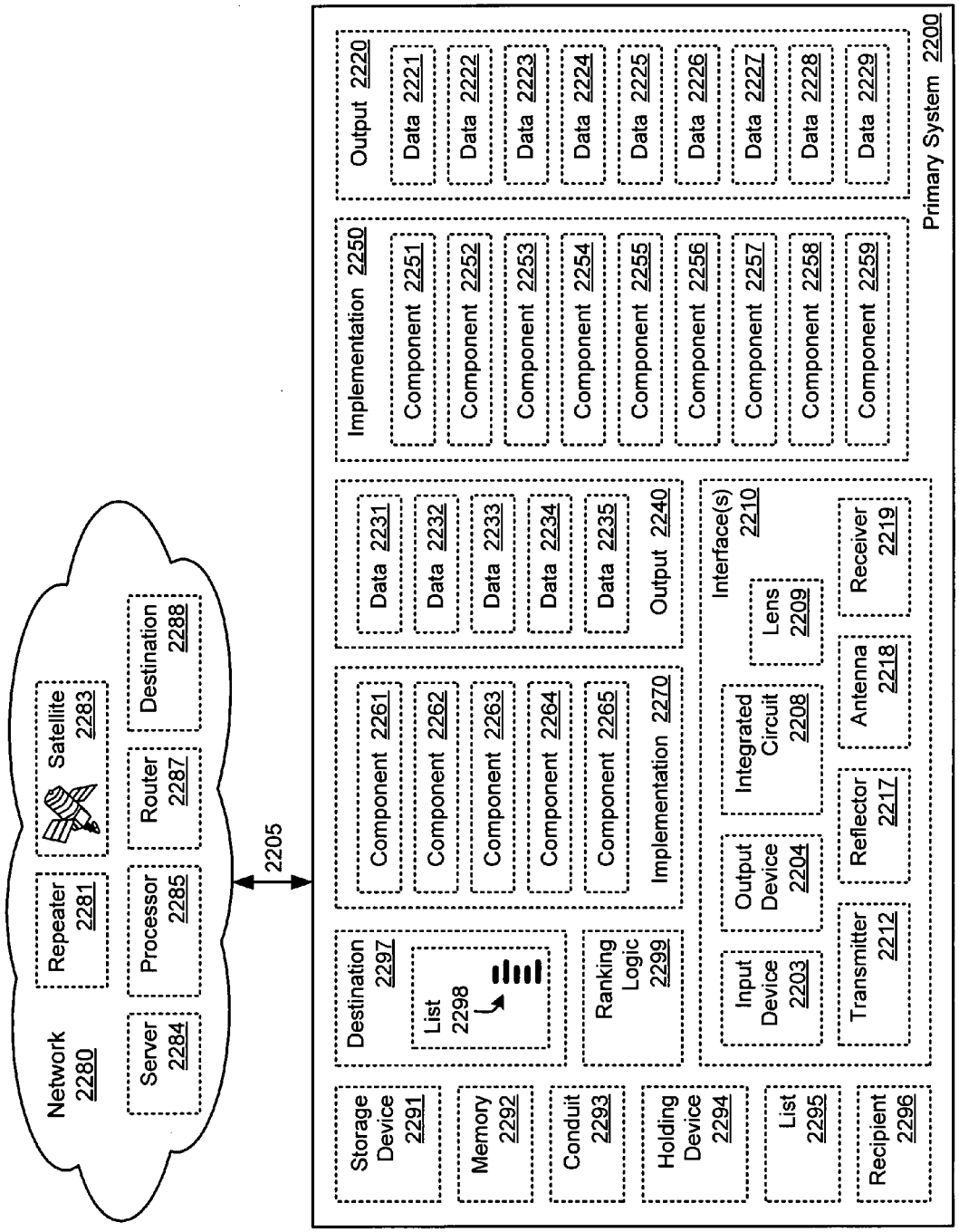

With reference now to FIG. 22, shown is an example of a system that may serve as a context for introducing one or more processes and/or devices described herein. System 2200 may be implemented as a stand-alone or distributed system, as exemplified herein. As shown system 2200 includes one or more instances of outputs 2220, 2230 or implementations 2250, 2270 that may be held or transmitted by interfaces 2210, conduits 2290, storage devices 2291, memories 2292, holding devices 2294, or the like. In various embodiments as described herein, for example, one or more instances of implementation output data 2221, 2222, 2223, 2224, 2225, 2226, 2227, 2228, 2229, 2231, 2232, 2233, 2234, 2235 or implementation components 2251, 2252, 2253, 2254, 2255, 2256, 2257, 2258, 2259, 2261, 2262, 2263, 2264, 2265 may each be expressed in any aspect or combination of software, firmware, or hardware as signals, data, designs, logic, instructions, or the like. The interface(s) 2210 may include one or more instances of input devices 2203, output devices 2204, integrated circuits 2208, lenses 2209, transmitters 2212, reflectors 2217, antennas 2218, receivers 2219, or the like for handling data or communicating with local users or with network 2280 via linkage 2205, for example. Several variants of primary system 2200 are described below with reference to one or more instances of repeaters 2281, communication satellites 2283, servers 2284, processors 2285, routers 2287, or other elements of network 2280.

Those skilled in the art will recognize that some list items may also function as other list items. In the above-listed types of media, for example, some instances of interface(s) 2210 may include conduits 2290, or may also function as storage devices that are also holding devices 2294. Transmitters 2252 may likewise include input devices or bidirectional user interfaces, in many implementations of interface(s) 2210. Each such listed term should not be narrowed by any implication from other terms in the same list but should instead be understood in its broadest reasonable interpretation as understood by those skilled in the art.

Several variants described herein refer to device-detectable "implementations" such as one or more instances of computer-readable code, transistor or latch connectivity layouts or other geometric expressions of logical elements, firmware or software expressions of transfer functions implementing computational specifications, digital expressions of truth tables, or the like. Such instances can, in some implementations, include source code or other human-readable portions. Alternatively or additionally, functions of implementations described herein may constitute one or more device-detectable outputs such as decisions, manifestations, side effects, results, coding or other expressions, displayable images, data files, data associations, statistical correlations, streaming signals, intensity levels, frequencies or other measurable attributes, packets or other encoded expressions, or the like from invoking or monitoring the implementation as described herein.

Referring again to FIG. 2, flow 200 may be performed by one or more instances of server 2284 remote from primary system 2200, for example, but operable to cause output device(s) 2204 to receive and present results via linkage 2205. Alternatively or additionally, device-detectable data 2232 may be borne by one or more instances of signal-bearing conduits 2290, holding devices 2294, integrated circuits 2208, or the like as described herein. Such data may optionally be configured for transmission by a semiconductor chip or other embodiment of integrated circuit 2208 that contains or is otherwise operatively coupled with antenna 2258 (in a radio-frequency identification tag, for example).

In some variants, some instances of flow 200 may be implemented entirely within primary system 2200, optionally as a stand-alone system. Operation 250 may be implemented by configuring component 2261 as logic for causing message content to undergo an evaluation mode at least partly dependent upon one or more message content destinations, for example. This can be accomplished by including special-purpose instruction sequences or special-purpose-circuit designs for this function, for example, in optical or other known circuit fabrication operations, in programming by various known voltage modulation techniques, or otherwise as described herein or known by those skilled in the art. Output data 2231 from such a component in primary system 2200 or network 2280 may be recorded by writing to or otherwise configuring available portions of storage device(s) 2291.

Alternatively or additionally, such specific output data may be transmitted by configuring transistors, relays, or other drivers or conduits 2290 of primary system 2200 to transfer it to component 2262, for example. Component 2262 may perform operation 270 via implementation as logic for indicating at least one outcome of the evaluation mode before detecting an apparent authorization to transmit the message content to the one or more message content destinations, for example. Implementation output data 2232 from such a component in primary system 2200 or network 2280 may be recorded into available portions of storage device(s) 2291 or sent to component 2263, for example. Output 2240 from flow 200 may likewise include other data 2234, 2235 as described herein. Each portion of implementation 2250 may likewise include one or more instances of software, hardware, or the like implementing logic that may be expressed in several respective forms as described herein or otherwise understood by those skilled in the art.

Referring again to FIG. 6, some instance of flow 600 may be implemented entirely within primary system 2200. Operation 620 may be implemented by configuring component 2251 as logic for obtaining a content type indication locally of a remote system's apparent content treatment, for example, such as by including special-purpose instruction sequences or special-purpose-circuit designs for this function. Output data 2221 from such a component in primary system 2200 or network 2280 may be recorded into available portions of storage device(s) 2291 or sent to component 2252, for example. Component 2252 may perform operation 640 via implementation as logic for causing provisional-update-responsive feedback to depend at least partly on the content type indication of the remote system's apparent content treatment, for example. Implementation output data 2222 from such a component in primary system 2200 or network 2280 may be recorded into available portions of storage device(s) 2291 or sent to component 2253, for example. Output 2220 from flow 600 may likewise include other data 2223, 2224 as described herein. Each portion of implementation 2250 may likewise include one or more instances of software, hardware, or the like implementing logic that may be expressed in several respective forms as described herein or otherwise understood by those skilled in the art.

Referring again to FIG. 10, some instance of flow 1000 may be implemented entirely within primary system 2200. Operation 1060 may be implemented by configuring component 2255 as logic for causing a target-dependent, message-content-dependent delivery evaluation to depend at least partly on an indication of an apparent message filtering rule, for example, such as by including special-purpose instruction sequences or special-purpose-circuit designs for this function. Output data 2225 from such a component in primary system 2200 or network 2280 may be recorded into available portions of storage device(s) 2291 or sent to component 2256, for example. Component 2256 may perform operation 1080 via implementation as logic for signaling a resource allocation at least partly based on an acceptance of the target-dependent, message-content-dependent delivery evaluation, for example. Implementation output data 2226 from such a component in primary system 2200 or network 2280 may be recorded into available portions of storage device(s) 2291 or sent to component 2257, for example. Output 2220 from flow 1000 may likewise include other data 2228, 2229 as described herein. Each portion of implementation 2250 may likewise include one or more instances of software, hardware, or the like implementing logic that may be expressed in several respective forms as described herein or otherwise understood by those skilled in the art.

In some embodiments, output device 2204 may indicate an occurrence of flow 200 concisely as a decision, an evaluation, an effect, an hypothesis, a probability, a notification, or some other useful technical result. For example, such "indicating" may comprise such modes as showing, signifying, acknowledging, updating, explaining, associating, or the like in relation to any past or ongoing performance of such actions upon the common item(s) as recited. Such indicating may also provide one or more specifics about the occurrence: the parties or device(s) involved, a description of the method or performance modes used, any sequencing or other temporal aspects involved, indications of resources used, location(s) of the occurrence, implementation version indications or other update-indicative information, or any other such contextual information that may be worthwhile to provide at potential output destinations.

Concise indication may occur, for example, in a context in which at least some items of data 2221-2235 do not matter, or in which a recipient may understand or access portions of data 2221-2235 without receiving a preemptive explanation of how it was obtained. By distilling output 2220 or output 2240 at an "upstream" stage (which may comprise integrated circuit 2208, for example, in some arrangements), downstream-stage media (such as other elements of network 2280, for example) may indicate occurrences of various methods described herein more effectively. Variants of flow 200, for example, may be enhanced by distillations described herein, especially in bandwidth-limited transmissions, security-encoded messages, long-distance transmissions, complex images, or compositions of matter bearing other such expressions.

In some variants, a local implementation comprises a service operable for accessing a remote system running a remote implementation. In some embodiments, such "accessing" may include one or more instances of establishing or permitting an interaction between the server and a local embodiment such that the local embodiment causes or uses another implementation or output of one or more herein-described functions at the server. Functioning as a web browser, remote terminal session, or other remote activation or control device, for example, interface(s) 2210 may interact with one or more primary system users via input and output devices 2203, 2204 so as to manifest an implementation in primary system 2200 via an interaction with server 2284, for example, running a secondary implementation of flow 200. Such local implementations may comprise a visual display supporting a local internet service to the remote server, for example. Such a remote server may control or otherwise enable one or more instances of hardware or software operating the secondary implementation outside a system, network, or physical proximity of primary system 2200. For a building implementing primary system 2200, for example, "remote" devices may include those in other countries, in orbit, or in adjacent buildings. In some embodiments, "running an implementation" may include invoking one or more instances of software, hardware, firmware, or the like atypically constituted or adapted to facilitate methods or functions as described herein. For example, primary system 2200 running an implementation of flow 200 may be a remote activation of a special-purpose computer program resident on server 2284 via an internet browser session interaction through linkage 2205, mediated by input device 2203 and output device 2204.

In some variants, some or all of components 2251-2265 may be borne in various data-handling elements—e.g., in one or more instances of storage devices 2291, in memories 2292 or volatile media, passing through linkage 2205 with network 2280 or other conduits 2290, in one or more registers or data-holding devices 2294, or the like. For example, such processing or configuration may occur in response to user data or the like received at input device 2203 or may be presented at output device 2204. Instances of input devices 2203 may (optionally) include one or more instances of cameras or other optical devices, hand-held systems or other portable systems, keypads, sensors, or the like as described herein. Output device(s) 2204 may likewise include one or more instances of image projection modules, touch screens, wrist-wearable systems or the like adapted to be worn while in use, headphones and speakers, eyewear, liquid crystal displays (LCDs), actuators, lasers, organic or other light-emitting diodes, phosphorescent elements, portions of (hybrid) input devices 2203, or the like.

A device-detectable implementation of variants described herein with reference to flows 200, 600, 1000, for example, may be divided into several components 2251-2265 carried by one or more instances of active modules such as signal repeaters 2281, communication satellites 2283, servers 2284, processors 2285, routers 2287, or the like. For example, in some embodiments, component 2262 may be borne by an "upstream" module (e.g., repeater 2281 or the like) while or after component 2261 is borne in a "downstream" module (e.g., another instance of repeater 2281, communication satellite 2283, server 2284, or the like). Such downstream modules may "accept" such bits or other portions of implementation 2250 or implementation 2270 sequentially, for example, such as by amplifying, relaying, storing, checking, or otherwise processing what was received actively. Sensors and other "upstream" modules may likewise "accept" raw data, such as by measuring physical phenomena or accessing one or more databases.

In some embodiments, a medium bearing data (or other such event) may be "caused" (directly or indirectly) by one or more instances of prior or contemporaneous measurements, decisions, transitions, circumstances, or other causal determinants. Any such event may likewise depend upon one or more other prior, contemporaneous, or potential determinants, in various implementations as taught herein. In other words, such events may occur "in response" to both preparatory (earlier) events and triggering (contemporaneous) events in some contexts. Output 2240 may result from more than one component of implementations 2250, 2270 or more than one operation of flow 200, for example.

In some embodiments, such integrated circuits 2208 may comprise transistors, capacitors, amplifiers, latches, converters, or the like on a common substrate of a semiconductor material, operable to perform computational tasks or other transformations. An integrated circuit may be application-specific ("ASIC") in that it is designed for a particular use rather than for general purpose use. An integrated circuit may likewise include one or more instances of memory circuits, processors, field-programmable gate arrays (FPGA's), antennas, or other components, and may be referred to as a system-on-a-chip ("SoC").

In some embodiments, one or more instances of integrated circuits or other processors may be configured to perform auditory pattern recognition. In FIG. 22, for example, instances of the one or more input devices 2203 may include a microphone or the like operable to provide auditory samples in data 2231-2239. Some form or portion of such output may be provided remotely, for example, to one or more instances of neural networks or other configurations of remote processors 2285 operable to perform automatic or supervised speech recognition, selective auditory data retention or transmission, or other auditory pattern recognition, upon the samples. Alternatively or additionally such sound-related data may include annotative information relating thereto such as a capture time or other temporal indications, capture location or other source information, language or other content indications, decibels or other measured quantities, pointers to related data items or other associative indications, or other data aggregations or distillations as described herein.

In some embodiments, one or more instances of integrated circuits or other processors may be configured for optical image pattern recognition. In FIG. 22, for example, instances of lenses 2209 or other input devices 2203 may include optical sensors or the like operable to provide one or more of geometric, hue, or optical intensity information in data 2231-2239. Some form or portion of such output may be provided locally, for example, to one or more instances of optical character recognition software, pattern recognition processing resources, or other configurations of integrated circuits 2208 operable to perform automatic or supervised image recognition, selective optical data retention or transmission, or the like. Alternatively or additionally such image-related data may include annotative information relating thereto such as a capture time or other temporal indications, capture location or other source information, language or other content indications, pointers to related data items or other associative indications, or other data aggregations or distillations as described herein.

Figure 23:
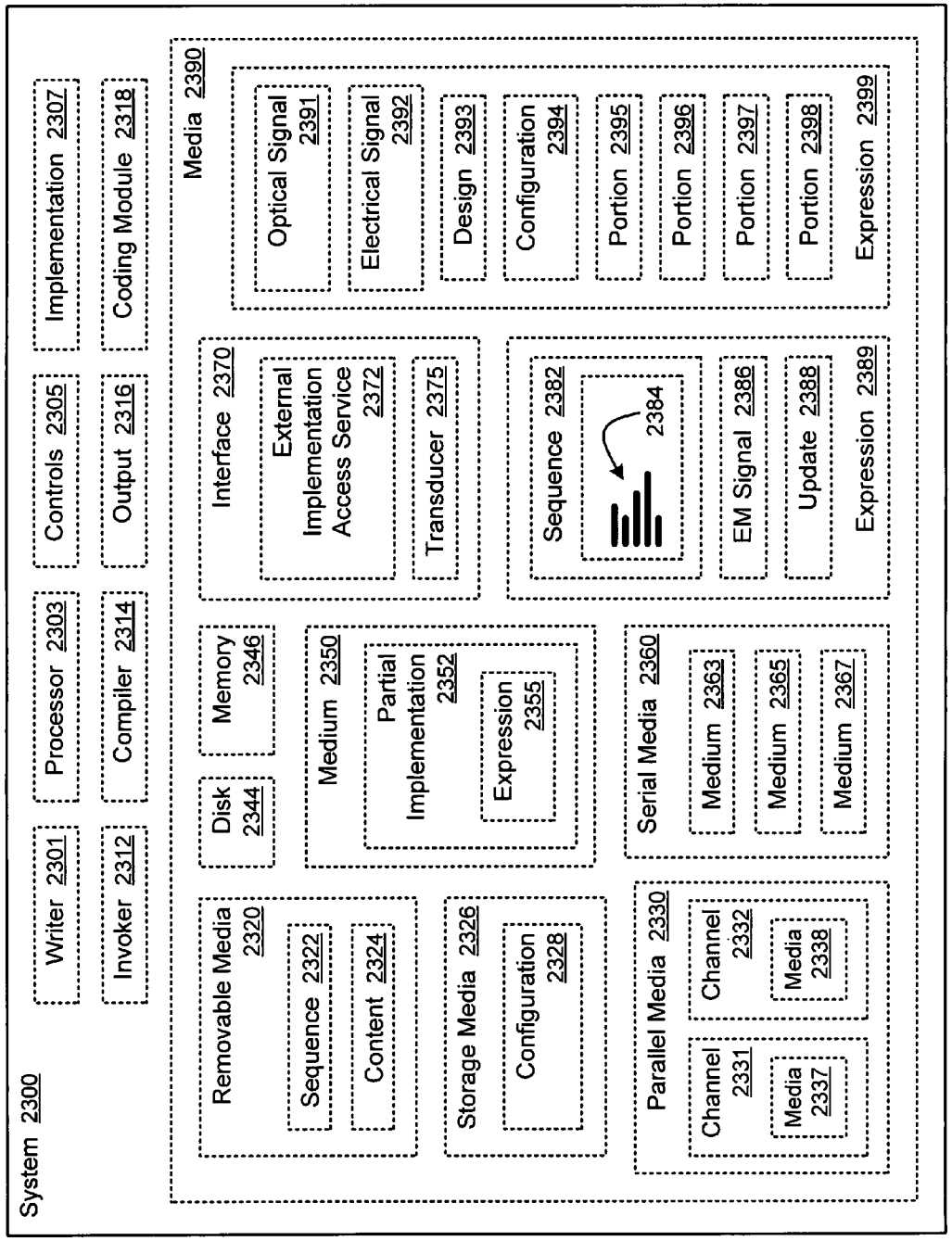

In some embodiments, one or more instances of integrated circuits or other processors may be configured to perform linguistic pattern recognition. In FIG. 23, for example, instances of input devices 2203 may include keys, pointing devices, microphones, sensors, reference data, or the like operable to provide spoken, written, or other symbolic expressions in data 2231-2239. Some form or portion of such output may be provided locally, for example, to one or more instances of translation utilities, compilers, or other configurations of integrated circuits 2208 operable to perform automatic or supervised programming or other language recognition, selective linguistic data retention or transmission, or the like. Alternatively or additionally such language-related data may include annotative information relating thereto such as a capture time or other temporal indications, capture location or other source information, language or other content indications, pointers to related data items or other associative indications, or other data classifications, aggregations, or distillations as described herein.

In some embodiments, one or more antennas 2218 or receivers 2219 may include a device that is the receiving end of a communication channel as described herein. For example, such a receiver may gather a signal from a dedicated conduit or from the environment for subsequent processing and/or retransmission. As a further example, such antennas or other receivers may include one or more instances of wireless antennas, radio antennas, satellite antennas, broadband receivers, digital subscriber line (DSL) receivers, modem receivers, transceivers, or configurations of two or more such devices for data reception as described herein or otherwise known.

In one variant, two or more respective portions of output data 2231-2239 may be sent from server 2284 through respective channels at various times, one portion passing through repeater 2281 and another through router 2287. Such channels may each bear a respective portion of a data aggregation or extraction, a publication, a comparative analysis or decision, a record selection, digital subscriber content, statistics or other research information, a resource status or potential allocation, an evaluation, an opportunity indication, a test or computational result, or another output 2220, 2240 of interest. Such distributed media may be implemented as an expedient or efficient mode of bearing such portions of output data to a common destination such as interface 2210 or holding device 2294. Alternatively or additionally, some such data may be transported by moving a medium (carried on storage device 2291, for example) so that only a small portion (a purchase or other access authorization, for example, or a contingent or supplemental module) is transferred via linkage 2205.

In some embodiments, one or more instances of signal repeaters 2281 may include a device or functional implementation that receives a signal and transmits some or all of the signal with one or more of an altered strength or frequency, or with other modulation (e.g., an optical-electrical-optical amplification device, a radio signal amplifier or format converter, a wireless signal amplifier, or the like). A repeater may convert analog to digital signals or digital to analog signals, for example, or perform no conversion. Alternatively or additionally, a repeater may reshape, retime or otherwise reorder an output for transmission. A repeater may likewise introduce a frequency offset to an output signal such that the received and transmitted frequencies are different. A repeater also may include one or more instances of a relay, a translator, a transponder, a transceiver, an active hub, a booster, a noise-attenuating filter, or the like.

In some embodiments, such communication satellite(s) 2283 may be configured to facilitate telecommunications while in a geosynchronous orbit, a Molniya orbit, a low earth orbit, or the like. Alternatively or additionally, a communication satellite may receive or transmit, for example, telephony signals, television signals, radio signals, broadband telecommunications signals, or the like.

In some variants, processor 2285 or any components 2251-2265 of implementations 2250, 2270 may (optionally) be configured to perform flow variants as described herein with reference to FIGS. 24-32. An occurrence of such a variant can be expressed as a computation, a transition, or as one or more other items of data 2231-2239 described herein. Such output 2220, 2240 can be generated, for example, by depicted components of primary system 2200 or network 2280 including one or more features as described with reference to FIGS. 11-21.

With reference now to FIG. 23, shown is an example of another system that may serve as a context for introducing one or more processes, systems or other articles described herein. System 2300 may be implemented as a stand-alone or distributed system, as exemplified herein. As shown system 2300 comprises one or more instances of writers 2301, processors 2303, controls 2305, software or other implementations 2307, invokers 2312, compilers 2314, outputs 2316, coding modules 2318, or the like with one or more media 2390 bearing expressions or outputs thereof. In some embodiments, such media may include distributed media bearing a divided or otherwise distributed implementation or output. For example, in some embodiments, such media may include two or more physically distinct solid-state memories, two or more transmission media, a combination of such transmission media with one or more data-holding media configured as a data source or destination, or the like. Any such components may, of course, include other components such as those shown in FIGS. 1, 3, 5, 7, 9, and 11-22 and described herein.

In some embodiments, transmission media may be "configured" to bear an output or implementation (a) by causing a channel in a medium to convey a portion thereof or (b) by constituting, adapting, addressing, or otherwise linking to such media in some other mode that depends upon one or more atypical traits of the partial or whole output or implementation. Data-holding elements of media may likewise be "configured" to bear an output or implementation portion (a) by holding the portion in a storage or memory location or (b) by constituting, adapting, addressing, or otherwise linking to such media in some other mode that depends upon one or more atypical traits of the partial or whole output or implementation. Such atypical traits may include a name, address, portion identifier, functional description, or the like sufficient to distinguish the output, implementation, or portion from a generic object.

In some embodiments described herein, "logic" and similar implementations can include software or other control structures operable to guide device operation. Electronic circuitry, for example, can manifest one or more paths of electrical current constructed and arranged to implement various logic functions as described herein. In some embodiments, one or more media are "configured to bear" a device-detectable implementation if such media hold or transmit a special-purpose device instruction set operable to perform a novel method as described herein. Alternatively or additionally, in some variants, an implementation may include special-purpose hardware or firmware components or general-purpose components executing or otherwise invoking special-purpose components. Specifications or other implementations may be transmitted by one or more instances of transmission media as described herein, optionally by packet transmission or otherwise by passing through distributed media at various times.

In some embodiments, one or more of the coding modules 2318 may be configured with circuitry for applying, imposing, or otherwise using a syntactic or other encoding constraint in forming, extracting, or otherwise handling respective portions of the device-detectable implementation or output. In encoding a software module or other message content, for example, compiler 2314 or coding module 2318 may implement one or more such constraints pursuant to public key or other encryption, applying error correction modes, certifying or otherwise annotating the message content, or implementing other security practices described herein or known by those skilled in the art. Alternatively or additionally, another instance of coding module 2318 may be configured to receive data (via receiver 2259, e.g.) and decode or otherwise distill the received data using one or more such encoding constraints. Compiler 2314 may, in some variants, convert one or more of components 2251-2265 from a corresponding source code form before the component(s) are transmitted across linkage 2205.

System 2300 may be implemented, for example, as one or more instances of stand-alone workstations, servers, vehicles, portable devices, removable media 2320, as components of primary system 2200 or network 2280 (of FIG. 22), or the like. Alternatively or additionally, media 2390 may include one or more instances of signal repeaters 2281, communication satellites 2283, servers 2284, processors 2285, routers 2287, portions of primary system 2200 as shown, or the like.

Media 2390 may include one or more instances of removable media 2320, tapes or other storage media 2326; parallel (transmission) media 2330; disks 2344; memories 2346; other data-handling media 2350; serial media 2360; interfaces 2370; or expressions 2389, 2399. Removable media 2320 can bear one or more device-detectable instances of instruction sequences 2322 or other implementations of flow 200 or flow 600, for example. Alternatively or additionally, in some embodiments, removable media 2320 can bear alphanumeric data, audio data, image data, structure-descriptive values, or other content 2324 in a context that indicates an occurrence of one or more flows 200, 600, 1000. In some circumstances, transmission media may bear respective portions of implementations as described herein serially or otherwise non-simultaneously. In some variants in which two portions 2397, 2398 constitute a partial or complete software implementation or product of a novel method described herein, portion 2397 may follow portion 2398 successively through serial media 2363, 2365, 2367 (with transmission of portion 2397 partly overlapping in time with transmission of portion 2398 passing through medium 2363, for example).

As shown, parallel channels 2331, 2332 are respectively implemented at least in media 2337, 2338 of a bus or otherwise effectively in isolation from one another. In some embodiments, a bus may be a system of two or more signal paths—not unified by a nominally ideal conduction path between them—configured to transfer data between or among internal or external computer components. For example, one data channel may include a power line (e.g., as medium 2365) operable for transmitting content of the device-detectable implementation as described herein between two taps or other terminals (e.g., as media 2363, 2367 comprising a source and destination).

In another such configuration, one or more media 2337 of channel 2331 may bear portion 2397 before, while or after one or more other media 2338 of parallel channel 2332 bear portion 2398. In some embodiments, such a process may occur "while" another process occurs if they coincide or otherwise overlap in time substantially (by several clock cycles, for example). In some embodiments, such a process may occur "after" an event if any instance of the process begins after any instance of the event concludes, irrespective of other instances overlapping or the like.

In a variant in which a channel through medium 2350 bears an expression 2355 partially implementing an operational flow described herein, the remainder of the implementation may be borne (earlier or later, in some instances) by the same medium 2350 or by one or more other portions of media 2390 as shown. In some embodiments, moreover, one or more controls 2305 may configure at least some media 2390 by triggering transmissions as described above or transmissions of one or more outputs 2316 thereof.

In some embodiments, the one or more "physical media" may include one or more instances of conduits, layers, networks, static storage compositions, or other homogenous or polymorphic structures or compositions suitable for bearing signals. In some embodiments, such a "communication channel" in physical media may include a signal path between two transceivers or the like. A "remainder" of the media may include other signal paths intersecting the communication channel or other media as described herein. In some variants, another exemplary system comprises one or more physical media 2390 constructed and arranged to receive a special-purpose sequence 2382 of two or more device-detectable instructions 2384 for implementing a flow as described herein or to receive an output of executing such instructions. Physical media 2390 may (optionally) be configured by writer 2301, transmitter 2252, or the like.

In some embodiments, such a "special-purpose" instruction sequence may include any ordered set of two or more instructions directly or indirectly operable for causing multi-purpose hardware or software to perform one or more methods or functions described herein: source code, macro code, controller or other machine code, or the like. In some embodiments, an implementation may include one or more instances of special-purpose sequences 2382 of instructions 2384, patches or other implementation updates 2388, configurations 2394, special-purpose circuit designs 2393, or the like. Such "designs," for example, may include one or more instances of a mask set definition, a connectivity layout of one or more gates or other logic elements, an application-specific integrated circuit (ASIC), a multivariate transfer function, or the like.

Segments of such implementations or their outputs may (optionally) be manifested one or more information-bearing static attributes comprising the device-detectable implementation. Such attributes may, in some embodiments, comprise a concentration or other layout attribute of magnetic or charge-bearing elements, visible or other optical elements, or other particles in or on a liquid crystal display or other solid-containing medium. Solid state data storage modules or other such static media may further comprise one or more instances of laser markings, barcodes, human-readable identifiers, or the like, such as to indicate one or more attributes of the device-detectable implementation. Alternatively or additionally such solid state or other solid-containing media may include one or more instances of semiconductor devices or other circuitry, magnetic or optical digital storage disks, dynamic or flash random access memories (RAMs), or the like. Magnetoresistive RAMs may bear larger implementation or output portions or aggregations safely and efficiently, moreover, and without any need for motors or the like for positioning the storage medium.

Segments of such implementations or their outputs may likewise be manifested in electromagnetic signals 2386, laser or other optical signals 2391, electrical signals 2392, or the like. In some embodiments, for example, such electrical or electromagnetic signals may include one or more instances of static or variable voltage levels or other analog values, radio frequency transmissions or the like. In some embodiments, the above-mentioned "optical" signals may likewise include one or more instances of time- or position-dependent, device-detectable variations in hue, intensity, or the like. Alternatively or additionally, portions of such implementations or their outputs may manifest as one or more instances of magnetic, magneto-optic, electrostatic, or other physical configurations 2328 of nonvolatile storage media 2326 or as external implementation access services 2372.

In some embodiments, physical media can be configured by being "operated to bear" or "operated upon to bear" a signal. For example, they may include physical media that generate, transmit, conduct, receive, or otherwise convey or store a device-detectable implementation or output as described herein. Such conveyance or storing of a device-detectable implementation or output may be carried out in a distributed fashion at various times or locations, or such conveyance or storing of a device-detectable implementation or output may be done at one location or time. As discussed above, such physical media "operated to bear" or "operated upon to bear" may include physical media that are atypically constituted or adapted to facilitate methods or functions as described herein.

In some configurations, one or more output devices 2204 may present one or more results of indicating at least one outcome of the evaluation mode before detecting an apparent authorization to transmit the message content to the one or more message content destinations in response to interface(s) 2210 receiving one or more invocations or outputs of an implementation of this function via linkage 2205. Such an "invocation" may, in some embodiments, comprise one or more instances of requests, hardware or software activations, user actions, or other determinants as described herein. Alternatively or additionally, in some embodiments, one or more input devices 2203 may later receive one or more invocations or results of one or more variants of flows 400, 600, 800, 1000. In contexts like these, processor 2285 or other components of network 2280 may likewise constitute a secondary implementation having access to a primary instance of interface 2210 implementing methods like flow 200 as described herein.

Serial media 2360 comprises a communication channel of two or more media configured to bear a transition or other output increment successively. In some embodiments, for example, serial media 2360 may include a communication line or wireless medium (e.g., as medium 2365) between two signal-bearing conduits (e.g., terminals or antennas as media 2363, 2367). Alternatively or additionally, one or more lenses 2209 or other light-transmissive media may comprise a serial medium between a light-transmissive medium and a sensor or other light receiver 2219 or transmitter 2212. In some embodiments, such "light-transmissive" media may (optionally) comprise metamaterials or other media operable for bearing one or more instances of microwave signals, radio-wave signals, visible light signals, or the like.

In some embodiments, such a lens may be an optical element that causes light to converge or diverge along one or more signal paths. Such a light-transmissive medium may include a signal-bearing conduit, glass, or other physical medium through which an optical signal may travel. More generally, a signal-bearing conduit may be an electrical wire, a telecommunications cable, a fiber-optic cable, or a mechanical coupling or other path for the conveyance of analog or digital signals.

Alternatively or additionally, system 2300 may likewise include one or more instances of media for handling implementations or their outputs: satellite dishes or other reflectors 2217, antennas 2218 or other transducers 2375, arrays of two or more such devices configured to detect or redirect one or more incoming signals, caching elements or other data-holding elements (e.g., disks 2344, memories 2346, or other media 2390), integrated circuits 2208, or the like. In some variants, one or more media may be "configured" to bear a device-detectable implementation as described herein by being constituted or otherwise specially adapted for that type of implementation at one or more respective times, overlapping or otherwise. Such "signal-bearing" media may include those configured to bear one or more such signals at various times as well as those currently bearing them.

In some embodiments, such caching elements may comprise a circuit or device configured to store data that duplicates original values stored elsewhere or computed earlier in time. For example, a caching element may be a temporary storage area where frequently-accessed data may be held for rapid access by a computing system. A caching element likewise may be machine-readable memory (including computer-readable media such as random access memory or data disks). In some embodiments, such caching elements may likewise comprise a latching circuit or device configured to store data that has been modified from original values associated with the data (held elsewhere or computed earlier in time, for example).

In one variant, respective portions 2395, 2396 of an expression 2399 of implementation 2307 may be sent through respective channels at various times. Invoker 2312 may request or otherwise attempt to activate a computer program or streaming media overseas via a telephone cable or other channel 2331. Meanwhile, output 2316 may attempt to trigger a session or other partial implementation 2352, success in which may be indicated by receiving expression 2355 into a visual display or other medium 2350. Such a program or other implementation may be made complete, for example, once both of these attempts succeed.

In some embodiments, transducer(s) 2375 may comprise one or more devices that convert a signal from one form to another form. For example, a transducer may be a cathode ray tube that transforms electrical signals into visual signals. Another example of a transducer comprises a microelectromechanical systems ("MEMS") device, which may be configured to convert mechanical signals into electrical signals (or vice versa).

Figure 24:
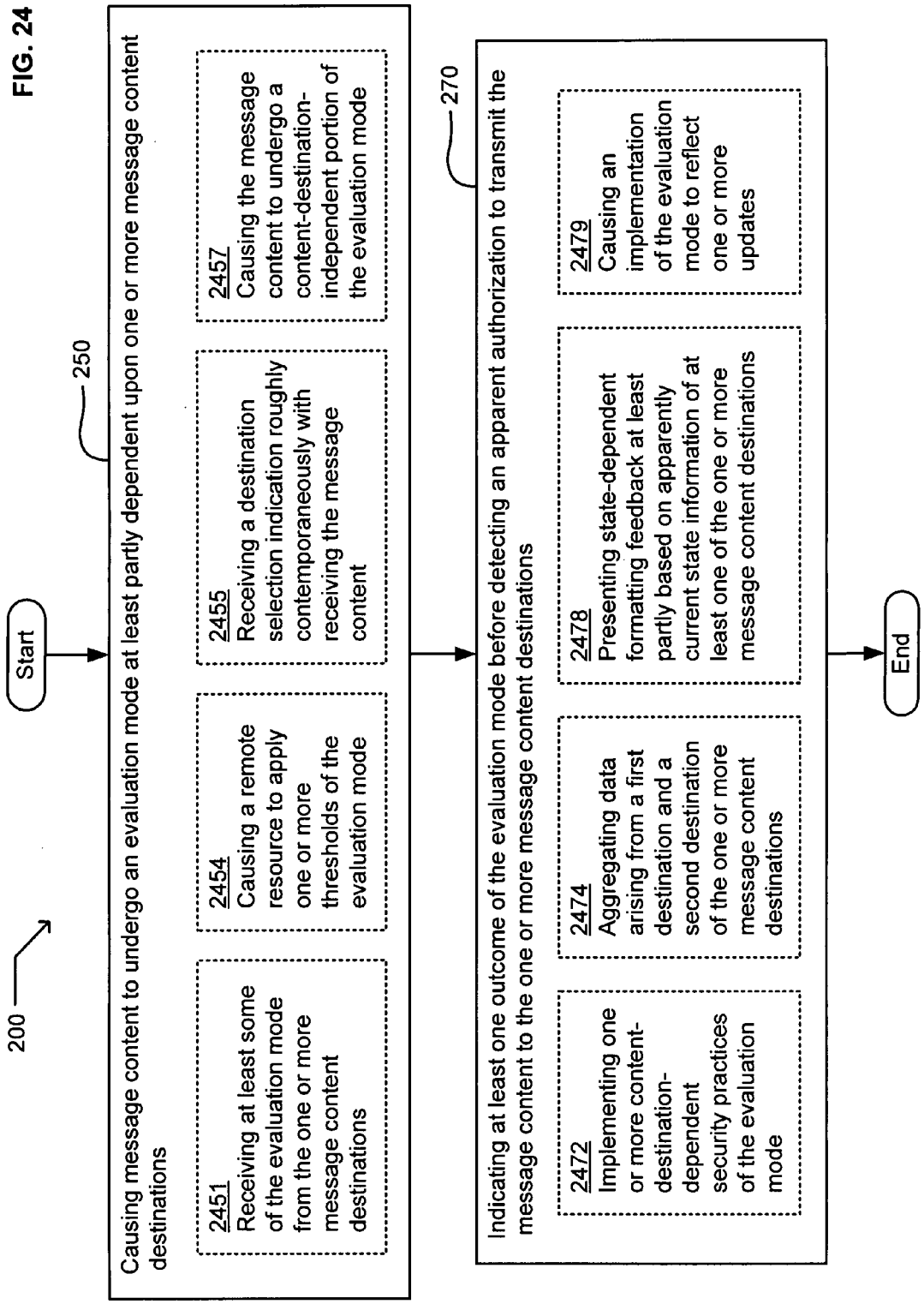
FIGS. 24-25 depict variants of the flow of FIG. 2.

With reference again to FIG. 12, and now also to FIG. 24, there are shown several variants of the flow 200 of FIG. 2. Operation 250—causing message content to undergo an evaluation mode at least partly dependent upon one or more message content destinations—may include one or more of the following operations: 2451, 2454, 2455, or 2457. Operation 270—indicating at least one outcome of the evaluation mode before detecting an apparent authorization to transmit the message content to the one or more message content destinations—may include one or more of the following operations: 2472, 2474, 2478, or 2479. Such outcomes may include one or more instances of tactile or auditory feedback 1187 (of FIG. 11), recipient- or system-generated language, rules or specifications, automatic or suggested adjustments, hints, decisions or other Boolean results, predictive information 1181, hardware or other object identifiers 1182, textual or other verbal information 1185, rankings or other levels 1188, warnings or other advice 1186, vectors or other combinational results, or the like.

Operation 2451 describes receiving at least some of the evaluation mode from the one or more message content destinations (e.g. port 1299 receiving one or more instances of parameters 1246, instruction sequences 1244 or other items 1249 of mode 1240 from destination 1222). This may occur, in some embodiments, in response to a questionnaire or other form of threshold inquiry provided by feedback logic 1256. Alternatively or additionally, the user or a group or system manager may specify a form of response to crossing the thresholds, which may be as blunt as "no one at_will read this message" (in response to a too-long or after-hours message, for example). Alternatively or additionally, the response form may include an estimate (of when the message will be considered, how many people may receive the message, or the like).

Operation 2454 describes causing a remote resource to apply one or more thresholds of the evaluation mode (e.g. controller 1228 requesting remote processor 1287 to apply one or more thresholds 1258 provided as an invocation parameter 1252). Alternatively or additionally, the threshold(s) may be implicit in such a request 1229, kept in memory, or otherwise accessible to processor 1287. This may occur, for example, in embodiments in which system 1200 is physically distributed in which processor 1287 is remote from controller 1228, such as by an instance of system 1200 in primary system 120 (of FIG. 1) remotely invoking an instance of instance of processor 1287 in remote system 170. Alternatively or additionally, such thresholds may include minimum or maximum graphic widths, file or segment lengths, clip durations, or the like.

Operation 2455 describes receiving a destination selection indication roughly contemporaneously with receiving the message content (e.g. controller 1227 receiving at least corresponding content 1215 and destination 1223 in a common transmission or session). This may occur, for example, in embodiments in which evaluation module 1221 performs operation 270 and in which either content or such indication 1226 arrive at invocation module 1220 with an address 1225 or other identifier 1224 of the other. Alternatively or additionally, these items may arrive in a common message, from a common system, or otherwise in an associative context, many of which may readily be practiced by those skilled in the art in light of these teachings.

Operation 2457 describes causing the message content to undergo a content-destination-independent portion of the evaluation mode (e.g. processor 1288 executing more than one mode as composite mode 1230, including both one or more content-destination-independent modes 1231 and one or more content-destination-dependent modes 1233). In some variants, memory 1254 or the like may be provided for holding one or more intermediate, content-destination-independent results 1251 so that one or more variant final results 1282 may be generated more effectively in response to one or more additional destinations. This may occur, for example, in embodiments in which one or more processors 1287, 1288 activate invocation module for performing operation 250 and in which system 1200 includes an instance of some or all of evaluation module 1130 (of FIG. 11) configured to perform operation 270.

Operation 2472 describes implementing one or more content-destination-dependent security practices of the evaluation mode (e.g. processor 128 applying mode 1106 for authenticating content 135 or mode 133 for scanning content 135). This may occur, for example, in embodiments in which evaluation module 130 includes one or more instances of evaluation module 1130, in which such respective security practices are required or otherwise appropriate for currently identified destinations, and in which processor 128 performs operation 270 by invoking evaluation module 130 and interface 150.

Operation 2474 describes aggregating data arising from a first destination and a second destination of the one or more message content destinations (e.g. aggregator 1121 causing aggregation 1131 to include parameter 1133 from destination 1137 and event indicator 1134 from destination 1138). Such combined aggregations may be implemented, for example, in embodiments in which invocation module 1111 performs operation 250, in which at least evaluation module 1130 performs operation 270, and in which primary system 120 implements one or more portions of system 1100. Alternatively or additionally, one or more other items 1132 may be included from destinations 1137, 1138, 1139.

Operation 2478 describes presenting state-dependent formatting feedback at least partly based on apparently current state information of at least one of the one or more message content destinations (e.g. help function 1117 giving information 1185 or advice 1186 each at least sometimes responsive to latest event indicator 1135 received from one or more of destinations 1138, 1139). This may occur, for example, in embodiments in which user 110 enters an identifier 1156 of one or more destinations 1138, 1139 or otherwise indicates where content 136 may go, or in which information 1185 or advice 1186 may include one or more results 1189 of function 1116 of one or more event indicators 1134, 1135.

Operation 2479 describes causing an implementation of the evaluation mode to reflect one or more updates (e.g. maintenance controller 1114 causing processor 1144, function 1116, or other portions of system 1100 to use mode 1105 in response to one or more updates 1113). In embodiments in which function 1116 is partly implemented in software, for example, maintenance controller may add or change a portion of executable code in evaluation module 1130 using such an update. Alternatively or additionally, in some variants, one or more other controllers 1124 may indicate one or more such updates within results 1189, via output device 1160, or otherwise via interface 1150.

Figure 25:
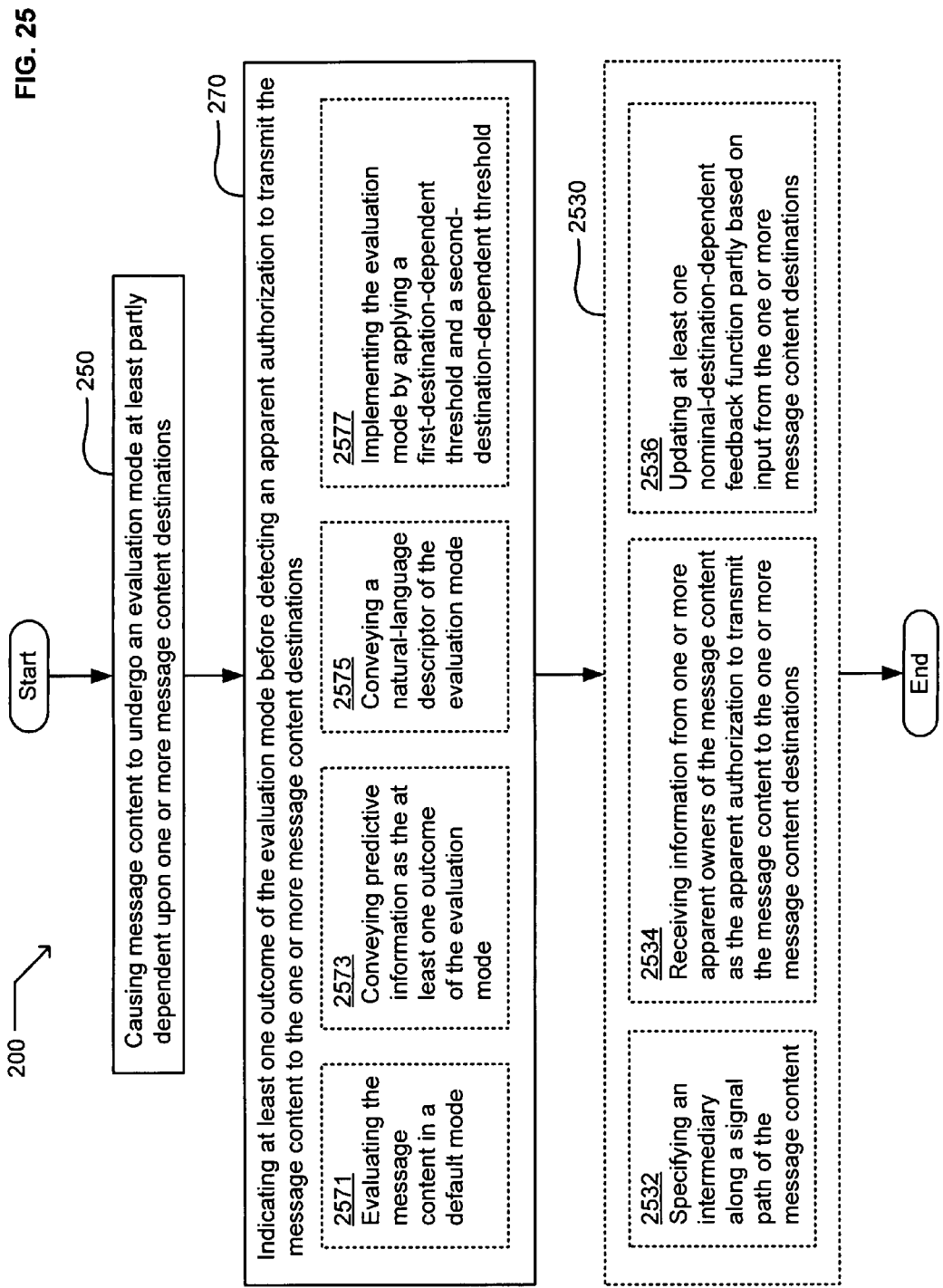

With reference now to FIG. 25, there are shown several variants of the flows of FIG. 2 or 24. Operation 270—indicating at least one outcome of the evaluation mode before detecting an apparent authorization to transmit the message content to the one or more message content destinations—may include one or more of the following operations: 2571, 2573, 2575, or 2577. Alternatively or additionally, flow 200 may include one or more instances of other operations 2530: 2532, 2534, or 2536. In various embodiments, one or more of such other operations 2530 may be performed before or during operation 250 or operation 270.

Operation 2571 describes evaluating the message content in a default mode (e.g. processor 1146 implementing mode 1102 by applying one or more rules 1108 relating to destination 165 in response to a presumption that one or more portions of message content 137, 138 is at least potentially intended for transmission to destination 165). This may arise, for example, from one or more default or other presumptive destinations 131 including potential destination 165, from an explicit inclusion of destination 165 by default, from an indication that one or more excluded destinations 132 does not include potential destination 165, or the like. This may occur, for example, in embodiments in which invocation module 124 performs operation 250 and in which other portions of primary system 120 perform operation 270 as described herein. Alternatively or additionally, evaluation module 1130 may (optionally) implement mode 1103 as a default mode in an absence of an explicit destination identifier. In some variants, one or more additional modes 134 may be applied after such default feedback, optionally providing additional feedback in response to receiving one or more instances of additional content or destinations. In some e-mail variants, alternatively or additionally, one or more output devices 157 may report an effect in a "sent" folder presentation or the like.

Operation 2573 describes conveying predictive information as the at least one outcome of the evaluation mode (e.g. prediction logic 1125 conveying one or more indications 1128 of how one or more other systems of various types may respond to message content 138). This may occur, for example, in embodiments in which invocation module 1111 performs operation 250, in which evaluation module performs operation 270, and in which other one or more other portions of system 1100 perform one or more other operations 2530. In some variants, for example, such indications may include one or more instances of destinations, probabilities, thresholds, event history or other supporting data, user preference data, or the like or the like reflecting operational rules 1109 or prior events involving the destination(s).

Operation 2575 describes conveying a natural-language descriptor of the evaluation mode (e.g. output device 1160 displaying one or more morphemes or other descriptors 1162 each relating to one or more of modes 1102-1106 in response to a preliminary or explicit indication that one or more of them may be used at a message content destination). Such morphemes may include "AGE" or "ADULT" for an adult-content evaluation, "TEXT" or "PIC" for an evaluation relating to text or text formatting versus pictures or other graphical content, "LONG" or "SIZE" for a size-related limitation, "PUB2" or "PROP" or "CONF" for an evaluation relating to the apparent presence of proprietary content, "TEMP" for a time-dependent evaluation, or the like. In some variants, such descriptors may depend upon the currently-identified destinations. Alternatively or additionally, such descriptors may be confirmed, updated, or obtained in the first instance in response to a descriptor update request. For example, the descriptor(s) may be presented as a filename or portion of macro code or other human-readable code 1112, specifications, or the like by which such modes are implemented. Alternatively or additionally, the descriptor(s) may comprise user-provided policy or other mode names or descriptions, or the like. In some variants, moreover, such descriptors may distinguish the evaluation mode from one or more other evaluation modes such as generic message content evaluation.

Operation 2577 describes implementing the evaluation mode by applying a first-destination-dependent threshold and a second-destination-dependent threshold (e.g. feedback logic 1256 applying threshold 1257 and threshold 1258 to one or more portions of content 1210, respectively at least in response to destinations 1222 and destination 1223). This may occur, for example, in embodiments in which one or more such thresholds are received from or about such destinations. Alternatively or additionally, in some embodiments, one or more such thresholds may be derived from behaviors of such destinations or other destinations having like configurations or other similar attributes as described herein.

Operation 2532 describes specifying an intermediary along a signal path of the message content (e.g. router 1295 specifying at least node 1291 of path 1294 for portions of message content 1211, 1212). This may occur, for example, in an ad hoc network context in which such a decision will apparently bring a data packet or the like closer to the one or more specified message content destinations. See, e.g., U.S. patent application Ser. No. 09/683,745 ("Method of Wireless Data Exchange Amongst Devices of Limited Range"); and Ko, Young-Bae; Vaidya, Nitin H.; "Location-Aided Routing (LAR) in Mobile Ad Hoc Networks"; Wireless Networks; 2000; Vol. 6; pp. 307-321. Alternatively or additionally, a variety of reservations or routes may be specified in this manner for subsequent analysis or use in a conventional network or other context.

Operation 2534 describes receiving information from one or more apparent owners of the message content as the apparent authorization to transmit the message content to the one or more message content destinations (e.g. sensor 122 receiving a "TRANSMIT" command or the like roughly contemporaneously with an indication of the content 1216, 1217 or the one or more destinations 2288). In some variants, sensor 1283 may receive such an apparent authorization from buffer 1281 operable to hold real-time auditory or visible input until such input may be processed. A user's gesture 1263 or affirmative word 1265 may signify the authorization, for example, even in a context in which such events cannot be detected from raw data 1260 in real time. The reception may occur in a common session during which a portion of content 1217 was created or changed, for example, or otherwise in a context suggesting that an owner 1285 of the content apparently provided information 1269.

Operation 2536 describes updating at least one nominal-destination-dependent feedback function partly based on input from the one or more message content destinations (e.g. update logic 1270 changing mode 1232 or otherwise changing screen image 1276, such as by applying update mode 1235). This may occur in embodiments in which feedback function 1273 previously provided feedback 1275 via screen image 1276 at least partly in response to tentative content 1214, for example, according to herein-described variants of the flow of FIG. 4.

Alternatively or additionally, operation 2536 may be performed by update logic 1270 implementing mode 1271 to modify or replace function 1274 in response to a change in destination list 1136, for example, such as substituting destination list 2295 or adding or removing potential recipient 2296. In some variants, of course, one or more instances of "other" operations 2530 may be performed before, within, or in some other temporal relationship with operation 270 or other operations as described herein.

Figure 26:
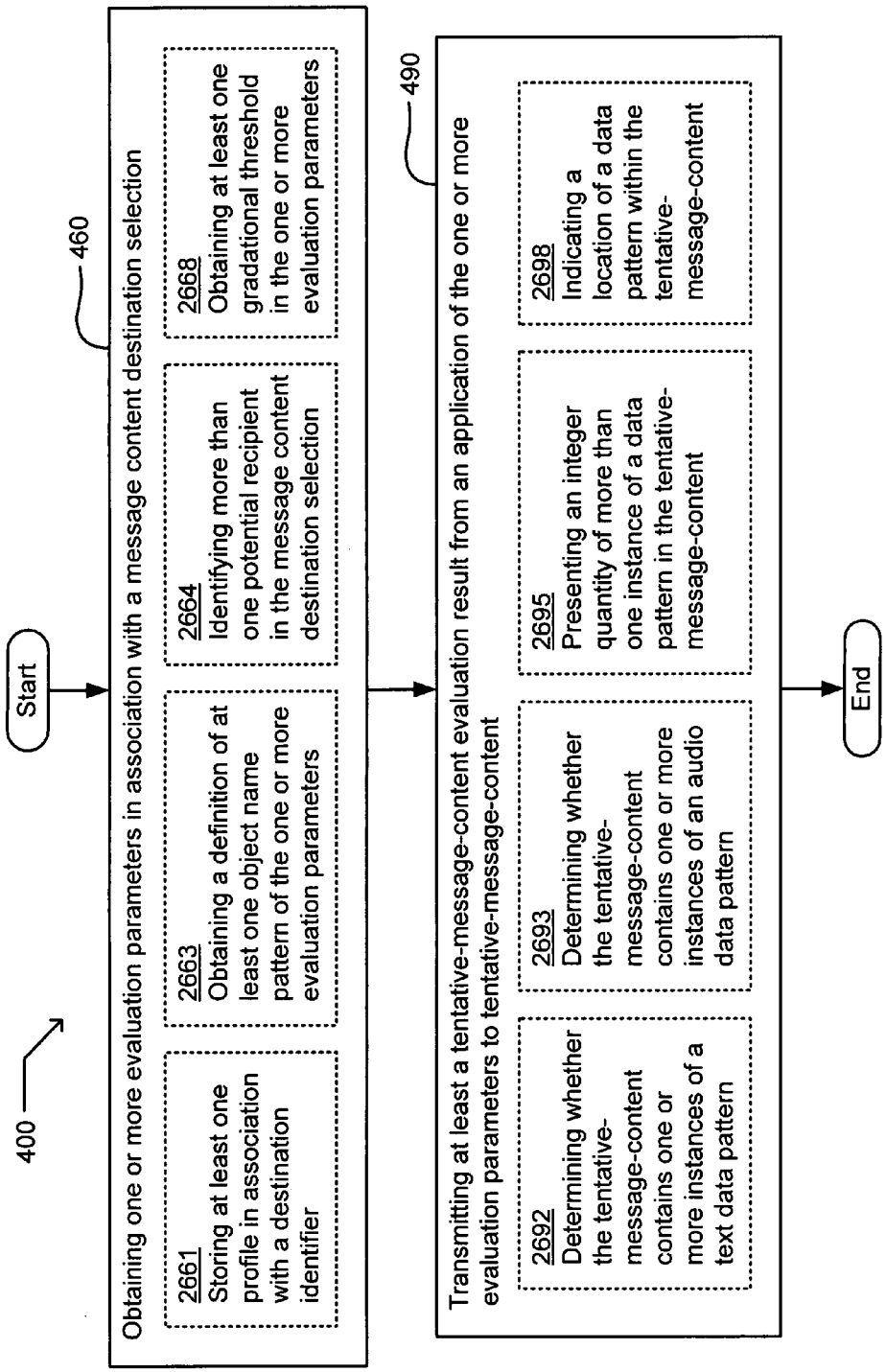
FIG. 26 depicts variants of the flow of FIG. 4.

With reference again to FIG. 13, and now also to FIG. 26, there are shown several variants of the flow 400 of FIG. 4. Operation 460—obtaining one or more evaluation parameters in association with a message content destination selection—may include one or more of the following operations: 2661, 2663, 2664, or 2668. In some embodiments, such a selection may be designated by one or more instances of addresses, group labels, or other designations of one or more intended recipient. Operation 490—transmitting at least a tentative-message-content evaluation result from an application of the one or more evaluation parameters to tentative-message-content—may include one or more of the following operations: 2692, 2693, 2695, or 2698. Such content may be obtained from a user, for example, during or after the destination selection. Alternatively or additionally, one or more segments of the content obtained before the destination selection may be initially processed with a default selection or updated successively according to changing values of the selection of one or more destinations.

In some embodiments, for example, a user might start a text-containing message to user X, and in the process of composing it, get a message that says "if you just call user X now, you may discuss this." Such advice may be based on one or more instances of most-recent status data of user X or of (tentative) content attributes as described herein. Alternatively or additionally, in some implementations, analysis module 1430 may be configured to indicate location, schedule, or other apparently-current status data (as guidance 1494 of FIG. 14 or the like, for example) relating to user Y in response to user Z designating specific text or other content as something of interest to user Y. User Z may find such information useful, for example, in deciding whether, how, or when to forward segment 1412 or a reference to it to user Y.

Operation 2661 describes storing at least one profile in association with a destination identifier (e.g. storage manager 1310 including one or more profiles 1383 in association with one or more identifiers 1387 or identifier types 1382). This may occur, for example, in embodiments in which invocation module 1320 and storage manager 1310 jointly perform operation 460 and in which interface 1390 performs operation 490. Each such profile may include one or more instances of instructions sequences 1332, languages or other semantic rules 1334, schedules or other timing information 1337, version or other format information 1338, or the like in association with one or more respective identifiers 1387. Such an association may be established, for example, by inclusion in a common entry 1385, by hard coding, by some other form of mapping, or the like. Alternatively or additionally, storage manager 1310 may be configured to record an indication of feedback as described herein. See, e.g., variants of the flow of FIG. 6.

Operation 2663 describes obtaining a definition of at least one object name pattern of the one or more evaluation parameters (e.g. port 1392 receiving table 1393 mapping one or more object name patterns 1370 with one or more corresponding definitions 1331 or the like). This may occur, for example, in embodiments in which invocation module 320 receives destination 333 from router 385 and in which invocation module 320 implements some or all of invocation module 1320. Such object name patterns may optionally include one or more types of wildcards 1371, 1372, exclusions or other type limitations 1373, thresholds or other alphanumeric data 1376, search-term-like objects or other compound or relational expressions 1378, or the like.

Operation 2664 describes identifying more than one potential recipient in the message content destination selection (e.g. directory manager 1340 recognizing at least entry 1361 and entry 1362 of list 1360 of user-designated recipients). Such recipients may be designated by a literal or logical identifier, an address, a relational descriptor (like "my father," "the manager of" a person or organization, "all users of" a system, etc.), or the like. This may occur, for example, in embodiments in which such recipients are initially unverified, irrespective of whether any such recipient has previously received any message content.

Operation 2668 describes obtaining at least one gradational threshold in the one or more evaluation parameters (e.g. comparator 1355 receiving minimum or maximum reference 1356 for comparison with one or more determinants 1357 each derived as a respective content attribute 1353 of tentative-message-content version 1351). In some embodiments, for example, attribute 1354 may indicate one or more instances of complexities, lengths, or other quantifiable measures of a corresponding version 1352, any of which may be compared against a maximum acceptable value or range. Alternatively or additionally, development times, dimensions, or the like may likewise constitute attributes susceptible of use as or in generating a determinant suitable for comparison against a minimum acceptable value or range.

Operation 2692 describes determining whether the tentative-message-content contains one or more instances of a text data pattern (e.g. search module 1450 iteratively searching for words or other terms 1451 of the tentative-message-content 1403 within one or more listings 1458 of topical associations or other categories 1452). Different terms 1451 of a common category 1452 occurring two or more times in tentative-message-content 1403, for example, may constitute a noteworthy attribute of the content 1403 or of a segment 1412 of the content 1403. Such content or segment attributes can, for example, constitute a favored or disfavored element from the viewpoint of some recipients. This may occur, for example, in embodiments in which invocation module 1477 performs operation 460 and in which other portions of system 1400 perform operation 490.

Operation 2693 describes determining whether the tentative-message-content contains one or more instances of an audio data pattern (e.g. analysis module 1440 determining whether audio data 1471 contains any recognizable expressions 1482 or other attributes 1474 that are apparently required or forbidden for any recipient potentially within the message content destination selection 1478). In some contexts, for example, a given destination's message-rejection patterns, buying patterns, or other response patterns may be aggregated to indicate a model of that destination's behavior containing one or more valuations 1479 of respective expressions that may be found in the audio data 1471 or other content described herein. Such valuations may be defined, for example, so that some are positive (for apparently-favored content categories, for example) and others are negative.

Operation 2695 describes presenting an integer quantity of more than one instance of a data pattern in the tentative-message-content (e.g. display 1397 or speaker 1475 indicating that "several" instances of pattern 1423 were found within version 1420). The resulting presentation 1490 may further include one or more instances of descriptions 1492 of patterns or rules, specific occurrence counts or other occurrence indicators 1491, corresponding raw segments 1493 of tentative-message-content, resulting scores 1495, acceptable formats or other corrective guidance 1494, destinations 1496 or destination attributes 1497, or the like. This may occur, for example, in embodiments in which valuations 1479 are arithmetically or logically combined to generate score 1495 or other guidance 1494. More than one instance 1484 of an expression or other pattern within content 1483 may be indicated in respective time segments 1487 or other locations along timeline 1485, for example. Such configurations of interface 1470 may be particularly useful on an organizational scale in effective composition and review targeting one or more destinations as described herein.

Operation 2698 describes indicating a location of a data pattern within the tentative-message-content (e.g. display 1398 indicating one or more timeline locations 1499 each having a respective instance of a relevant pattern 1406 within an audio or video segment 1411 of tentative-message-content 1403). In some variants, for example, user interface 1470 may facilitate a composer unfamiliar with one or more recipients in selecting one or more such instances for closer analysis or content modification. This may occur, for example, in embodiments in which such recipients are customers or other persons in authority. Alternatively or additionally, this may occur in embodiments in which implementation 2270 includes one or more instances of systems 1300, 1400 operable for performing one or more of the above-described variants of flow 400.

Figure 27:
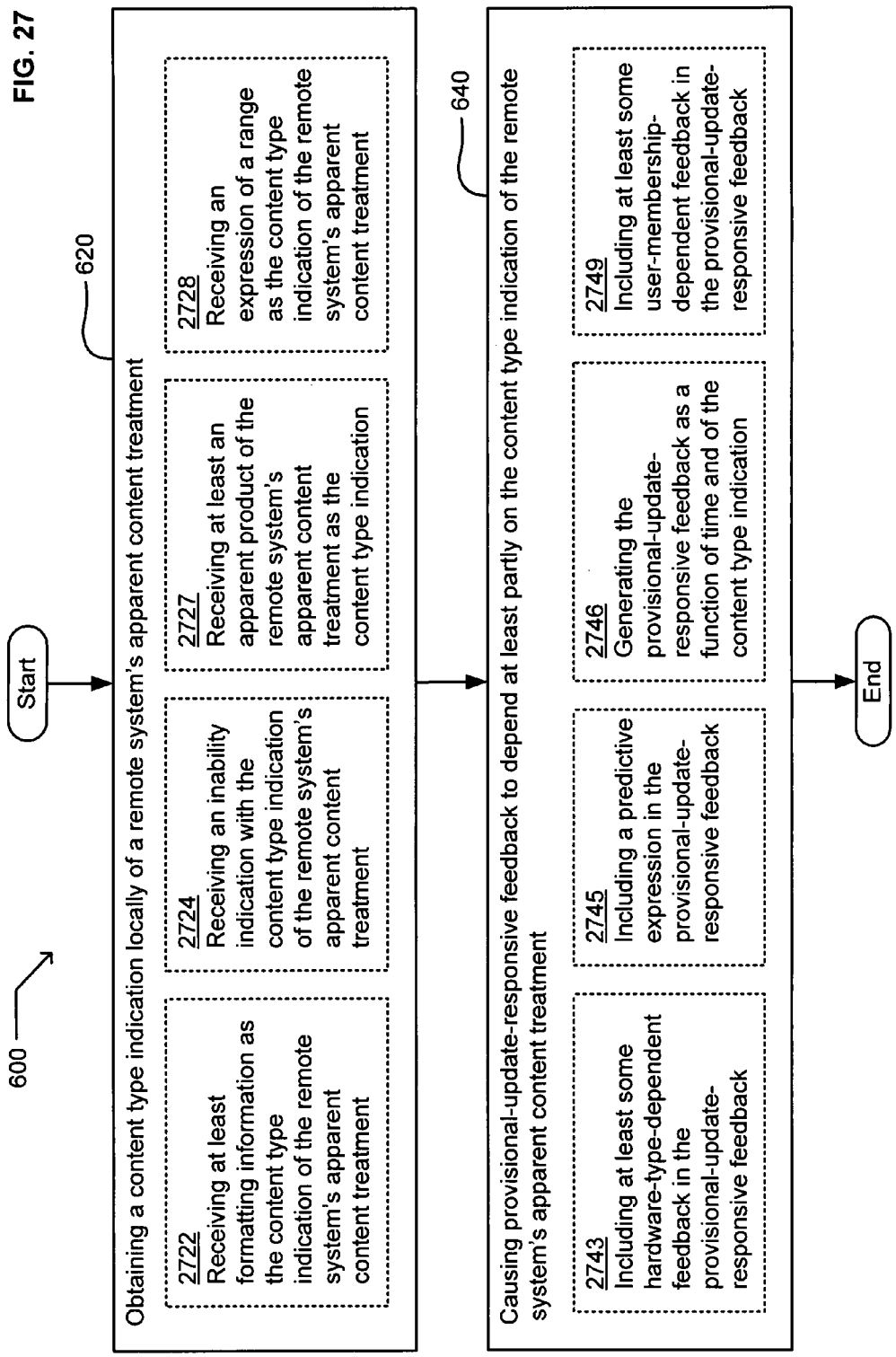
FIGS. 27-28 depict variants of the flow of FIG. 6.

With reference again to FIG. 5, and now also to FIG. 27, there are shown several variants of the flow 600 of FIG. 6. Operation 620—obtaining a content type indication locally of a remote system's apparent content treatment—may include one or more of the following operations: 2722, 2724, 2727, or 2728. Operation 640—causing provisional-update-responsive feedback to depend at least partly on the content type indication of the remote system's apparent content treatment—may include one or more of the following operations: 2743, 2745, 2746, or 2749.

Operation 2722 describes receiving at least formatting information as the content type indication of the remote system's apparent content treatment (e.g. modeling logic 1624 receiving indication 1646 signifying that remote system 507 apparently rejects or otherwise disfavors content 1659 that includes one or more types of script fonts, fine print, advertising, animation or other decorative features, or other non-standard attributes 1653). This may occur, for example, in embodiments in which primary system 520 of FIG. 1 implements some features of configuration module 1620 of FIG. 16 as described herein. Alternatively or additionally, one or more other indications 1644 may be used for favoring or disfavoring one or more attributes of audio data formatting; graphic formatting; language or other subject matter categories 1651; trust, difficulty, or other levels 1652; or the like. Other such indications 1647 may likewise express favor or disfavor for file or other object size, slang, jargon, spelling or grammar errors, response types or times, target recipient attributes, or other aspects of apparent content treatment as described herein, at one or more instances of remote systems 507.

Operation 2724 describes receiving an inability indication with the content type indication of the remote system's apparent content treatment (e.g. one or more instances of modeling logic 1623, 1624 receiving one or more expressions 1634 of problem reports, compatibility issues, complaints or the like in relation to server 511 or user 510). This may occur, for example, in embodiments in which such logic also receives one or more direct indications 1642 of respective outages, content restrictions or the like, or other limitations 517 of intermediary 515, user 510, remote system 507, or some other entity operating through network 500.

Operation 2727 describes receiving at least an apparent product of the remote system's apparent content treatment as the content type indication (e.g. port 1684 receiving one or more instances of acknowledgments 1604 or other feedback 1605 from intermediary 515 or remote system 507 in response to one or more earlier message delivery attempts or other deliveries). This may occur, for example, in embodiments in which one or more event logs 1677, 1678 reflect feedback 1605 that may directly or indirectly indicate intermediary or remote content filter features or other data treatment: delivery attempts, successes, failures, error messages, associated content categories, or the like. Alternatively or additionally, such an apparent product 1609 may locally include one or more indications 1640 of the remote system's response data 505, as well as other types of data 1608 that are apparently not indicative of such treatment.

Operation 2728 describes receiving an expression of a range as the content type indication of the remote system's apparent content treatment (e.g. one or more instances of modeling logic 1621-1623 configured for receiving one or more wildcard-containing expressions 1633, size-range-indicative minima 1631 and maxima 1632, or other expressions 1635 of at least first data type 1623 and next data type 1624 respectively included and excluded in the operation of remote system 507, at least as estimated by modeling module 1630). One or more such expressions 1633-1635 may each likewise associate with a corresponding inclusion or exclusion operator 1627, moreover, at least in a context in which such operators are configurable. This may occur, for example, in embodiments in which one or more apparent content treatments affect all content types of one or more (included) type indications 1643 except for one or more content types of (excluded) type indications 1645. Alternatively or additionally, one or more instances of expressions 1634 may indicate a size range, a group listing of two or more member identifiers, or the like.

Operation 2743 describes including at least some hardware-type-dependent feedback in the provisional-update-responsive feedback (e.g. feedback logic 1716 omitting one or more instances of feedback data 1724 in response to an indication 1792 that network 500 includes server 511, and otherwise potentially including one or more instances of feedback data 1723-1726). This may occur, for example, in embodiments in which feedback data 1724 includes a suggestion or other reference relating to a configuration of server 511 and in which analysis module 590 of FIG. 5 implements one or more components of analysis module 1790 of FIG. 17 operable for performing operation 640. Such feedback may be appropriate, for example, in a context in which analysis module 1790 detects marginal component 1745 in content 1740 that user 510 would apparently accept but that remote system 507 or other potential recipients would apparently reject. Configuring such feedback logic at a content source, intermediary, or destination may provide opportunities for content filter elements to be shared efficiently among users in many contexts, for example. Alternatively or additionally, feedback logic 1714 may perform operation 2743 by including feedback data 1726 at least partly in response to an indication 1791 that network 500 includes at-risk hardware or the like in a context in which such feedback is not always included.

Operation 2745 describes including a predictive expression in the provisional-update-responsive feedback (e.g. feedback logic 1713 configuring feedback 1720 to express a risk or other potential outcome indicators 1733, 1734 relating to a prospect of one or more content versions 1749, 1750 being transmitted to one or more remote instances of systems 1500, 1600). This may occur, for example, in embodiments in which version 1750 includes one or more instances of marginal or other recipient-disfavored components 1748, 1752. Alternatively or additionally, such an indicator 1734 may include portions of raw data or other content 1740, explanation, or other supporting data 1731 apparently representing or influencing a likelihood of one or more such potential outcomes.

Operation 2746 describes generating the provisional-update-responsive feedback as a function of time and of the content type indication (e.g. one or more instances of feedback logic 1716-1718 individually or jointly causing feedback 1720 to express a decision whether to include feedback data 1728 that implements one or more times 1767 or other components 1764 of schedule 1760). In some instances, for example, schedule 1760 may directly or indirectly indicate one or more instances of transition times 1768 at which feedback data 1738 is to be added to or removed from feedback 1720. This may occur, for example, in embodiments in which system 1700 is a stand-alone system connectable with a remote system. Alternatively or additionally, one or more portions of feedback data 1728-1726 may depend upon one or more of a time-dependent indication 1762 or a time-independent indication 1787 of one or more content components 1744-1746. Alternatively or additionally, feedback logic 1719 may be configured to perform operation 2746 by removing feedback data 1729 or adding feedback data 1739 upon a detected event or otherwise at one or more future times 1767. Some or all such feedback may, for example, depend explicitly upon one or more content type indications 1793 such as those exemplified herein.

Operation 2749 describes including at least some user-membership-dependent feedback in the provisional-update-responsive feedback (e.g. one or more instances of feedback logic 1711-1713 including one or more instances of feedback data 1721-1723 or the like in response to finding one or more instances of destination identifier 555 among member-indicative table 1537 or the like). This may occur, for example, in an embodiment in which analysis module 1530 of FIG. 3 implements analysis module 1790 of FIG. 5, or vice versa. Alternatively or additionally, feedback logic 1711 may be configured to perform operation 2749 by selecting items among feedback logic 1713-1719 in a manner that depends upon a local user or intermediary 515 being found in a member-indicative table 1537 other or form of member list 1775. Such configurations may occur, for example, in embodiments in which one or more corresponding table values constitute or refer to portions of feedback 1720 or feedback logic 1710.

Figure 28:
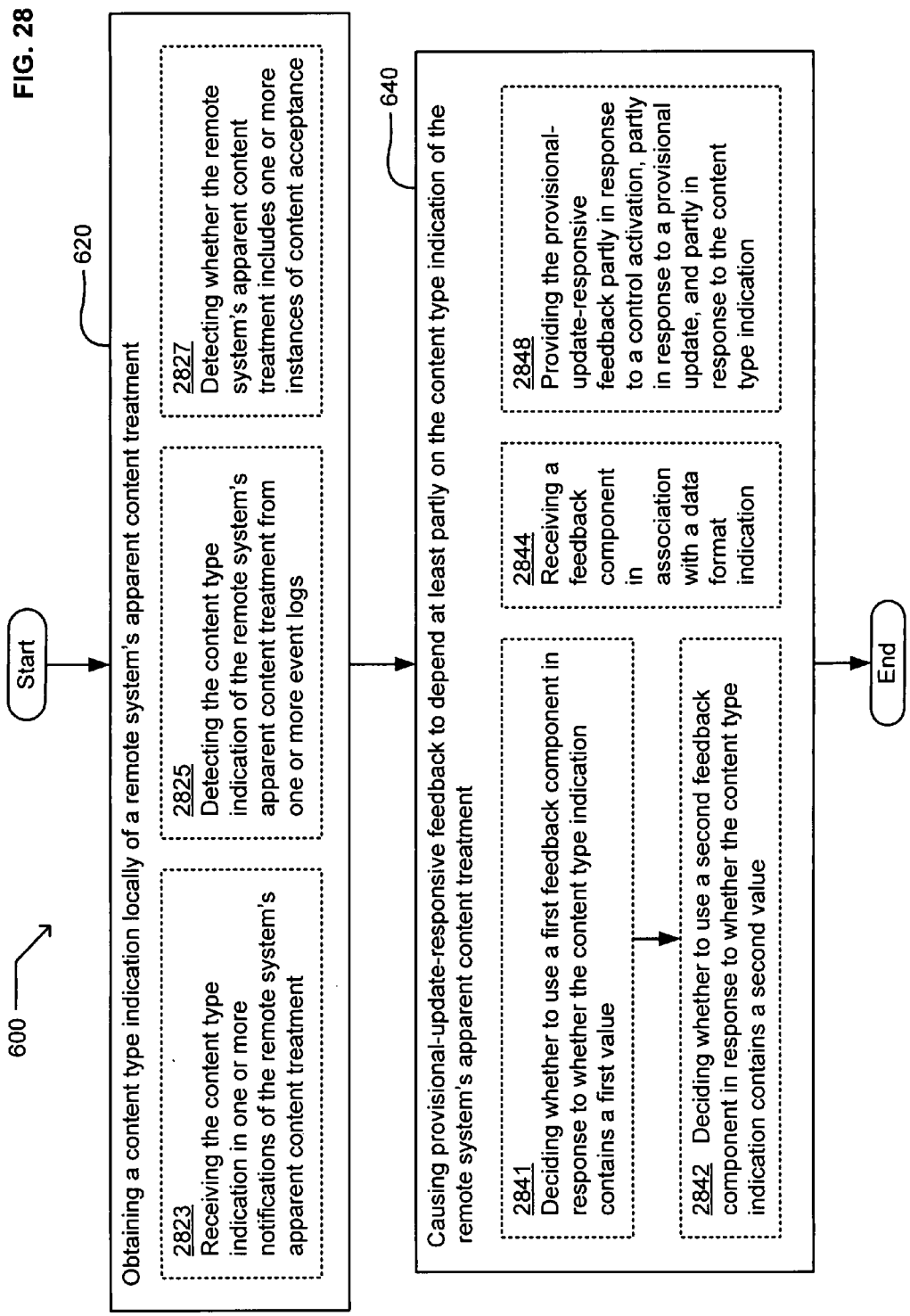

With reference now to FIG. 28, there are shown several variants of the flows of FIG. 6 or 27. Operation 620—obtaining a content type indication locally of a remote system's apparent content treatment—may include one or more of the following operations: 2823, 2825, or 2827. Operation 640—causing provisional-update-responsive feedback to depend at least partly on the content type indication of the remote system's apparent content treatment—may include one or more of the following operations: 2841, 2842, 2843, or 2848.

Operation 2823 describes receiving the content type indication in one or more notifications of the remote system's apparent content treatment (e.g. port 1685 receiving one or more instances of content type indications 514 locally in notification 513 from intermediary 515 or from remote system 507). This may occur, for example, in embodiments in which intermediary 515 or primary system 520 implements one or more components of system 1600 configured for performing operation 620. Alternatively or additionally, intermediary 515 may be configured to perform operation 2823, such as by receiving notification 513 from remote system 507. In such circumstances, module 516 may be configured for extracting content type indication 514 and the like from notification 513. and relaying it to primary system 520.

Operation 2825 detecting the content type indication of the remote system's apparent content treatment from one or more event logs (e.g. extraction logic 1673 obtaining one or more such indications 1648 directly or indirectly from event log 1677 or the like). This may occur, for example, in embodiments in which event log 1677 resides in network 500, in primary system 520, or otherwise somewhere accessible to configuration module 1620. Alternatively or additionally, invocation module 1610 may be configured to activate extraction logic 1672 at intermediary 515 or remote system 507. This may occur, for example, in embodiments in which system 1600 is distributed across more than one system. Such extraction may likewise be performed upon one or more instances of event logs or other aggregations described herein.

Operation 2827 describes detecting whether the remote system's apparent content treatment includes one or more instances of content acceptance (e.g. sensor 1675 detecting that remote system 507 has accepted content 1659, such as from an absence of an error message or from one or more event logs 1677, 1678). This may occur, for example, in embodiments in which network 500 includes an instance of analysis module 1530 configured for filtering content, or the like, optionally implemented within intermediary 515. Alternatively or additionally, in some embodiments, remote system 507 may signal such an acceptance explicitly.

Operation 2841 describes deciding whether to use a first feedback component in response to whether the content type indication contains a first value (e.g. feedback logic 1564 including component 1591 if one or more content type indications 1548, 1552 include any instances of reference type identifier 1545, and otherwise not necessarily including component 1591). This may occur, for example, in embodiments in which one or more configuration modules 1520, 1620 performs operation 620 and in which invocation module 1510 and analysis module 1530 jointly perform operation 640. Components of feedback 1580 may include one or more instances of graphical cues 1581, guidance 1582 or other literal expressions 1593 tending to affect how a local individual or system generates or adapts message 1533 in a helpful way. Alternatively or additionally, such components may include one or more instances of software, parameters, or other logic 1584 usable at some later time, for example, to generate or adapt such feedback dependent at least partly on one or more content type indications 1551, 1552 or the like. Alternatively or additionally, feedback logic 1562 may be configured to perform operation 2841 by excluding component 1592 if one or more content type indications 1547 exclude type identifier pattern 1534, for example, and otherwise not necessarily excluding component 1592. Such decisions may, for example, likewise depend on one or more other determinants or criteria such as those exemplified herein.

Operation 2842 describes deciding whether to use a second feedback component in response to whether the content type indication contains a second value (e.g. feedback logic 1566 excluding component 1596 if one or more instances of content type indications 1547-1551 exclude reference type identifier 1555, and otherwise not necessarily excluding component 1596). This may occur, for example, in embodiments as describe above with reference to operation 2841. Components of feedback 1580 may exclude one or more instances of warnings 1587 or other literal expressions 1598 tending to affect how a local individual or system generates or adapts instances of messages 1533. Alternatively or additionally, such components may exclude one or more instances of software, parameters, or other logic 1586 usable at some later time, for example, to generate or adapt such feedback dependent at least partly on one or more content type indications 1551, 1552 or the like. Alternatively or additionally, feedback logic 1568 may perform operation 2842 by being configured to include component 1597 if one or more content type indications 1557 include type identifier pattern 1535, and otherwise not include component 1597, at least in some circumstances. Such decisions may, for example, further depend on one or more other determinants or criteria such as those exemplified herein.

Operation 2844 describes receiving a feedback component in association with a data format indication (e.g. one or more instances of feedback logic 1564-1568 receiving one or more components 1571, 1572 each in association 1570 with one or more instances of format indications 1575 as described herein, or the like). Such associations may be established by assignment operations or otherwise as described herein, for example. This may occur, for example, in embodiments in which PDF files or other graphical or text protocols are recognized as unacceptable by a specific recipient or intermediary. Alternatively or additionally, specific forms, report specifications, fonts, object sizes, disclaimers, labels, or the like may be required by one or more format indications 1557, such as to enforce or otherwise accommodate one or more standard data formatting policies an institution may wish to adopt.

Operation 2848 describes providing the provisional-update-responsive feedback partly in response to a control activation, partly in response to a provisional update, and partly in response to the content type indication (e.g. invocation module 1510 instructing feedback module 1560 to select or otherwise provide logic or some other portion of feedback 1580 based on a subject, format, or other content type indication 1551 of a new attachment or other recently updated segment 1532 of message 1533). Such feedback may be provided in response to a button or other control 1504 being activated roughly contemporaneously with such content updates, in some contexts. This may occur, for example, in contexts in which control 1504 or the like is activated by a person during a session within which message 1533 is created or modified. Alternatively or additionally, such feedback may be based on one or more instances of event history 1508 or the like as described herein.

With reference now to FIG. 29 and again to FIG. 18, there are shown several variants of the flow 800 of FIG. 8. Operation 850—obtaining an indication of one or more message filtering rules—may be performed by port 1887 and other portions of evaluation manager 1810 receiving one or more indications 1888 of rule 1867, such as may be extracted from rule result 1868. In a high-transaction-volume context, for example, such indications may be derived by testing a recent event record 1882 against one or more hypotheses. These may include (a) that target system 760 has a higher-than-nominal inventory 1838 of resources; (b) that target system 760 has recently transferred resources at a higher-than-nominal average rate 1851 (in terms of daily or weekly transactions or items, e.g.); (c) that target system 760 rarely makes transactions during certain daily intervals (e.g. at night) or during a meeting currently in progress, as indicated by one or more event records 1892 of schedule 1891; (d) that information 1896 indicates that target system 760 may disfavor some content formats 1897, sizes 1898, or other types 1899 (e.g. graphical data, attachments, or the like); (e) that one or more event records 1882 of history 1881 indicate that target system 760 recently rejected a delivery of content like that of current message currently under consideration; (f) that source system 740 currently has a higher-than-nominal valuation for any potential delivery to a class of destinations that include target system 760; (g) that source system 740 currently has a higher-than-nominal valuation for any potential delivery of content 1870; or the like. From literal rule descriptions or such historical observations, for example, processor 1842 may apply mode 1844 for arithmetically or logically combining more than one of these factors in deriving or incrementally adjusting a value 1846 for use as operand 1857 or delivery evaluation. In some variants, for example, each of these factors may count for one point (or "item") if present, the sum of which being usable as the delivery evaluation or as an incremental change to a prior delivery evaluation. Those skilled in the art may readily practice many variants of this multi-factor analysis in light of teaching herein. Operation 850 may include one or more of the following operations: 2954 or 2958.

Operation 2954 describes receiving the indication of the one or more message filtering rules after evaluating one or more specified message deliveries (e.g. filter 1862 receiving rule 1867 or an indication thereof after content analyzer 1820 evaluates a potential delivery of one or more segments 1813, 1814 of content 1818). This may occur, for example, in an embodiment in which content analyzer 1820 looks up values 1822 corresponding to corresponding destination identifiers 1821 for the segment(s) 1813, 1814 of the potential delivery. Optionally, content analyzer 1820 may potentially adjust one or more of the value(s) 1822 by one or more corresponding modifiers 1823, which may vary in response to a time of day, a recipient's schedule, an event record, or other potential determinants of a message sender's preferences.

Operation 2958 describes receiving the indication of the one or more message filtering rules into a module along a signal path between one or more message sources and one or more message targets (e.g. port 1886 of evaluation module 755 receiving one or more instances or indications of rule 1825 from or about one or more instances of target system 760). This may occur, for example, in a configuration in which intermediary system 750 is situated along signal path 705 between source system 740 and target system 760 as shown, in which rule 1825 is received from evaluation module 765, and in which rule(s) 1867 comprise one or more instances of message filtering rules as exemplified herein. In some variants, one or more instances of evaluation module 755 may be configured to apply the rule or to facilitate a more complex decision phase. For example, negotiator 1860 for source system 740 or the like may decide whether to signal content manager 1810 to comply with the rule, whether to forego delivery to target system 760, whether to attempt delivery of potentially compliant content, whether to evaluate delivery to target system 760 in terms of one or more resources, whether to change a decision in light of a delivery failure, or the like as described herein. Alternatively, processor 1841 may (optionally) be configured to derive rule 1825 as a model or other approximation of a rule that target system 760 may impose or expect application upon incoming messages from source system 740.

Operation 870—accepting text-containing content after obtaining the indication of the one or more message filtering rules and after an acceptance of a delivery evaluation of the text-containing content—may be performed by processor 1842 or other portions of evaluation manager 1810 receiving content 1870 containing text 1871 as described herein, or presenting a decision 1845 to accept it, after an occurrence of each of these events. The acceptance of the delivery evaluation may comprise result 1859 indicating that operand 1858 is acceptably within a minimum or maximum reference value of operand 1857, for example, optionally before or during operation 850. In some embodiments, for example, comparator 1855 may effectively implement a buying agent operable for accepting a low-enough offer or a selling agent operable for accepting a high-enough price offer. Alternatively or additionally, processor 1842 may be configured to "accept" text 1871 or other content 1870 only after receiving and evaluation some or all of it. Operation 870 may include one or more of the following operations: 2971, 2974, 2976, or 2979. Flow 800 may likewise include operation 2930, for example, before, during, among, or after an instance of operation 870 occurs. Operation 870 may likewise partly precede or overlap operation 850 in time.

Operation 2971 describes accepting the text-containing content after accepting the delivery evaluation of the text-containing content (e.g. processor 1832 signaling an affirmative decision 1835 to accept text containing content 1834 "sight unseen," derived by evaluation mode 1833 in response to or otherwise after decision 1835 indicates that value 1836 is suitable for evaluation manager 1810). This may likewise occur, for example, in a context in which decision 1835 is made by processor 1832 instead, to accept the delivery evaluation based upon factors that are independent of the text-containing content 1834 as described herein. Alternatively or additionally, in some embodiments, processor 1832 may be configured so that later-obtained instances of decisions 1835 may depend upon respective evaluations of earlier-received text-containing content 1834

Operation 2974 describes accepting the text-containing content after a remote acceptance of the delivery evaluation of the text-containing content (e.g. a local instance of processor 1831 accepting at least text 1871 of content 1870 after port 1887 locally receives indication 1878 that an instance of target system 760 remotely signaled an authorized acceptance of score 1885). This may occur, for example, at an instance of (intermediary) evaluation module 755 or (source) evaluation module 745 implementing portions of evaluation manager 1810. Alternatively or additionally, an instance of evaluation manager 1810 may be configured to perform operation 2974 locally at evaluation module 765. This may occur, for example, in embodiments in which operation 850 is performed by port 1887 and in which operation 870 is performed by one or more other portions of evaluation manager 1810 as described herein.

Operation 2976 describes signaling the acceptance of the text-containing content before receiving the text-containing content (e.g. content manager 1801 accepting content 1870 on behalf of target system 760 before either receives content 1870). This may occur, for example, in response to one or more of a higher-than-nominal value of the deliver evaluation, a higher-than-nominal trust level for source system 740, a characterization or other certification from a target-designated information source, a low-enough level of loading within content target, or other such detectable conditions that may influence a content target's configuration preferences. Alternatively or additionally, acceptances of such content may occur incrementally or after receiving the text-containing content.

Operation 2979 describes generating the delivery evaluation of the text-containing content at least partly in response to an identifier of a target of the text-containing content (e.g. content analyzer 1820 computing one or more instances of value 1826 of delivering corresponding content 1818 to one or more instances of target system 760 as a function of one or more identifiers 1821 each representing a corresponding system). This may occur, for example, by assigning a pro rata value for each distinct target (system or person), for each unit of content delivered to any of a set of selected targets, or by some more complex system of valuation. Alternatively or additionally, additional instances of table entries 1825 may apply, for example, to effectuate one or more instances of surcharges, bonuses, presentation effects, or other modifiers 1823 conditionally or otherwise affecting one or more values 1822 associated with each of identifiers 1821.

In some embodiments, for example, modifiers 1823 or other services may directly or indirectly indicate one or more valuations 794, 796 implicitly or explicitly. In a context in which a user of target system 760 receives a text-containing message (e.g. content 743) not compliant with one or more instances of rule 763, for example, an atypical evaluation of the delivery could be indicated by a value-indicative symbol (like "±" or some other ASCII character, for example) or other icon 1827 on a display 1826. Such an icon could be enhanced by some more explicit expression 1828 of the delivery evaluation when selected by a user at target system 760, for example, who could then indicate an acceptance of the delivery evaluation (via an "approve" control activation or the like). Alternatively or additionally, (intermediate) evaluation module 755 may be configured to forward such items to target system 760 at recipient-selected times or under recipient-specified circumstances, at least partly based on one or more rules 763 being relaxed or removed by the delivery evaluation acceptance.

During or after operation 870, a variety of techniques may be used to link a transfer of resources (from resource module 748 or the like) with the content acceptance. In some embodiments, a message containing the content may likewise include an attachment or other code configured to "report back" information relating to events involving the content: content acceptance, interaction time, compliance with terms, or the like. Alternatively or additionally, a service provider or other intermediary system 750 could check items and monitor or even enforce any terms relating to the delivery evaluation acceptance (e.g. by holding, forwarding, delaying, or modifying subsequent messages until after receiving an assurance of compliance). For example, in a context in which user A has issued urgency-indicative "tokens" manifesting a preference that a message reaches user A expediently, intermediary system 750 could then use a priori information about user A's location and any instances of target system 760 able to access user A. Alternatively or additionally, the use of such a token may be coupled with one or more additional consequences to entice compliance, such as by postponing delivery of other messages (with fewer tokens or no tokens, for example) until a later time. Alternatively or additionally, a similar urgency status may likewise be applied to any messages from a recipient-specified list, or any that a recipient-specified sender designates as urgent.

In some embodiments, a third party might issue tokens function as a brokerage for such resources. A first party might issue items to the third party, for example, in a context in which the third party is free to distribute such resources in exchange for other resources or the like. Such a third party (acting through intermediary system 750 or target system 950, for example) may limit such exchanges only among a given population of exchange members, for example, in some implementations.

Operation 2930 describes causing a resource transfer partly based on the delivery evaluation of the text-containing content (e.g. inventory manager 1832 implementing transfer 1834 of a quantity of items 1835, 1836 equal to or otherwise based on score 1885 or other evaluation 1884 from inventory 1837 to inventory 1838). This may occur, for example, in a context in which an instance of resource module 758 of FIG. 7 contains the resource manager 1830, in which inventory 1838 is owned by or otherwise associated with an instance of target system 760, in which one or more such transfers 1834 are each recorded in a respective event record 1833, and in which the delivery evaluated is the prospective delivery of content 743 to target system 760. Alternatively or additionally, the "delivery" may include a component within target system 760, such as a delivery to a specific user, for a specific duration, before a specific deadline, in a specific format, by a specific mode, or the like (e.g., by some combination of these). In some variants, operation 2930 may be performed by resource manager 1830 causing one or more items 1835, 1836 to move out of an account or other inventory 1837 (or into inventory 1838) based on a result 1859 derived from operand 1858 as described above. Alternatively or additionally, such resource transfers may be caused by one or more valuations 769, 796 expressing one or more other attributes of source system 740, target system 760, content 743, resource module 758, or the like as illustrated herein.

Figure 30:
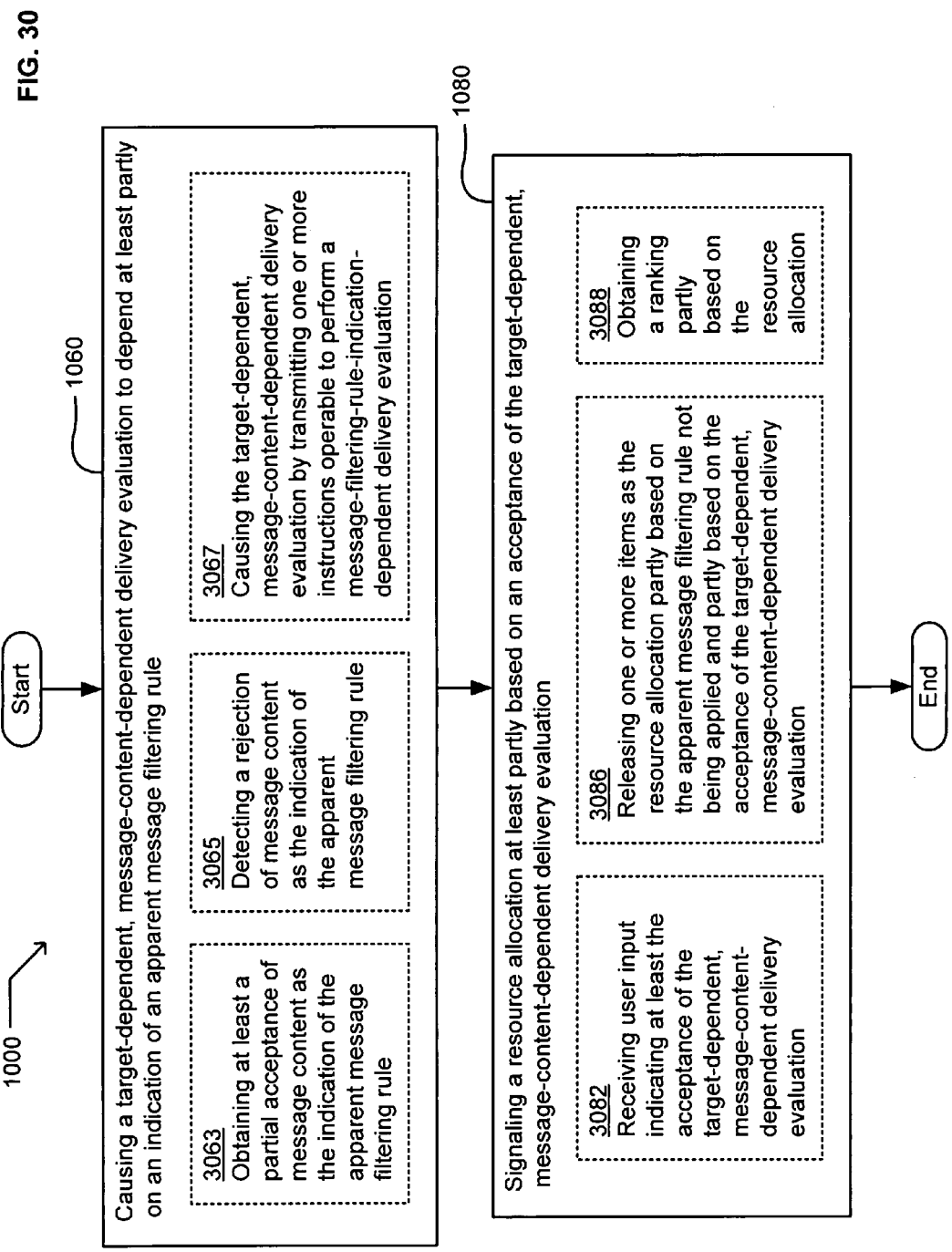
FIG. 30-32 depicts variants of the flow of FIG. 10.

With reference again to FIG. 20, and now also to FIG. 30, there are shown several variants of the flow 1000 of FIG. 10. Operation 1060—causing a target-dependent, message-content-dependent delivery evaluation to depend at least partly on an indication of an apparent message filtering rule—may include one or more of the following operations: 3063, 3065, or 3067. Operation 1080—signaling a resource allocation at least partly based on an acceptance of the target-dependent, message-content-dependent delivery evaluation—may include one or more of the following operations: 3082, 3086, or 3088. In some embodiments, a "resource allocation" may include one or more instances such as physical objects, sections of storage media, or the like. Alternatively or additionally, such quantities may include logical or virtual manifestations such as a range of addresses, a software module library, the contents of an account (of minutes, miles, points, currency, etc.), or the like. Alternatively or additionally, the "resource quantities" may refer to such numbers per se, numbers that specify an inventory of physical or virtual objects.

Operation 3063 describes obtaining at least a partial acceptance of message content as the indication of the apparent message filtering rule (e.g. sensor 2074 detecting that at least portion 2071 of message 2070 was accepted at one or more target systems 950, 980, either from source system 940 or otherwise, as rule indication 2075). This may occur, for example, in an embodiment in which the portion has a typical format, text sentences for example, and other attributes likely to make the portion easy for a recipient to access. Alternatively or additionally, such sensors may optionally detect one or more instances of read receipts or other acknowledgments, partial rejection messages, warnings, reply-period timeouts, or the like. In some variants, alternatively or additionally, such a sensor may (optionally) aggregate message rejection data and the like for one or more specific recipients to generate, refine, and otherwise facilitate one or more models of apparent message filtering rules as described herein.

Operation 3065 describes detecting a rejection of message content as the indication of the apparent message filtering rule (e.g. sensor 2073 detecting that portion 2072 of message 2070 was rejected at target system 970, either from source system 940 or otherwise). This may occur, for example, in an embodiment in the which the portion includes an attachment having an atypical format or size, for example, or some other attribute making the portion burdensome for a recipient to access. Alternatively or additionally, one or more instances of target systems 970 may provide such indications explicitly by broadcasting or selectively notifying senders of their specific message filtering rules. Such an indication may be implemented in software, for example, such as to implement a natural language prohibition expressed by "this system does not accept" one or more of text formatting, executable attachments, graphical files, attachments not having suffixes on a black list, or the like. Alternatively or additionally, such such a rule may dictate that certain types of content may be used only within an emulation, used only if smaller than a threshold, or otherwise accepted only for a limited use.

Operation 3067 describes causing the target-dependent, message-content-dependent delivery evaluation by transmitting one or more instructions operable to perform a message-filtering-rule-indication-dependent delivery evaluation (e.g. task manager 2059 queuing or otherwise causing instruction sequence 2079 to be executed by processor 2057 with one or more parameters 2088 extracted from one or more filtering rule indications 2086 obtained from one or more target systems). This may occur, for example, in embodiments in which task manager 2059 sends instruction sequence 2079 to an implementation of processor 2057 within target system 950, in which instruction sequence 2079 contains the one or more parameter(s) 2088 extracted from the indication(s) 2086. In some embodiments, for example, a message draft is initially small enough that the delivery evaluation is zero for all targets, but then the evaluation increases (for a subset of the addressable targets) as the message draft becomes larger than a threshold.

Operation 3082 describes receiving user input indicating at least the acceptance of the target-dependent, message-content-dependent delivery evaluation (e.g. input device 2121 receiving a user's affirmative response indication 2124 while or just after output 2135 presents value 2129 or mode description 2138, optionally in a common process or session). Alternatively or additionally, such values may be presented by one or more other output devices 2131: a speaker, a writer, or a screen with auditory, visual, or tactile outputs. Input device 2121 may likewise be configured to receive one or more instances of indications 2124 in various modes: key-entry data, vocal or other auditory input, a nod or other gesture of affirmation, or the like. This may occur, for example, in embodiments in which one or more instances of response managers 2003 perform operation 1060 and in which one or more instances of evaluation managers 2007, 2170 or resource managers 2180 implemented in system 2000 perform operation 1080. In some variants, for example, evaluation manager 2170 overlaps response manager 2003 in an instance of interface circuitry 2020 containing some or all components of interface circuitry 2120 as shown.

Operation 3086 describes releasing one or more items as the resource allocation partly based on the apparent message filtering rule not being applied and partly based on the acceptance of the target-dependent, message-content-dependent delivery evaluation (e.g. inventory 2197 sending or otherwise permitting a departure of one or more instances of item 2102 partly based on indication 2125 and partly based on acceptance 2193 of evaluation 2185). This may occur, for example, in embodiments in which target system 950 includes one or more instances of inventory 2197 implemented as an active participant (e.g., a subroutine) or the like, and in which indication 2125 signifies a predictive event such as a putative relaxation or removal of a content-transfer-limiting rule 2141 as described herein (e.g., an expected reduction in a maximum size). Optionally, such a release may also be partly based on one or more other determinants such as a level of trust for the evaluation accepter, a content accepter's history of actions indicating interest in message content of the same type, a broker or other sender's status relative to distribution quotas, or the like.

Operation 3088 describes obtaining a ranking partly based on the resource allocation (e.g. output device 2131 receiving two or more distinct rankings 2127, 2128 from processor 2174 for presentation to a user). This may occur, for example, in an embodiment in which primary system 2200 implements some or all of system 2100, in which processor 2174 uses ranking logic 2299 for generating the rankings, in which the ranking(s) each describe one or more aspects of a message or message group, in which the ranking(s) each relate to a position within a common image, or in which the ranking(s) each relate to a text value or other alphanumeric sequence of multiple values. For example, such ranking logic 2299 may logically or arithmetically combine an expression of the resource allocation with one or more other determinants. Examples of such determinants include expressions of the one or more resource allocations 2181, dates or other recency indicators of each ranked item, importance scores of any recognized item-sender identity or other attribute, importance scores of subjects identified or discussed in content 2144 sent, or the like. This may occur, for example, in embodiments in which one or more instances of response module 953 perform operation 1060, in which one or more instances of evaluation manager 2170 implemented in source system 940 or target system 950 perform operation 1080, and in which source system 940 or target system 950 implements instances or other components of system 2100.

Figure 31:
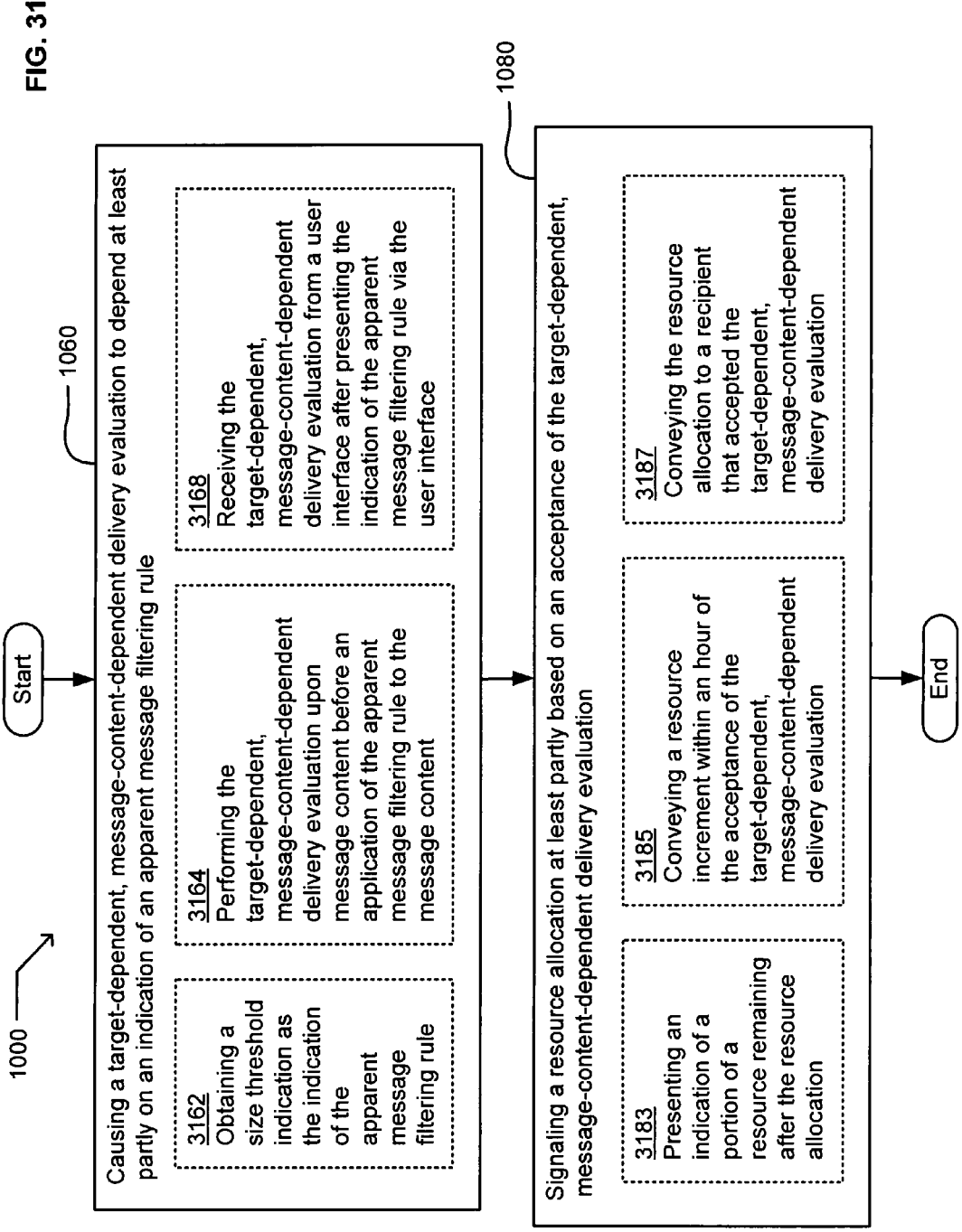

With reference now to FIG. 31, there are shown several variants of the flows of FIG. 10 or 30. Operation 1060—causing a target-dependent, message-content-dependent delivery evaluation to depend at least partly on an indication of an apparent message filtering rule—may include one or more of the following operations: 3162, 3164, or 3168. Alternatively or additionally, operation 1080—signaling a resource allocation at least partly based on an acceptance of the target-dependent, message-content-dependent delivery evaluation—may include one or more of the following operations: 3183, 3185, or 3187. In various embodiments, one or more of other operations may be performed before or during operation 1080, such as those described above with reference to variants of flow 200 in FIG. 24 or FIG. 25.

Operation 3162 describes obtaining a size threshold indication as the indication of the apparent message filtering rule (e.g. port 2022 or parser 2055 obtaining one or more messages 2053 containing one or more instances of length-indicative pattern 2054). This may occur, for example, in contexts in which one or more atypical content object attributes correlate with a failure or success indication. In combination with the size threshold indication relating to an attachment or other object, such attributes may include a filename suffix or other type indicator, an infection-indicative vector or other undesirable pattern within the content, an absence of a watermark or other required pattern within the content, an owner or intermediary identifier, or the like. Alternatively or additionally, the size threshold indication may signify a maximum or minimum number of bytes, seconds, pixels, words, or other size-indicative units. With such an indication, in some embodiments, a potential recipient may effectively indicate how voluminous one or more incoming messages or other objects may be in a given format. Alternatively or additionally, such indications may depend upon or control the resource allocation signaled in operation 1080.

Operation 3164 describes performing the target-dependent, message-content-dependent delivery evaluation upon message content before an application of the apparent message filtering rule to the message content (e.g. processor 2047 computing one or more values 2056 by performing one or more selected evaluation modes 2045, 2046 at least upon message content 2044 before content module 983 applies one or more rules 982 to such content). This may occur, for example, in contexts in which source system 940 or target system 950 is configured to include one or more instances of response manager 2003 operable to apply at least one evaluation mode 2045 before the content arrives at target system 980. In some variants, alternatively or additionally, processor 2047 applies mode 2046 by searching database 2030 using at least target identifier 2034 and message content portion 2032 as search terms.

Operation 3168 describes receiving the target-dependent, message-content-dependent delivery evaluation from a user interface after presenting the indication of the apparent message filtering rule via the user interface (e.g. input device 2027 receiving one or more values 2028 after output device 2024 presents one or more such indications 2025). Examples of such values may include substantially any quantities of resources, such as those described herein. Such indications may optionally be authoritative, explicitly as described by the entity that may apparently apply the filtering rule(s). Alternatively or additionally, the indications may be predictive or otherwise suggestive, such as information or other guidance that may be derived from tentative message content as described herein. Content in which profanity, jargon, or other non-generic elements are detected may trigger such a warning or other indication to that effect, for example, optionally with a further requirement that one or more identified recipients may have an applicable message filtering rule. Alternatively or additionally, such indications may describe a responsive measure available to a composer, for example: "This message may be unsuitable for _____; in order to assure delivery of further content, you may _____."

Operation 3183 describes presenting an indication of a portion of a resource remaining after the resource allocation (e.g. screen 2137 indicating a projected or actual remainder in a physical or virtual inventory 2197 after a corresponding provisional or actual resource allocation 2183). Processor 2174 may compute one or more such remaining items 2101, 2102 of one or more kinds, for example, by aggregating one or more actual allocations of past event records 2191, 2192 with one or more provisional or actual current resource allocations.

In some variants, for example, source system may have a composite inventory of more than one item 2101, 2102 of different types: words, messages, minutes, points, megabytes, exceptions or other tokens that pertain to a specific target or target group, or the like. Inventory 2197 may, for example, implement an inventory of 2 minutes of message time for any of several target systems 950, 970, 980; and of 5 messages for target system 970; and of 3 tokens for obtaining an exception to one or more receiver-enforced rules.

Any of target systems, conversely, may likewise implement a recipient authorization or other preference scheme (accepting "only 6 emails from user X" or "only 800 words a week from user Y," for example). Any such inventory components may optionally be implemented with an expiration date, a rate quota, or other variations as described herein. Alternatively or additionally, other instances of output device 2131 may perform operation 3183, such as by posting one or more provisional transactions as event records 2192. In some variants, operation 3183 may inform a content composer of a potential or actual remainder during composition or otherwise before detecting an apparent authorization to transmit content 944.

Operation 3185 describes conveying a resource increment within an hour of the acceptance of the target-dependent, message-content-dependent delivery evaluation (e.g. inventory manager 2190 authorizing a transfer of one or more items 2101, 2102 from inventory 2197 to inventory 2196 in response to an indication of delivery evaluation acceptance 2194 from source manager 2111 or target manager 2113).

This may occur, for example, in response to the other of source manager 2111 or target manager 2113 providing one or more acceptable delivery evaluations 2112. Alternatively or additionally, a third party may initially provide such evaluations for consideration by such source or target systems or their agents.

Operation 3187 describes conveying the resource allocation to a recipient that accepted the target-dependent, message-content-dependent delivery evaluation (e.g. transmitter 2139 relaying allocation 2181 to whichever of target systems 950, 970, 980 indicated an acceptance of delivery evaluation 2112 for receiving content 2144). This may occur, for example, in an embodiment in which source system 940 includes an instance of source manager 2111 that generated delivery evaluation 2112 that was accepted directly or by proxy from the target system(s). Alternatively or additionally, in some embodiments, target manager 2113 may perform operation 3187 by notifying one or more instances of source system 940 of such an allocation. In some contexts, for example, target system 970 may dispense one or more instances of items 2102 to one or more source systems 940 which may be used to circumvent or modify one or more rules 2142 that govern how and whether such target systems receive content. Examples of such modifications include expediting the delivery, marking the delivery as important, providing an exception to a blocking rule, rerouting or otherwise implementing the delivery with an elevated priority or the like. Source system 940 may then assign such evaluations 2112 (responsive to user input, for example) for such rule modifications.

Figure 32:
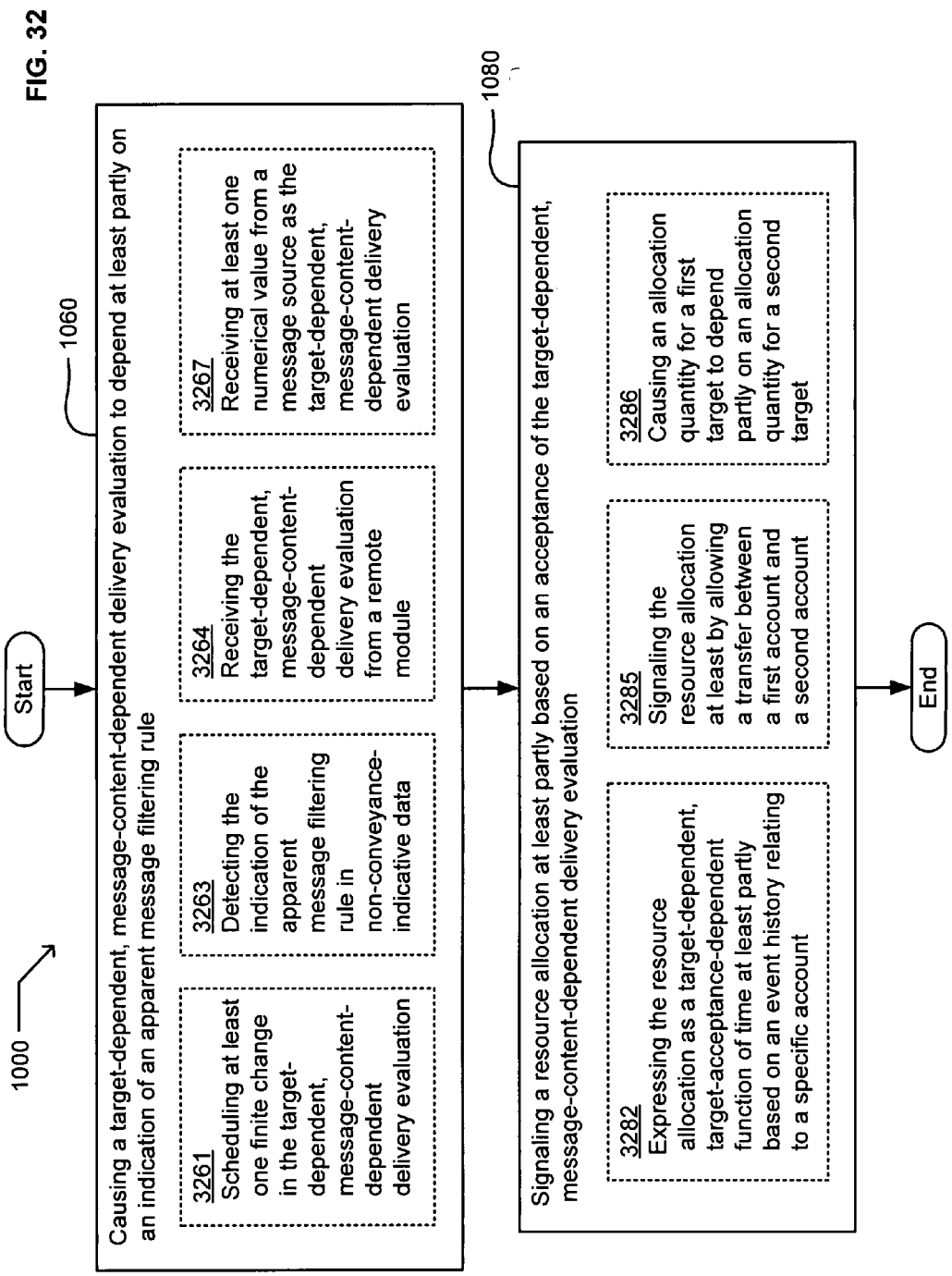

With reference now to FIG. 32, there are shown several variants of the flows of FIG. 10, 30, or 31. Operation 1060—causing a target-dependent, message-content-dependent delivery evaluation to depend at least partly on an indication of an apparent message filtering rule—may include one or more of the following operations: 3261, 3263, 3264 or 3267. Alternatively or additionally, operation 1080—signaling a resource allocation at least partly based on an acceptance of the target-dependent, message-content-dependent delivery evaluation—may include one or more of the following operations: 3282, 3285, or 3286.

Operation 3261 describes scheduling at least one finite change in the target-dependent, message-content-dependent delivery evaluation (e.g. scheduler 2010 defining one or more scheduling records 2014 each a respective value 2016 at one or more respective times 2017). This may occur in a context in which scheduler 2010 adjusts the evaluation by substituting one kind of resource for another, for example, or in which the delivery evaluation is increased or decreased at programmatic intervals. Alternatively or additionally, the finite changes to one or more values 2016 may optionally be predicated upon one or more criteria. Evaluation module 957 may implement valuation 956 until or unless mode 955 is detected, for example. This may occur, for example, in embodiments in which response module 953 or evaluation module 957 includes one or more features of response manager 2003 configured to perform operation 1060.

Operation 3263 describes detecting the indication of the apparent message filtering rule in non-conveyance-indicative data (e.g. sensor 2084 extracting one or more response modes 2087 or the like from a pattern 2082 of transmission failures, warnings, error messages 2080, or the like). This may occur, for example, in a context in which error messages are aggregated by content or format indications rather than merely presented chronologically. Alternatively or additionally, recipient preference data or other non-conveyance-indicative data may be provided by the recipient/target in a manner that is independent of any specific message content, optionally before delivery evaluation or message composition begins.

Operation 3264 describes receiving the target-dependent, message-content-dependent delivery evaluation from a remote module (e.g. port 2094 of source system 940 or target system 950 receiving value 2095 or mode 2096 from any of target systems 970, 980 that may be remote). This may occur, for example, in one or more instances of response manager 2003 having such rule indications, as described herein. Alternatively or additionally, an instance of port 2094 at source system 940 may receive one or more such evaluations from a remote instance of target system 950.

Operation 3267 describes receiving at least one numerical value from a message source as the target-dependent, message-content-dependent delivery evaluation (e.g. port 2093 receiving one or more quantitative scores 2092 from one or more source systems 940, optionally in lieu of any other indications of target systems 950, 970, 980 or message content). This may occur, for example, in a context in which one or more such quantitative evaluations are inversely proportional with a duration or other system load indicator related to message content. Alternatively or additionally, such a score 2092 or other evaluation may be vector-valued, having more than one component.

Operation 3282 describes expressing the resource allocation as a target-dependent, target-acceptance-dependent function of time at least partly based on an event history relating to a specific account (e.g. processor 2172 assigning higher valuation 2114 for a potential delivery to target system 970, at least temporarily, in response to one or more indications of acceptability obtained from event history 2188). Such a history may be marked, for example, by a relatively high or higher-than-nominal aggregate score for a specific potential recipient, for example, indicating more than one instance of consistent compliance, larger-than-nominal transactions, a trusted status as indicated by others, an absence of failures or other negative events, or the like. The function may be "target dependent," for example, if processor 2172 assigns other valuations 2117, 2118 for an otherwise similar delivery to at least one other target system 980. The function may be "target acceptance dependent" if it changes with time absent a timely acceptance 2193 of valuation 2114 from target system(s) 970. (The valuation 2114 may thereafter decrease to nominal valuation 2115 or lower valuation 2116, for example.) Alternatively or additionally, more than one of such valuations 2114, 2115, 2116 may be implemented in mode 2177, such as by expressing mode 2177 as a stepwise-decreasing function of time.

Operation 3285 describes signaling the resource allocation at least by allowing a transfer between a first account and a second account (e.g. transaction processor 2176 executing allocation 2182 by transferring a resource increment 2105 from inventory 2198 to inventory 2196). This may occur, for example, in embodiments in which such inventories 2196, 2198 comprise accounts that may contain resource increments 2105 and in which source system 940 includes one or more instances of resource manager 2180 configured to perform operation 1080. Alternatively or additionally, another portion of such an account (e.g., another increment 2105 of inventory 2198) may be expended or transferred to a third account (inventory 2195, for example) as a part of the transaction that includes the transfer. In some variants, operation 3285 may be performed remotely, such as by port 2178 transmitting a transfer authorization to resource module 958, in a context in which resource module 958 may perform at least the allocation. This may occur, for example, in embodiments in which resource module 958 comprises or controls one or more instances of resource manager 2180 or in which source system 940, in which target system 980 includes one or more such instances of ports 2178, and in which target system 950 serves at least partly as a broker, resource handler, or other intermediary.

Operation 3286 describes causing an allocation quantity for a first target to depend partly on an allocation quantity for a second target (e.g. processor 2175 selecting nominal valuation 2115 for delivering content 2144 to target system 970 in response to one or more event records 2192 indicating that another valuation 2119 was accepted for delivering at least some overlapping portion of content 2144 to another instance of target system 950). This may occur, for example, in a context in which system 2100 is configured to target a distribution quota or other strategic goal in a flexible and efficient manner. Alternatively or additionally, higher or lower allocation quantities or valuations 2114, 2116 may be configured to account for one or more instances of resource supply variations, higher or lower target quality, urgency considerations or the like, as described herein.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

Although users 110, 310, 510 are shown/described herein each as a single illustrated figure, those skilled in the art will appreciate that such users may be representative of a human user, a robotic user (e.g., computational entity), and/or substantially any combination thereof (e.g., a user may be assisted by one or more robotic agents). In addition, each such user, as set forth herein, although shown as a single entity may in fact be composed of two or more entities. Those skilled in the art will appreciate that, in general, the same may be said of "sender" and/or other entity-oriented terms as such terms are used herein.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    obtaining a content type indication locally of a remote system's apparent content treatment of one or more types of content with a potential to be locally transmitted, at one or more future points in time, to the remote system; and
    adapting provisional-update-responsive feedback to depend at least partly on the content type indication of the remote system's apparent content treatment, the provisional-update-responsive feedback including at least a user-membership-dependent feedback in response to one or more instances of at least one of a local user or an intermediary listed in a member-indicative table, wherein at least one of obtaining a content type indication or adapting provisional-update-responsive feedback is at least partially implemented using one or more processing devices.

2. A system at least partially implemented using hardware comprising:
    circuitry for obtaining a content type indication locally in one or more notifications of a remote system's apparent content treatment of one or more types of content with a potential to be locally transmitted, at one or more future points in time, to the remote system; and
    circuitry for adapting provisional-update-responsive feedback to depend at least partly on the content type indication of the remote system's apparent content treatment, the provisional-update-responsive feedback including at least a user-membership-dependent feedback in response to one or more instances of at least one of a local user or an intermediary listed in a member-indicative table.

3. The system of claim 2 in which the circuitry for adapting provisional-update-responsive feedback to depend at least partly the content type indication of the remote system's apparent content treatment, the provisional-update-responsive feedback including at least a user-membership-dependent feedback in response to one or more instances of at least one of a local user or an intermediary listed in a member-indicative table comprises:
   circuitry for including at least some hardware-type-dependent feedback in the provisional-update-responsive feedback.

4. The system of claim 2 in which the circuitry for adapting provisional-update-responsive feedback to depend at least partly on the content type indication of the remote system's apparent content treatment, the provisional-update-responsive feedback including at least a user-membership-dependent feedback in response to one or more instances of at least one of a local user or an intermediary listed in a member-indicative table comprises:
   circuitry for generating the provisional-update-responsive feedback as a function of time and of the content type indication.

5. The system of claim 2 in which the circuitry for obtaining a content type indication locally in one or more notifications of a remote system's apparent content treatment of one or more types of content with a potential to be locally transmitted, at one or more future points in time, to the remote system comprises:
   circuitry for detecting whether the remote system's apparent content treatment includes one or more instances of content acceptance.

6. A system at least partially implemented using hardware comprising:
   circuitry for obtaining a content type indication locally of a remote system's apparent content treatment of one or more types of content with a potential to be locally transmitted, at one or more future points in time, to the remote system;
   circuitry for detecting, from one or more event logs, the content type indication of the remote system's apparent content treatment; and
   analysis circuitry for adapting provisional-update-responsive feedback to depend at least partly on the content type indication of the remote system's apparent content treatment, the analysis circuitry including at least:
      circuitry for including at least a user-membership-dependent feedback in response to one or more instances of at least one of a local user or an intermediary listed in a member-indicative table, and
      circuitry for including at least a predictive expression in the provisional-update-responsive feedback.

7. The system of claim 6 in which the circuitry for obtaining a content type indication locally of a remote system's apparent content treatment of one or more types of content with a potential to be locally transmitted, at one or more future points in time, to the remote system comprises:
   circuitry for receiving an inability indication with the content type indication of the remote system's apparent content treatment.

8. The system of claim 6 in which the circuitry for adapting provisional-update-responsive feedback to depend at least partly on the content type indication of the remote system's apparent content treatment, the provisional-update-responsive feedback including at least a user-membership-dependent feedback in response to one or more instances of at least one of a local user or an intermediary listed in a member-indicative table comprises:
   circuitry for including at least some hardware-type-dependent feedback in the provisional-update-responsive feedback.

9. The system of claim 6 in which the circuitry for adapting provisional-update-responsive feedback to depend at least partly on the content type indication of the remote system's apparent content treatment, the provisional-update-responsive feedback including at least a user-membership-dependent feedback in response to one or more instances of at least one of a local user or an intermediary listed in a member-indicative table comprises:
   circuitry for generating the provisional-update-responsive feedback as a function of time and of the content type indication.

10. The system of claim 6 in which the circuitry for obtaining a content type indication locally of a remote system's apparent content treatment of one or more types of content with a potential to be locally transmitted, at one or more future points in time, to the remote system comprises:
    circuitry for receiving the content type indication in one or more notifications of the remote system's apparent content treatment.

11. The system of claim 6 in which the circuitry for obtaining a content type indication locally of a remote system's apparent content treatment of one or more types of content with a potential to be locally transmitted, at one or more future points in time, to the remote system comprises:
    circuitry for detecting whether the remote system's apparent content treatment includes one or more instances of content acceptance.

12. The system of claim 6 in which the circuitry for adapting provisional-update-responsive feedback to depend at least partly on the content type indication of the remote system's apparent content treatment, the provisional-update-responsive feedback including at least a user-membership-dependent feedback in response to one or more instances of at least one of a local user or an intermediary listed in a member-indicative table comprises:
    circuitry for deciding whether to use a first feedback component in response to whether the content type indication contains a first value; and
    circuitry for deciding whether to use a second feedback component in response to whether the content type indication contains a second value.

13. The system of claim 6 in which the circuitry for adapting provisional-update-responsive feedback to depend at least partly on the content type indication of the remote system's apparent content treatment, the provisional-update-responsive feedback including at least a user-membership-dependent feedback in response to one or more instances of at least one of a local user or an intermediary listed in a member-indicative table comprises:
    circuitry for receiving a feedback component in association with a data format indication.

14. The system of claim 6 in which the circuitry for adapting provisional-update-responsive feedback to depend at least partly on the content type indication of the remote system's apparent content treatment, the provisional-update-responsive feedback including at least a user-membership-dependent feedback in response to one or more instances of at least one of a local user or an intermediary listed in a member-indicative table comprises:

circuitry for providing the provisional-update-responsive feedback partly in response to a control activation, partly in response to a provisional update, and partly in response to the content type indication.

15. An apparatus comprising:
one or more non-transitory media bearing a device-detectable implementation of a method including at least:
one or more instructions configured for obtaining a content type indication locally of a remote system's apparent content treatment of one or more types of content with a potential to be locally transmitted, at one or more future points in time, to the remote system; and
one or more instructions configured for adapting provisional-update-responsive feedback to depend at least partly on the content type indication of the remote system's apparent content treatment, the provisional-update-responsive feedback including at least a predictive expression related to a probability of the one or more content types being successfully transmitted to the remote system, or being rejected or otherwise disfavored by the remote system.

16. The apparatus of claim 15 in which the one or more non-transitory media comprises:
an antenna-containing semiconductor chip.

17. The apparatus of claim 15 in which a portion of the one or more non-transitory media comprises:
one or more instructions configured for transmitting one or more instructions for obtaining a content type indication locally of a remote system's apparent content treatment.

18. The apparatus of claim 15 in which a portion of the one or more non-transitory media comprises:
one or more of an image projection module or a touch screen.

19. The apparatus of claim 15 in which the one or more non-transitory media include at least one of a repeater, a communication satellite, or another active module configured to accept first and second portions of the device-detectable implementation sequentially.

20. The apparatus of claim 15 in which a portion of the one or more non-transitory media comprises:
one or more processors configured to perform one or more of optical image scanning or auditory pattern scanning upon the device-detectable implementation.

21. The apparatus of claim 15 in which a portion of the one or more non-transitory media comprises:
one or more processors configured to perform linguistic pattern scanning upon the device-detectable implementation.

22. The apparatus of claim 15 in which a portion of the one or more non-transitory media comprises:
circuitry for using an encoding constraint in at least some of the device-detectable implementation.

23. The apparatus of claim 15 in which a portion of the one or more non-transitory media comprises:
one or more signal-bearing media configured to bear at least one of a special-purpose instruction sequence, a special-purpose-circuit design, or an information-bearing static attribute as a portion of the device-detectable implementation.

24. The apparatus of claim 15 in which a portion of the one or more non-transitory media comprises:
one or more signal-bearing media bearing an implementation access service operated to access a remote server running another implementation as a portion of the device-detectable implementation.

25. The apparatus of claim 15 in which a first portion of the one or more non-transitory media transmits a portion of the device-detectable implementation before a remainder of the one or more non-transitory media transmits a remainder of the device-detectable implementation.

26. The apparatus of claim 15 in which the one or more non-transitory media include at least one of an integrated circuit, a data-holding element, a lens or other light-transmissive medium, a signal-bearing conduit currently bearing at least a portion of the device-detectable implementation, or a bus or other configuration of two or more transmission media in mutual isolation.

27. The apparatus of claim 15 in which a portion of the one or more non-transitory media comprises:
a power line operated to transmit content of the device-detectable implementation between at least two terminals.

28. The apparatus of claim 15 in which a first medium of the one or more non-transitory media bears a first portion of the device-detectable implementation while a second medium of the one or more non-transitory media bears a second portion of the device-detectable implementation.

29. The apparatus of claim 15 in which the one or more non-transitory media are configured at least (a) by causing a communication channel in the one or more non-transitory media to bear a first portion of the device-detectable implementation; and (b) by causing another channel of the one or more non-transitory media to bear a second portion of the device-detectable implementation.

30. The apparatus of claim 15 in which a portion of the one or more non-transitory media comprises:
one or more static markings indicative of the device-detectable implementation.

31. The apparatus of claim 15 further comprising at least one of a satellite dish or another signal-reflective element, a transducer, an antenna, or a receiver operated to receive the device-detectable implementation.

32. A system, comprising:
circuitry for obtaining a content type indication locally of a remote system's apparent content treatment of one or more types of content with a potential to be locally transmitted, at one or more future points in time, to the remote system; and
circuitry for adapting provisional-update-responsive feedback to depend at least partly on the content type indication of the remote system's apparent content treatment, the provisional-update-responsive feedback including at least a predictive expression related to a probability of the one or more content types being successfully transmitted to the remote system, or being rejected or otherwise disfavored by the remote system.

33. The system of claim 32 further comprising:
circuitry for transmitting one or more instructions for obtaining a content type indication locally of a remote system's apparent content treatment.

34. The system of claim 32 further comprising:
one or more of an image projection module or a touch screen.

35. The system of claim 32 further comprising:
circuitry for performing one or more of optical image scanning or auditory pattern scanning upon the one or more types of content.

36. The system of claim 32 further comprising:
circuitry for performing linguistic pattern scanning upon the one or more types of content.

37. The system of claim 32 further comprising:
  circuitry for transmitting the one or more types of content between at least two terminals.

38. The system of claim 32 further comprising:
  circuitry for causing a communication channel to bear a first portion of the one or more types of content; and
  circuitry for causing another communication channel to bear a second portion of the one or more types of content.

39. The system of claim 32 in which the circuitry for adapting provisional-update-responsive feedback to depend at least partly on the content type indication of the remote system's apparent content treatment, the provisional-update-responsive feedback including at least a predictive expression related to a probability of the one or more content types being successfully transmitted to the remote system, or being rejected or otherwise disfavored by the remote system comprises:
  circuitry for including at least some hardware-type-dependent feedback in the provisional-update-responsive feedback.

40. The system of claim 32 in which the circuitry for adapting provisional-update-responsive feedback to depend at least partly on the content type indication of the remote system's apparent content treatment, the provisional-update-responsive feedback including at least a predictive expression related to a probability of the one or more content types being successfully transmitted to the remote system, or being rejected or otherwise disfavored by the remote system comprises:
  circuitry for generating the provisional-update-responsive feedback as a function of time and of the content type indication.

41. The system of claim 32 in which the circuitry for obtaining a content type indication locally of a remote system's apparent content treatment of one or more types of content with a potential to be locally transmitted, at one or more future points in time, to the remote system comprises:
  circuitry for detecting whether the remote system's apparent content treatment includes one or more instances of content acceptance.

42. The system of claim 32 in which the circuitry for obtaining a content type indication locally of a remote system's apparent content treatment of one or more types of content with a potential to be locally transmitted, at one or more future points in time, to the remote system comprises:
  circuitry for receiving an inability indication with the content type indication of the remote system's apparent content treatment.

\* \* \* \* \*